US012332533B2

(12) United States Patent
Shrivastava et al.

(10) Patent No.: US 12,332,533 B2
(45) Date of Patent: *Jun. 17, 2025

(54) AUTOMATED COMMISSIONING OF CONTROLLERS IN A WINDOW NETWORK

(71) Applicant: View, Inc., Milpitas, CA (US)

(72) Inventors: Dhairya Shrivastava, Los Altos, CA (US); Stephen Clark Brown, San Mateo, CA (US); Ronald F. Cadet, Redwood City, CA (US)

(73) Assignee: View Operating Corporation, San Jose, CA (US)

( * ) Notice: Subject to any disclaimer, the term of this patent is extended or adjusted under 35 U.S.C. 154(b) by 80 days.
This patent is subject to a terminal disclaimer.

(21) Appl. No.: 18/100,773

(22) Filed: Jan. 24, 2023

(65) Prior Publication Data
US 2023/0161212 A1 May 25, 2023

Related U.S. Application Data

(63) Continuation of application No. 16/946,947, filed on Jul. 13, 2020, now Pat. No. 11,592,723, which is a
(Continued)

(51) Int. Cl.
*G02F 1/163* (2006.01)
*E06B 9/24* (2006.01)
(Continued)

(52) U.S. Cl.
CPC .............. *G02F 1/163* (2013.01); *E06B 9/24* (2013.01); *G02F 1/161* (2013.01); *G05B 15/02* (2013.01);
(Continued)

(58) Field of Classification Search
CPC ........... G02F 1/163; G02F 1/161; G02F 1/15; E06B 9/24; E06B 2009/2464;
(Continued)

(56) References Cited

U.S. PATENT DOCUMENTS

| | | |
|---|---|---|
| 5,124,833 A | 6/1992 | Barton et al. |
| 5,170,108 A | 12/1992 | Peterson et al. |

(Continued)

FOREIGN PATENT DOCUMENTS

| | | |
|---|---|---|
| CN | 2590732 Y | 12/2003 |
| CN | 1526132 A | 9/2004 |

(Continued)

OTHER PUBLICATIONS

Australian Examination Report dated Sep. 5, 2023, in Application No. AU2022231771.
(Continued)

*Primary Examiner* — Mohammed A Hasan
(74) *Attorney, Agent, or Firm* — Cha & Reiter, LLC

(57) ABSTRACT

A method, system, and/or computer program product are described for generating a graphical user interface for providing information and controlling optically switchable windows connected by a network. Windows are graphically represented using interactive smart objects placed within views of the graphical user interface in a manner corresponding to their physical location. A method, system, and/or computer program product are described for associating network IDs of optically switchable windows with the locations at which the windows are installed. Window locations are determined by analyzing received wireless transmissions that are sent from transmitters associated with each of the optically switchable windows. The determined locations are then compared with a representation of the building that provides the window locations. Upon comparison, the network ID of each window, which is communicated through the window transmissions, is associated with the appropriate window location on the representation of the building.

18 Claims, 32 Drawing Sheets

Related U.S. Application Data continuation of application No. 16/462,916, filed as application No. PCT/US2017/062634 on Nov. 20, 2017, now Pat. No. 11,137,659, said application No. 16/462,916 is a continuation of application No. 16/082,793, filed as application No. PCT/US2017/020805 on Mar. 3, 2017, now Pat. No. 10,935,864, said application No. 16/462,916 is a continuation of application No. 14/951,410, filed on Nov. 24, 2015, now Pat. No. 10,303,035, and a continuation-in-part of application No. 14/401,081, filed as application No. PCT/US2013/042765 on May 24, 2013, now abandoned, said application No. 14/951,410 is a continuation-in-part of application No. 14/468,778, filed on Aug. 26, 2014, now Pat. No. 9,442,341, which is a continuation of application No. 13/479,137, filed on May 23, 2012, now Pat. No. 9,128,346, which is a continuation of application No. 13/049,750, filed on Mar. 16, 2011, now Pat. No. 8,213,074, and a continuation-in-part of application No. 12/971,576, filed on Dec. 17, 2010, now Pat. No. 9,081,246, said application No. 14/951,410 is a continuation-in-part of application No. 13/449,248, filed on Apr. 17, 2012, now abandoned.

(60) Provisional application No. 62/370,174, filed on Aug. 2, 2016, provisional application No. 62/305,892, filed on Mar. 9, 2016, provisional application No. 62/551,649, filed on Aug. 29, 2017, provisional application No. 62/426,126, filed on Nov. 23, 2016, provisional application No. 62/248,181, filed on Oct. 29, 2015, provisional application No. 62/085,179, filed on Nov. 26, 2014, provisional application No. 61/652,021, filed on May 25, 2012, provisional application No. 61/289,319, filed on Dec. 22, 2009.

(51) Int. Cl.
  *G02F 1/161* (2006.01)
  *G05B 15/02* (2006.01)
  *H04L 12/28* (2006.01)

(52) U.S. Cl.
  CPC .. *H04L 12/2803* (2013.01); *E06B 2009/2464* (2013.01); *G05B 2219/2642* (2013.01); *Y02A 30/24* (2018.01); *Y02B 80/00* (2013.01)

(58) Field of Classification Search
  CPC ............ G05B 15/02; G05B 2219/2642; H04L 12/2803; H04L 12/2807; Y02A 30/24; Y02B 80/00
  USPC ......................................................... 359/275
  See application file for complete search history.

(56) References Cited

U.S. PATENT DOCUMENTS

| | | |
|---|---|---|
| 5,204,778 A | 4/1993 | Bechtel |
| 5,220,317 A | 6/1993 | Lynam et al. |
| 5,290,986 A | 3/1994 | Colon et al. |
| 5,353,148 A | 10/1994 | Eid et al. |
| 5,365,365 A | 11/1994 | Ripoche et al. |
| 5,379,146 A | 1/1995 | Defendini |
| 5,384,578 A | 1/1995 | Lynam et al. |
| 5,402,144 A | 3/1995 | Ripoche |
| 5,451,822 A | 9/1995 | Bechtel et al. |
| 5,579,149 A | 11/1996 | Moret et al. |
| 5,598,000 A | 1/1997 | Popat |
| 5,621,526 A | 4/1997 | Kuze |
| 5,673,028 A | 9/1997 | Levy |
| 5,694,144 A | 12/1997 | Lefrou et al. |
| 5,764,402 A | 6/1998 | Thomas et al. |
| 5,822,107 A | 10/1998 | Lefrou et al. |
| 5,867,495 A | 2/1999 | Elliott et al. |
| 5,900,720 A | 5/1999 | Kallman et al. |
| 5,956,012 A | 9/1999 | Turnbull et al. |
| 5,973,818 A | 10/1999 | Sjursen et al. |
| 5,973,819 A | 10/1999 | Pletcher et al. |
| 5,978,126 A | 11/1999 | Sjursen |
| 6,039,850 A | 3/2000 | Schulz |
| 6,055,089 A | 4/2000 | Schulz et al. |
| 6,084,700 A | 7/2000 | Knapp et al. |
| 6,130,448 A | 10/2000 | Bauer et al. |
| 6,130,772 A | 10/2000 | Cava |
| 6,222,177 B1 | 4/2001 | Bechtel et al. |
| 6,262,831 B1 | 7/2001 | Bauer et al. |
| 6,386,713 B1 | 5/2002 | Turnbull et al. |
| 6,407,468 B1 | 6/2002 | LeVesque et al. |
| 6,407,847 B1 | 6/2002 | Poll et al. |
| 6,449,082 B1 | 9/2002 | Agrawal et al. |
| 6,471,360 B2 | 10/2002 | Rukavina et al. |
| 6,535,126 B2 | 3/2003 | Lin et al. |
| 6,567,708 B1 | 5/2003 | Bechtel et al. |
| 6,614,577 B1 | 9/2003 | Yu et al. |
| 6,795,226 B2 | 9/2004 | Agrawal et al. |
| 6,829,511 B2 | 12/2004 | Bechtel et al. |
| 6,856,444 B2 | 2/2005 | Ingalls et al. |
| 6,897,936 B1 | 5/2005 | Li et al. |
| 6,940,627 B2 | 9/2005 | Freeman et al. |
| 6,988,070 B2 | 1/2006 | Kawasaki et al. |
| 7,085,609 B2 | 8/2006 | Bechtel et al. |
| 7,133,181 B2 | 11/2006 | Greer |
| 7,137,126 B1 | 11/2006 | Coffman et al. |
| 7,215,318 B2 | 5/2007 | Turnbull et al. |
| 7,277,215 B2 | 10/2007 | Greer |
| 7,304,787 B2 | 12/2007 | Whitesides et al. |
| 7,391,420 B1 | 6/2008 | Coyne |
| 7,417,397 B2 | 8/2008 | Berman et al. |
| 7,542,809 B2 | 6/2009 | Bechtel et al. |
| 7,548,833 B2 | 6/2009 | Ahmed |
| 7,567,183 B2 | 7/2009 | Schwenke |
| 7,610,910 B2 | 11/2009 | Ahmed |
| 7,684,105 B2 | 3/2010 | Lamontagne et al. |
| 7,800,812 B2 | 9/2010 | Moskowitz |
| 7,817,326 B1 | 10/2010 | Rennig et al. |
| 7,822,490 B2 | 10/2010 | Bechtel et al. |
| 7,873,490 B2 | 1/2011 | Macdonald |
| 7,941,245 B1 | 5/2011 | Popat |
| 7,962,326 B2 | 6/2011 | Tsourikov et al. |
| 7,966,078 B2 | 6/2011 | Hoffberg et al. |
| 7,972,021 B2 | 7/2011 | Scherer |
| 7,990,603 B2 | 8/2011 | Ash et al. |
| 8,004,739 B2 | 8/2011 | Letocart |
| 8,018,644 B2 | 9/2011 | Gustavsson et al. |
| 8,024,073 B2 | 9/2011 | Imes et al. |
| 8,102,586 B2 | 1/2012 | Albahri |
| 8,213,074 B2 | 7/2012 | Shrivastava et al. |
| 8,214,494 B1 | 7/2012 | Slavin |
| 8,254,013 B2 | 8/2012 | Mehtani et al. |
| 8,292,228 B2 | 10/2012 | Mitchell et al. |
| 8,340,975 B1 | 12/2012 | Rosenberger |
| 8,375,324 B1* | 2/2013 | Zubizarreta ............ G06Q 10/10 715/733 |
| 8,456,729 B2 | 6/2013 | Brown et al. |
| 8,509,400 B2 | 8/2013 | Liu et al. |
| 8,533,580 B1 | 9/2013 | Xu |
| 8,547,624 B2 | 10/2013 | Ash et al. |
| 8,705,162 B2 | 4/2014 | Brown et al. |
| 8,723,467 B2 | 5/2014 | Berman et al. |
| 8,764,950 B2 | 7/2014 | Wang et al. |
| 8,836,263 B2 | 9/2014 | Berman et al. |
| 8,864,321 B2 | 10/2014 | Mehtani et al. |
| 8,902,486 B1 | 12/2014 | Chandrasekhar |
| 8,921,473 B1 | 12/2014 | Hyman |
| 8,976,440 B2 | 3/2015 | Berland et al. |
| 9,016,630 B2 | 4/2015 | Mitchell et al. |
| 9,030,725 B2 | 5/2015 | Pradhan et al. |
| 9,081,247 B1 | 7/2015 | Pradhan et al. |
| 9,245,229 B2 | 1/2016 | Fadell et al. |

(56) References Cited

U.S. PATENT DOCUMENTS

| | | |
|---|---|---|
| 9,390,726 B1 | 7/2016 | Smus et al. |
| 9,470,947 B2 | 10/2016 | Nagel et al. |
| 9,536,527 B1 | 1/2017 | Carlson |
| 9,677,327 B1 | 6/2017 | Nagel et al. |
| 9,749,583 B1 | 8/2017 | Fineberg et al. |
| 9,898,912 B1 | 2/2018 | Jordan, II et al. |
| 9,948,387 B2 | 4/2018 | Frankel et al. |
| 9,984,686 B1 | 5/2018 | Mutagi et al. |
| 10,031,356 B2 | 7/2018 | Van Oosten et al. |
| 10,286,839 B1 | 5/2019 | Mazuir et al. |
| 10,288,971 B2 | 5/2019 | Phillips et al. |
| 10,316,581 B1 | 6/2019 | Nagel et al. |
| 10,329,839 B2 | 6/2019 | Fasi et al. |
| 10,365,531 B2 | 7/2019 | Shrivastava et al. |
| 10,532,268 B2 | 1/2020 | Tran et al. |
| 10,867,266 B1 | 12/2020 | Carlin et al. |
| 10,921,675 B2 | 2/2021 | Barnum et al. |
| 10,964,320 B2 | 3/2021 | Shrivastava et al. |
| 10,982,487 B2 | 4/2021 | Ramirez |
| 11,073,800 B2 | 7/2021 | Shrivastava et al. |
| 11,205,926 B2 | 12/2021 | Shrivastava et al. |
| 11,295,743 B1 | 4/2022 | Bumberger et al. |
| 11,579,571 B2 | 2/2023 | Shrivastava et al. |
| 11,592,723 B2 | 2/2023 | Shrivastava et al. |
| 11,687,045 B2 | 6/2023 | Shrivastava et al. |
| 11,733,660 B2 | 8/2023 | Shrivastava et al. |
| 11,735,183 B2 | 8/2023 | Shrivastava et al. |
| 2002/0027504 A1 | 3/2002 | Davis et al. |
| 2002/0075472 A1 | 6/2002 | Holton |
| 2002/0113168 A1 | 8/2002 | Rukavina et al. |
| 2002/0152298 A1 | 10/2002 | Kikta et al. |
| 2003/0046072 A1 | 3/2003 | Ramaswamy et al. |
| 2003/0210449 A1 | 11/2003 | Ingalls et al. |
| 2003/0210450 A1 | 11/2003 | Yu et al. |
| 2003/0227663 A1 | 12/2003 | Agrawal et al. |
| 2003/0227664 A1 | 12/2003 | Agrawal et al. |
| 2004/0001056 A1 | 1/2004 | Atherton et al. |
| 2004/0102977 A1 | 5/2004 | Metzler et al. |
| 2004/0135989 A1 | 7/2004 | Klebe |
| 2004/0160322 A1 | 8/2004 | Stilp |
| 2004/0215520 A1 | 10/2004 | Butler et al. |
| 2004/0236620 A1 | 11/2004 | Chauhan et al. |
| 2005/0063036 A1 | 3/2005 | Bechtel et al. |
| 2005/0200934 A1 | 9/2005 | Callahan et al. |
| 2005/0200937 A1 | 9/2005 | Weidner |
| 2005/0225830 A1 | 10/2005 | Huang et al. |
| 2005/0268629 A1 | 12/2005 | Ahmed |
| 2005/0270620 A1 | 12/2005 | Bauer et al. |
| 2005/0278047 A1 | 12/2005 | Ahmed |
| 2006/0001683 A1 | 1/2006 | May et al. |
| 2006/0007550 A1 | 1/2006 | Tonar et al. |
| 2006/0018000 A1 | 1/2006 | Greer |
| 2006/0107616 A1 | 5/2006 | Ratti et al. |
| 2006/0170376 A1 | 8/2006 | Piepgras et al. |
| 2006/0179376 A1 | 8/2006 | Asaka |
| 2006/0187608 A1 | 8/2006 | Stark |
| 2006/0209007 A1 | 9/2006 | Pyo et al. |
| 2006/0245024 A1 | 11/2006 | Greer |
| 2007/0002007 A1 | 1/2007 | Tam |
| 2007/0053053 A1 | 3/2007 | Moskowitz |
| 2007/0067048 A1 | 3/2007 | Bechtel et al. |
| 2007/0097484 A1 | 5/2007 | Libretto et al. |
| 2007/0118831 A1 | 5/2007 | Kondo |
| 2007/0162233 A1 | 7/2007 | Schwenke |
| 2007/0285759 A1 | 12/2007 | Ash et al. |
| 2008/0018979 A1 | 1/2008 | Mahe et al. |
| 2008/0043316 A2 | 2/2008 | Moskowitz |
| 2008/0048101 A1 | 2/2008 | Romig et al. |
| 2008/0211682 A1 | 9/2008 | Hyland et al. |
| 2008/0213904 A1 | 9/2008 | Sliwa et al. |
| 2009/0015740 A1 | 1/2009 | Sagitov et al. |
| 2009/0027759 A1 | 1/2009 | Albahri |
| 2009/0066157 A1 | 3/2009 | Tarng et al. |
| 2009/0143141 A1 | 6/2009 | Wells et al. |
| 2009/0187405 A1 | 7/2009 | Bhogal et al. |
| 2009/0243732 A1 | 10/2009 | Tarng et al. |
| 2009/0243802 A1 | 10/2009 | Wolf et al. |
| 2009/0257576 A1 | 10/2009 | Wellard et al. |
| 2010/0039410 A1 | 2/2010 | Becker et al. |
| 2010/0057451 A1 | 3/2010 | Carraux et al. |
| 2010/0066484 A1 | 3/2010 | Hanwright et al. |
| 2010/0082081 A1 | 4/2010 | Niessen et al. |
| 2010/0172009 A1 | 7/2010 | Matthews |
| 2010/0172010 A1 | 7/2010 | Gustavsson et al. |
| 2010/0188057 A1 | 7/2010 | Tarng |
| 2010/0228854 A1 | 9/2010 | Morrison et al. |
| 2010/0235206 A1 | 9/2010 | Miller et al. |
| 2010/0243427 A1 | 9/2010 | Kozlowski et al. |
| 2010/0245289 A1 | 9/2010 | Svajda |
| 2010/0245972 A1 | 9/2010 | Wright |
| 2010/0274366 A1 | 10/2010 | Fata et al. |
| 2010/0302624 A1 | 12/2010 | Moskowitz |
| 2010/0315693 A1 | 12/2010 | Lam et al. |
| 2011/0046810 A1 | 2/2011 | Bechtel et al. |
| 2011/0063708 A1 | 3/2011 | Letocart |
| 2011/0097081 A1 | 4/2011 | Gupta et al. |
| 2011/0148218 A1 | 6/2011 | Rozbicki |
| 2011/0164304 A1 | 7/2011 | Brown et al. |
| 2011/0167617 A1 | 7/2011 | Letocart |
| 2011/0184561 A1 | 7/2011 | Klasson et al. |
| 2011/0235152 A1 | 9/2011 | Letocart |
| 2011/0249313 A1 | 10/2011 | Letocart |
| 2011/0255142 A1 | 10/2011 | Ash et al. |
| 2011/0266419 A1 | 11/2011 | Jones et al. |
| 2011/0292488 A1 | 12/2011 | McCarthy et al. |
| 2011/0304898 A1 | 12/2011 | Letocart |
| 2011/0307112 A1 | 12/2011 | Barrilleaux |
| 2012/0026573 A1 | 2/2012 | Collins et al. |
| 2012/0033287 A1 | 2/2012 | Friedman et al. |
| 2012/0062975 A1 | 3/2012 | Mehtani et al. |
| 2012/0089488 A1 | 4/2012 | Letchford |
| 2012/0105257 A1 | 5/2012 | Murillo et al. |
| 2012/0133315 A1 | 5/2012 | Berman et al. |
| 2012/0153868 A1 | 6/2012 | Gu et al. |
| 2012/0190386 A1 | 7/2012 | Anderson |
| 2012/0191789 A1 | 7/2012 | Endo et al. |
| 2012/0194895 A1 | 8/2012 | Podbelski et al. |
| 2012/0200908 A1 | 8/2012 | Bergh et al. |
| 2012/0232969 A1 | 9/2012 | Fadell et al. |
| 2012/0236386 A1 | 9/2012 | Mehtani et al. |
| 2012/0239209 A1 | 9/2012 | Brown et al. |
| 2012/0268803 A1 | 10/2012 | Greer et al. |
| 2012/0293855 A1 | 11/2012 | Shrivastava et al. |
| 2013/0057937 A1 | 3/2013 | Berman et al. |
| 2013/0073681 A1 | 3/2013 | Jiang et al. |
| 2013/0085614 A1 | 4/2013 | Wenzel et al. |
| 2013/0158790 A1 | 6/2013 | McIntyre, Jr. et al. |
| 2013/0196600 A1 | 8/2013 | Capers et al. |
| 2013/0226353 A1 | 8/2013 | Park |
| 2013/0242370 A1 | 9/2013 | Wang |
| 2013/0263510 A1 | 10/2013 | Gassion |
| 2013/0271812 A1 | 10/2013 | Brown et al. |
| 2013/0271813 A1 | 10/2013 | Brown |
| 2013/0271814 A1 | 10/2013 | Brown |
| 2013/0271815 A1 | 10/2013 | Pradhan et al. |
| 2013/0289999 A1 | 10/2013 | Hymel |
| 2013/0307771 A1 | 11/2013 | Parker et al. |
| 2014/0067733 A1 | 3/2014 | Humann |
| 2014/0098007 A1 | 4/2014 | Delpier et al. |
| 2014/0101573 A1 | 4/2014 | Kuo |
| 2014/0108019 A1 | 4/2014 | Ehsani et al. |
| 2014/0142937 A1 | 5/2014 | Powledge et al. |
| 2014/0160550 A1 | 6/2014 | Brown et al. |
| 2014/0169795 A1 | 6/2014 | Clough |
| 2014/0172430 A1 | 6/2014 | Rutherford et al. |
| 2014/0172557 A1 | 6/2014 | Eden et al. |
| 2014/0185284 A1 | 7/2014 | Hsu et al. |
| 2014/0229174 A1 | 8/2014 | Graumann et al. |
| 2014/0236323 A1 | 8/2014 | Brown et al. |
| 2014/0259931 A1 | 9/2014 | Plummer |
| 2014/0268287 A1 | 9/2014 | Brown et al. |
| 2014/0300945 A1 | 10/2014 | Parker |
| 2014/0330538 A1 | 11/2014 | Conklin et al. |
| 2014/0330569 A1 | 11/2014 | Kolavennu et al. |

(56) References Cited

U.S. PATENT DOCUMENTS

| | | |
|---|---|---|
| 2014/0347190 A1 | 11/2014 | Grimm |
| 2014/0349497 A1 | 11/2014 | Brown et al. |
| 2014/0358553 A1 | 12/2014 | Helmke et al. |
| 2014/0371931 A1 | 12/2014 | Lin et al. |
| 2014/0379353 A1 | 12/2014 | Boies et al. |
| 2015/0002919 A1 | 1/2015 | Jack et al. |
| 2015/0003822 A1 | 1/2015 | Fukada et al. |
| 2015/0023661 A1 | 1/2015 | Borkenhagen et al. |
| 2015/0049378 A1 | 2/2015 | Shrivastava et al. |
| 2015/0060648 A1 | 3/2015 | Brown et al. |
| 2015/0070745 A1 | 3/2015 | Pradhan |
| 2015/0112667 A1 | 4/2015 | Kozuka et al. |
| 2015/0116811 A1 | 4/2015 | Shrivastava et al. |
| 2015/0122474 A1 | 5/2015 | Petersen |
| 2015/0162006 A1 | 6/2015 | Kummer |
| 2015/0243283 A1 | 8/2015 | Halash et al. |
| 2015/0293422 A1 | 10/2015 | Pradhan et al. |
| 2015/0327304 A1 | 11/2015 | Tinnakornsrisuphap et al. |
| 2015/0331666 A1 | 11/2015 | Bucsa et al. |
| 2015/0348554 A1 | 12/2015 | Orr et al. |
| 2016/0007431 A1 | 1/2016 | Bosua et al. |
| 2016/0040478 A1 | 2/2016 | Lundy et al. |
| 2016/0054633 A1 | 2/2016 | Brown et al. |
| 2016/0154290 A1 | 6/2016 | Brown et al. |
| 2016/0170206 A1 | 6/2016 | Osborne et al. |
| 2016/0203403 A1 | 7/2016 | Nagel et al. |
| 2016/0261837 A1 | 9/2016 | Thompson et al. |
| 2016/0266461 A1 | 9/2016 | Yamamoto |
| 2016/0266878 A1 | 9/2016 | Mankovskii |
| 2016/0299210 A1 | 10/2016 | Zeine |
| 2016/0327293 A1 | 11/2016 | Grabowski et al. |
| 2016/0358603 A1 | 12/2016 | Azam et al. |
| 2017/0075183 A1 | 3/2017 | Brown |
| 2017/0076721 A1 | 3/2017 | Bargetzi et al. |
| 2017/0080341 A1 | 3/2017 | Mao et al. |
| 2017/0082903 A1 | 3/2017 | Vigano et al. |
| 2017/0092269 A1 | 3/2017 | Haubrich et al. |
| 2017/0097618 A1 | 4/2017 | Cipollo et al. |
| 2017/0188437 A1 | 6/2017 | Banta |
| 2017/0234067 A1 | 8/2017 | Fasi et al. |
| 2017/0251488 A1 | 8/2017 | Urban et al. |
| 2017/0285432 A1 | 10/2017 | Shrivastava et al. |
| 2018/0122366 A1 | 5/2018 | Nishikawa et al. |
| 2018/0129172 A1 | 5/2018 | Shrivastava et al. |
| 2018/0259804 A1 | 9/2018 | Bae et al. |
| 2018/0284555 A1 | 10/2018 | Klawuhn et al. |
| 2018/0293981 A1 | 10/2018 | Ni et al. |
| 2018/0321042 A1 | 11/2018 | Brewer et al. |
| 2018/0335939 A1 | 11/2018 | Karunamuni et al. |
| 2018/0364654 A1 | 12/2018 | Locke et al. |
| 2019/0004677 A1 | 1/2019 | Madonna et al. |
| 2019/0097827 A1 | 3/2019 | Angle et al. |
| 2019/0138740 A1 | 5/2019 | Ricknas et al. |
| 2019/0235451 A1 | 8/2019 | Shrivastava et al. |
| 2019/0257150 A1 | 8/2019 | Fasi et al. |
| 2019/0294018 A1* | 9/2019 | Shrivastava ............ G02F 1/163 |
| 2019/0346734 A1 | 11/2019 | Shrivastava et al. |
| 2019/0354071 A1 | 11/2019 | Turney et al. |
| 2020/0022072 A1 | 1/2020 | Cho et al. |
| 2020/0134773 A1 | 4/2020 | Pinter et al. |
| 2020/0193155 A1 | 6/2020 | Keohane et al. |
| 2020/0293186 A1 | 9/2020 | Barnum et al. |
| 2020/0319765 A1 | 10/2020 | Badr et al. |
| 2020/0387041 A1 | 12/2020 | Shrivastava et al. |
| 2021/0088867 A1 | 3/2021 | Nagel et al. |
| 2021/0126063 A1 | 4/2021 | Vanderveen et al. |
| 2021/0174804 A1 | 6/2021 | Shrivastava et al. |
| 2021/0210053 A1 | 7/2021 | Ng et al. |
| 2021/0325754 A1 | 10/2021 | Brown et al. |
| 2021/0373511 A1 | 12/2021 | Shrivastava et al. |
| 2022/0159077 A1 | 5/2022 | Shrivastava et al. |
| 2022/0365494 A1 | 11/2022 | Shrivastava et al. |
| 2023/0333520 A1 | 10/2023 | Shrivastava et al. |
| 2023/0393443 A1 | 12/2023 | Marquez et al. |
| 2024/0046928 A1 | 2/2024 | Shrivastava et al. |
| 2024/0329484 A1 | 10/2024 | Trikha et al. |

FOREIGN PATENT DOCUMENTS

| | | |
|---|---|---|
| CN | 1808505 A | 7/2006 |
| CN | 101013211 A | 8/2007 |
| CN | 101023711 A | 8/2007 |
| CN | 101213788 A | 7/2008 |
| CN | 101969207 A | 2/2011 |
| CN | 102203370 A | 9/2011 |
| CN | 102792764 A | 11/2012 |
| CN | 103137128 A | 6/2013 |
| CN | 103226950 A | 7/2013 |
| CN | 104335595 A | 2/2015 |
| CN | 104395677 A | 3/2015 |
| CN | 104424947 A | 3/2015 |
| CN | 105143586 A | 12/2015 |
| CN | 105395166 A | 3/2016 |
| CN | 106125444 A | 11/2016 |
| DE | 10124673 A1 | 11/2002 |
| EP | 0445314 A1 | 9/1991 |
| EP | 0869032 A2 | 10/1998 |
| EP | 0920210 A1 | 6/1999 |
| EP | 0835475 B1 | 9/2004 |
| EP | 1510854 A1 | 3/2005 |
| EP | 1417535 B1 | 11/2005 |
| EP | 1619546 A2 | 1/2006 |
| EP | 2090961 A1 | 8/2009 |
| EP | 2161615 A1 | 3/2010 |
| EP | 2357544 A2 | 8/2011 |
| EP | 2764998 A1 | 8/2014 |
| EP | 3352053 A1 | 7/2018 |
| EP | 3449341 A1 | 3/2019 |
| JP | S63208830 A | 8/1988 |
| JP | H02132420 A | 5/1990 |
| JP | H05178645 A | 7/1993 |
| JP | H1063216 A | 3/1998 |
| JP | 2004245985 A | 9/2004 |
| JP | 2009116352 A | 5/2009 |
| JP | 4694816 B2 | 6/2011 |
| JP | 4799113 B2 | 10/2011 |
| JP | 2012028015 A | 2/2012 |
| JP | 2013057975 A | 3/2013 |
| JP | 2015009941 A | 1/2015 |
| JP | 2015509204 A | 3/2015 |
| JP | 2015129438 A | 7/2015 |
| JP | 2016502355 A | 1/2016 |
| JP | 2016516921 A | 6/2016 |
| KR | 200412640 Y1 | 3/2006 |
| KR | 100752041 B1 | 8/2007 |
| KR | 20080022319 A | 3/2008 |
| KR | 20090026181 A | 3/2009 |
| KR | 100904847 B1 | 6/2009 |
| KR | 100931183 B1 | 12/2009 |
| KR | 20100034361 A | 4/2010 |
| KR | 20110003698 A | 1/2011 |
| KR | 20110094672 A | 8/2011 |
| KR | 20110128213 A | 11/2011 |
| KR | 20150136981 A | 12/2015 |
| RU | 2378672 C2 | 1/2010 |
| RU | 2009132962 A | 3/2011 |
| TW | 201115503 A | 5/2011 |
| TW | 201535157 A | 9/2015 |
| TW | 201631551 A | 9/2016 |
| WO | WO-9816870 A1 | 4/1998 |
| WO | WO-0213052 A2 | 2/2002 |
| WO | WO-2004003649 A1 | 1/2004 |
| WO | WO-2005098811 A1 | 10/2005 |
| WO | WO-2005103807 A2 | 11/2005 |
| WO | WO-2007016546 A2 | 2/2007 |
| WO | WO-2007146862 A2 | 12/2007 |
| WO | WO-2008030018 A1 | 3/2008 |
| WO | WO-2008147322 A1 | 12/2008 |
| WO | WO-2009042359 A1 | 4/2009 |
| WO | WO-2009124647 A1 | 10/2009 |
| WO | WO-2010079388 A1 | 7/2010 |
| WO | WO-2010120771 A1 | 10/2010 |

(56) References Cited

FOREIGN PATENT DOCUMENTS

| | | |
|---|---|---|
| WO | WO-2011020478 A1 | 2/2011 |
| WO | WO-2011087684 A1 | 7/2011 |
| WO | WO-2011087687 A1 | 7/2011 |
| WO | WO-2011124720 A2 | 10/2011 |
| WO | WO-2011127015 A1 | 10/2011 |
| WO | WO-2012079159 A1 | 6/2012 |
| WO | WO-2012080618 A1 | 6/2012 |
| WO | WO-2012080656 A1 | 6/2012 |
| WO | WO-2012080657 A1 | 6/2012 |
| WO | WO-2012145155 A1 | 10/2012 |
| WO | WO-2013059674 A1 | 4/2013 |
| WO | WO-2013101066 A1 | 7/2013 |
| WO | WO-2013109881 A2 | 7/2013 |
| WO | WO-2013155467 A1 | 10/2013 |
| WO | WO-2014121863 A1 | 8/2014 |
| WO | WO-2014130471 A1 | 8/2014 |
| WO | WO-2014134451 A2 | 9/2014 |
| WO | WO-2014209812 A1 | 12/2014 |
| WO | WO-2015077097 A1 | 5/2015 |
| WO | WO-2015134789 A1 | 9/2015 |
| WO | WO-2015168626 A1 | 11/2015 |
| WO | WO-2015171886 A1 | 11/2015 |
| WO | WO-2016004109 A1 | 1/2016 |
| WO | WO-2016037772 A1 | 3/2016 |
| WO | WO-2016094445 A1 | 6/2016 |
| WO | WO-2017059362 A1 | 4/2017 |
| WO | WO-2017075059 A1 | 5/2017 |
| WO | WO-2017155833 A1 | 9/2017 |
| WO | WO-2017189618 A1 | 11/2017 |
| WO | WO-2017192881 A1 | 11/2017 |
| WO | WO-2018098089 A1 | 5/2018 |
| WO | WO-2018200740 A2 | 11/2018 |
| WO | WO-2018200752 A1 | 11/2018 |
| WO | WO-2020037055 A1 | 2/2020 |
| WO | WO-2021067505 A1 | 4/2021 |
| WO | WO-2021163552 A1 | 8/2021 |

OTHER PUBLICATIONS

Bannat, A., et al., "Artificial Cognition in Production Systems", IEEE Transactions on Automation Science and Engineering, 2011, vol. 8, No. 1, pp. 148-174.
CA Office Action dated Oct. 23, 2023, in CA Application No. 3044823.
CA Office Action dated Sep. 18, 2023, in Application No. CA3022396.
CA Office Action dated Sep. 19, 2024 in CA Application No. 3022396.
CN office action dated May 30, 2023, in application No. CN201780035569.3 with English Translation.
EP Extended European Search Report dated May 15, 2024 in EP Application No. 21787899.0.
EP Office Action dated Jul. 4, 2023, in application No. EP17874769.7.
International Preliminary Report on Patentability and Written Opinion dated Mar. 14, 2024 in PCT Application No. PCT/US2022/075717.
International Preliminary Report on Patentability dated May 19, 2023 in PCT Application No. PCT/US2021/057678.
International Preliminary Report on Patentability dated Oct. 19, 2023, in PCT Application No. PCT/US2022/023605.
International Preliminary Reporton Patentability dated Sep. 28, 2023, in PCT Application No. PCT/US2022/020730.
International Search Report and Written Opinion dated Apr. 19, 2022 in PCT Application No. PCT/US2021/057678.
International Search Report and Written Opinion dated Dec. 19, 2022, in Application No. PCT/US2022/075717.
International Search Report and Written Opinion dated Oct. 17, 20223 in PCT Application No. PCT/US2023/026514.
Japanese Office Action dated May 16, 2023 in JP Application No. JP2022-0031460 awaiting English translation.
JP Office Action dated Jul. 25, 2023, in Application No. JP2022-176255 with English Translation.
JP Office Action dated Mar. 5, 2024 in JP Application No. 2022-176255, with English translation.
JP Office Action dated Nov. 2, 2021, in JP Application No. JP20180555922 awaiting English translation.
Laskar, S.H., et al., "Power Quality Monitoring by Virtual Instrumentation using LabVIEW", 2011 46th International Universities' Power Engineering Conference (UPEC), 2011, pp. 1-6.
Lee E., et al., "The Design and Evaluation of Integrated Envelope and Lighting Control Strategies for Commercial Buildings," Energy & Environment division, 1994, pp. 1-23.
Tuokko, R., et al., "Micro and Desktop Factory Road Map", Tampere University of Technology, 2012, pp. 1-114.
U.S. Corrected Notice of Allowance dated May 26, 2023 in U.S. Appl. No. 17/355,086.
U.S. Final Office Action dated Aug. 30, 2024 in U.S. Appl. No. 18/215,178.
U.S. Non-Final Office Action dated Mar. 26, 2024 in U.S. Appl. No. 18/215,178.
U.S. Notice of Allowance dated Apr. 13, 2023 in U.S. Appl. No. 17/249,148.
U.S. Notice of Allowance dated Jul. 6, 2023 in U.S. Appl. No. 17/870,480.
U.S. Notice of Allowance dated Jun. 7, 2023 in U.S. Appl. No. 17/870,480.
U.S. Notice of Allowance dated Sep. 12, 2024 in U.S. Appl. No. 18/213,843.
U.S. Appl. No. 18/688,561, inventors Rasmus-Vorrath J.K, et al., filed Mar. 1, 2024.
U.S. Appl. No. 18/898,810, inventors Shrivastava D, et al., filed Sep. 27, 2024.
"SageGlass helps Solar Decathlon- and AIA award-winning home achieve net-zero energy efficiency" in MarketWatch.com, http://www.marketwatch.com/story/sageglass-helps-solar-decathlon-and-aia-award-winning-home-achieve-net-zero-energy-efficiency-2012-06-07, Jun. 7, 2012.
APC by Schneider Electric, Smart-UPS 120V Product Brochure, 2013, 8 pp.
AU Examination Report mailed on Jun. 3, 2021, in the application No. AU2017257789.
AU Office action dated Dec. 5, 2022, in AU Application No. AU2017363581.
AU Office Action dated Dec. 7, 2021, in Application No. AU2017257789.
AU Office Action dated Jun. 1, 2022, in Application No. AU2017257789.
AU Office Action dated May 13, 2022, in Application No. AU2017257789.
Chinese Office Action dated Jan. 15, 2018 in CN Application No. 201380025802.1.
Chinese Office Action dated Jun. 21, 2017 in CN Application No. 201380025802.1.
Chinese Office Action dated May 20, 2020 in CN Application No. 201810932986.4.
Chinese Office Action dated Nov. 23, 2020 in CN Application No. 201810932986.4.
CN Office Action dated Aug. 30, 2021, in CN Application No. 201780035569.3 with English translation.
CN Office Action dated Jan. 28, 2023 in Application No. CN201780035569.3 with English translation.
CN Office Action dated May 7, 2022, in Application No. CN201780035569.3 with English translation.
Communication re Third-Party Observation dated Dec. 4, 2014 and Third-Party Observation dated Dec. 3, 2014 in PCT/US2014/016974.
Duchon, Claude E. et al., "Estimating Cloud Type from Pyranometer Observations," Journal of Applied Meteorology, vol. 38, Jan. 1999, pp. 132-141.
EP Office Action dated Apr. 13, 2022, in Application No. EP17874769.7.
EP Office Action dated Oct. 5, 2021, in application No. EP17874769.7.

(56) References Cited

OTHER PUBLICATIONS

European Extended Search Report and Opinion dated May 20, 2020 in European Application No. 17874769.7.
European Extended Search Report and Opinion dated Nov. 7, 2019 in European Application No. 17790290.5.
European (Extended) Search Report dated Aug. 25, 2017 in European Application No. 17156033.7.
European (extended) Search Report dated Dec. 4, 2015 in European Application No. 13775052.7.
European Office Action dated Aug. 30, 2022 in Application No. EP17790290.5.
European Search Report dated Aug. 11, 2014 in European Application No. 12757877.1.
European Search Report dated Jul. 23, 2014 in European Application No. 12756917.6.
European Search Report dated Jul. 29, 2014 in European Application No. 12758250.0.
European Search Report dated Mar. 5, 2015 in European Application No. 12841714.4.
Final Office Action dated Jun. 5, 2015 in U.S. Appl. No. 13/968,258.
Graham, Steve, "Clouds & Radiation," Mar. 1, 1999. [http://earthobservatory.nasa.gov/Features/Clouds/].
Haby, Jeff, "Cloud Detection (IR v. VIS)," (known as of Sep. 3, 2014) [ http://theweatherprediction.com/habyhints2/512/].
Hoosier Energy, "How do they do that? Measuring Real-Time Cloud Activity" Hoosier Energy Current Connections, (known as of Sep. 3, 2014). (http://members.questline.com/Article.aspx?articleID=18550&accountID=196000&nl=11774).
"How Cleantech wants to make a 2012 comeback" http://mountainview.patch.com/articles/how-cleantech-wants-to-make-a-2012-comeback, Jan. 23, 2012.
IN Office Action dated Jun. 21, 2021, in IN Application No. 201817042037.
IN Office Action dated Oct. 7, 2022, in Application No. IN202118056857.
Indian Office Action dated Jul. 6, 2022, in IN Application No. 201917018642.
Indian Office Action dated Sep. 17, 2019 in Indian Application No. 2533/KOLNP/2014.
International Preliminary Report on Patentability dated Feb. 19, 2015 issued in PCT/US2013/053625.
International Preliminary Report on Patentability dated May 1, 2014 in PCT/US2012/061137.
International Preliminary Report on Patentability dated Nov. 8, 2018 in PCT/US2017/29476.
International Preliminary Report on Patentability dated Oct. 23, 2014 issued in PCT/US2013/036456.
International Preliminary Report on Patentability dated Oct. 30, 2014 issued in PCT/US2013/034998.
International Preliminary Report on Patentability dated Oct. 30, 2014 issued in PCT/US2013/036235.
International Preliminary Report on Patentability dated Sep. 26, 2013, issued in PCT/US2012/027742.
International Preliminary Report on Patentability dated Sep. 26, 2013, issued in PCT/US2012/027828.
International Preliminary Report on Patentability dated Sep. 26, 2013, issued in PCT/US2012/027909.
International Preliminary Report on Patentability (ISA:KR) dated Jun. 6, 2019, issued in PCT/US2017/062634.
International Search Report and Written Opinion dated Aug. 8, 2022, in Application No. PCT/US2022/023605.
International Search Report and Written Opinion dated Aug. 5, 2021 in PCT Application No. PCT/US2021/027418.
International Search Report and Written Opinion dated Dec. 26, 2013, issued in PCT/US2013/053625.
International Search Report and Written Opinion dated Jul. 6, 2022, in PCT Application No. PCT/US2022/020730.
International Search Report and Written Opinion dated Jul. 11, 2013, issued in PCT/US2013/034998.
International Search Report and Written Opinion dated Jul. 23, 2013, issued in PCT/US2013/036235.
International Search Report and Written Opinion dated Jul. 26, 2013, issued in PCT/US2013/036456.
International Search Report and Written Opinion dated Mar. 28, 2013 in PCT/US2012/061137.
International Search Report and Written Opinion dated May 26, 2014 in PCT/US2014/016974.
International Search Report and Written Opinion dated Oct. 16, 2014, issued in PCT/US2014/043514.
International Search Report and Written Opinion dated Sep. 24, 2012, issued in PCT/US2012/027742.
International Search Report and Written Opinion dated Sep. 24, 2012, issued in PCT/US2012/027909.
International Search Report and Written Opinion dated Sep. 26, 2012, issued in PCT/US2012/027828.
International Search Report and Written Opinion (ISA:KR) dated Jul. 18, 2017, issued in PCT/US2017/29476.
International Search Report and Written Opinion (ISA:KR) dated Mar. 19, 2018, issued in PCT/US2017/062634.
Japanese Office Action dated Mar. 23, 2021 in JP Application No. 2018-555922.
JP Office Action dated Nov. 2, 2021, in JP Application No. JP20180555922.
Kleissl, Jan et al., "Recent Advances in Solar Variability Modeling and Solar Forecasting at UC San Diego," Proceedings, American Solar Energy Society, 2013 Solar Conference, Apr. 16-20, 2013, Baltimore, MD.
KR Office Action dated Dec. 14, 2021, in Application No. KR1020187034166 with English translation.
KR Office Action dated Sep. 20, 2022, in Application No. KR10-2018-7034166 with English translation.
Letter dated Dec. 1, 2014 re Prior Art re U.S. Appl. No. 13/772,969 from Ryan D. Ricks representing MechoShade Systems, Inc.
Lim, Sunnie H.N et al., "Modeling of optical and energy performance of tungsten-oxide-based electrochromic windows including their intermediate states," Solar Energy Materials & Solar Cells, vol. 108, Oct. 16, 2012, pp. 129-135.
Lululemon athletica, "Mirror", The Mirror Gym product brochure, known Dec. 8, 2020, 9 pp, >https://shop.lululemon.com/story/mirror-home-gym , retrieved Jan. 29, 2021.
National Aeronautics & Space Administration, "Cloud Remote Sensing and Modeling," (known as of Sep. 3, 2014), published date of Sep. 15, 2014, [http://atmospheres.gsfc.nasa.gov/climate/index.php?section=134 ].
"New from Pella: Windows with Smartphone-run blinds", Pella Corp., http://www.desmoinesregister.com/article/20120114/BUSINESS/301140031/0/biggame/?odyssey=nav%7Chead, Jan. 13, 2012.
Office Action dated Oct. 6, 2014 in U.S. Appl. No. 13/968,258.
Science and Technology Facilities Council. "Cloud Radar: Predicting The Weather More Accurately." ScienceDaily, Oct. 1, 2008. [www.sciencedaily.com/releases/2008/09/080924085200.htm].
Taiwanese Office Action dated Apr. 16, 2021 in TW Application No. 106140690.
Third-Party Submission dated Feb. 2, 2015 and Feb. 18, 2015 PTO Notice re Third-Party Submission for U.S. Appl. No. 13/772,969.
TW Office Action dated Sep. 28, 2022, in Application No. TW111130926 with English translation.
U.S. Notice of Allowance dated Jan. 11, 2023 in U.S. Appl. No. 16/946,947.
US Final Office Action dated Apr. 30, 2012 in U.S. Appl. No. 13/049,750.
U.S. Final Office Action dated Aug. 19, 2013 in U.S. Appl. No. 13/049,756.
US Final Office Action dated Feb. 26, 2015 in U.S. Appl. No. 13/479,137.
US Final Office Action dated Feb. 8, 2018 in U.S. Appl. No. 14/391,122.
US Final Office Action dated Jan. 27, 2014 in U.S. Appl. No. 13/479,137.
U.S. Final Office Action dated Jul. 2, 2015 in U.S. Appl. No. 13/049,756.

(56) References Cited

OTHER PUBLICATIONS

US Final Office Action dated Jul. 3, 2017 in U.S. Appl. No. 14/391,122.
US Final Office Action dated May 15, 2014 in U.S. Appl. No. 13/449,251.
US Final Office Action dated May 16, 2014 in U.S. Appl. No. 13/449,248.
US Final Office Action dated Nov. 20, 2018 in U.S. Appl. No. 14/391,122.
US Final Office Action dated Nov. 5, 2020 in U.S. Appl. No. 16/096,557.
U.S. Non-Final office Action dated Jan. 20, 2023 in U.S. Appl. No. 17/249,148.
U.S. Non-Final office Action dated Nov. 15, 2022 in U.S. Appl. No. 17/355,086.
U.S. Non-Final office Action dated Sep. 9, 2022 in U.S. Appl. No. 16/946,947.
US Notice of Allowance dated Apr. 13, 2015 in U.S. Appl. No. 14/657,380.
U.S. Notice of Allowance dated Dec. 20, 2022 in U.S. Appl. No. 16/946,947.
U.S. Notice of Allowance dated Feb. 14, 2023 in U.S. Appl. No. 17/355,086.
US Notice of Allowance dated Jan. 10, 2014 in U.S. Appl. No. 13/449,235.
US Notice of Allowance dated Jan. 13, 2021 in U.S. Appl. No. 16/096,557.
US Notice of Allowance dated Jan. 22, 2015 in U.S. Appl. No. 13/682,618.
US Notice of Allowance dated Jul. 20, 2012 in U.S. Appl. No. 13/049,623.
US Notice of Allowance dated Jun. 17, 2014 in U.S. Appl. No. 13/309,990.
US Notice of Allowance dated Mar. 11, 2019 in U.S. Appl. No. 14/391,122.
US Notice of Allowance dated Mar. 26, 2021 in U.S. Appl. No. 16/254,434.
US Notice of Allowance dated May 14, 2015 in U.S. Appl. No. 13/479,137.
US Notice of Allowance dated May 8, 2012 in U.S. Appl. No. 13/049,750.
US Notice of Allowance (supplemental) dated Jun. 12, 2015 in U.S. Appl. No. 13/479,137.
US Office Action dated Dec. 24, 2013 in U.S. Appl. No. 13/309,990.
US Office Action dated Feb. 24, 2015 in U.S. Appl. No. 14/163,026.
US Office Action dated Feb. 3, 2012 in U.S. Appl. No. 13/049,750.
US Office Action dated Jan. 16, 2015 in U.S. Appl. No. 14/468,778.
U.S. Office Action dated Jan. 18, 2013 in U.S. Appl. No. 13/049,756.
US Office Action dated Jul. 3, 2014 in U.S. Appl. No. 13/479,137.
US Office Action dated Jun. 22, 2018 in U.S. Appl. No. 14/391,122.
US Office Action dated Jun. 3, 2015 in U.S. Appl. No. 13/449,251.
US Office Action dated Mar. 27, 2012 in U.S. Appl. No. 13/049,623.
US Office Action dated May 18, 2020 in U.S. Appl. No. 16/096,557.
US Office Action dated Nov. 18, 2016 in U.S. Appl. No. 14/391,122.
US Office Action dated Nov. 29, 2013 in U.S. Appl. No. 13/449,248.
US Office Action dated Nov. 29, 2013 in U.S. Appl. No. 13/449,251.
US Office Action dated Oct. 11, 2013 in U.S. Appl. No. 13/449,235.
US Office Action dated Oct. 28, 2014 in U.S. Appl. No. 13/449,251.
U.S. Office Action dated Oct. 6, 2014 in U.S. Appl. No. 13/049,756.
US Office Action dated Sep. 1, 2017 in U.S. Appl. No. 14/391,122.
US Office Action dated Sep. 15, 2014 in U.S. Appl. No. 13/682,618.
US Office Action dated Sep. 23, 2013 in U.S. Appl. No. 13/479,137.
US Office Action dated Sep. 29, 2014 in U.S. Appl. No. 13/449,248.
US Office Action dated Sep. 30, 2020 in U.S. Appl. No. 16/254,434.
U.S. Appl. No. 14/468,778, filed Aug. 26, 2014.

\* cited by examiner

AUTOMATED COMMISSIONING OF CONTROLLERS IN A WINDOW NETWORK

CROSS-REFERENCE TO RELATED APPLICATIONS

An Application Data Sheet is filed concurrently with this specification as part of the present application. Each application that the present application claims benefit of or priority to as identified in the concurrently filed Application Data Sheet is incorporated by reference herein in its entirety and for all purposes.

BACKGROUND

Electrochromism is a phenomenon in which a material exhibits a reversible electrochemically-mediated change in an optical property when placed in a different electronic state, typically by being subjected to a voltage change. The optical property is typically one or more of color, transmittance, absorbance, and reflectance.

Electrochromic materials may be incorporated into, for example, windows for home, commercial and other uses as thin film coatings on the window glass. The color, transmittance, absorbance, and/or reflectance of such windows may be changed by inducing a change in the electrochromic material, for example, electrochromic windows are windows that can be darkened or lightened electronically. A small voltage applied to an electrochromic device (EC) of the window will cause them to darken; reversing the voltage polarity causes them to lighten. This capability allows control of the amount of light that passes through the windows, and presents an opportunity for electrochromic windows to be used as energy-saving devices.

While electrochromism was discovered in the 1960's, electrochromic devices, and particularly electrochromic windows, still unfortunately suffer various problems and have not begun to realize their full commercial potential despite many recent advancements in electrochromic technology, apparatus and related methods of making and/or using electrochromic devices. For example, there still remain issues with commissioning electrochromic windows and associated controllers, as well as with user interfaces presenting information about electrochromic windows and associated controllers.

SUMMARY

One aspect of the disclosure pertains to computer program products, on computer readable media storing non-transitory computer executable instructions, for controlling a user interface to provide information about a plurality of optically switchable windows connected by a network. The instructions may be characterized by: (a) receiving a request to display information about one or more of the optically switchable windows provided on a computing device, and (b) displaying on the user interface one or more views that depict one or more smart objects for receiving user input concerning monitoring, grouping, and/or controlling at least some of the plurality of optically switchable windows. The smart objects in (b) may be a graphical representation of one or more of the optically switchable windows. Additionally, the smart objects in (b) may be displayed within the one or more views in a manner that graphically depicts the location of the one or more optically switchable windows in a building.

In some embodiments, the computing device is a wireless device remote from the network.

In some embodiments, the computer program product further comprises instructions for: receiving user instructions for changing the optical state of at least one of the plurality of optically switchable devices; and transmitting the user instructions to the network.

In some embodiments, the computer program product further comprises instructions for: prior to displaying the one or more views, receiving location information comprising the locations in the building of each of the plurality of optically switchable windows.

In some embodiments, the location information is determined by the window network using geo-positioning.

In some embodiments, the computer program product further comprises instructions for: prior to displaying the one or more views, receiving information comprising sizes and orientations of the plurality of optically switchable windows, and wherein displaying the one or more views that depict one or more smart objects comprises depicting each of the one or more smart objects in accordance with window sizes and orientations of the one or more optically switchable windows.

In some embodiments, at least one of the views presents a three-dimensional model of a building with the one or more smart objects overlaid on the model.

In some embodiments, the three-dimensional model is created using locations, sizes, and orientations of the plurality of optically switchable windows.

In some embodiments, at least one of the views presents the one or more smart objects depicted on a two-dimensional floorplan.

In some embodiments, the computer program product further comprises instructions for: prior to displaying the one or more views, receiving information comprising a current tint state of at least one of the optically switchable windows, and wherein displaying the one or more views that depict smart objects comprises depicting the current tint state the at least one optically switchable window.

In some embodiments, the one or more smart objects are designed or configured to be manipulated by a user interaction selected from the group that includes tactile interaction, sound, motion, orientation, and a determined location of the computing device.

In some embodiments, the computer program product further comprises instructions for: receiving a location of the computing device relative to at least one of the plurality of optically switchable windows.

In some embodiments, the computer program product further comprises instructions for: determining an orientation of the computing device with respect to the at least one of the plurality of optically switchable windows.

In some embodiments, the instructions for displaying the one or more views comprise instructions for displaying a subset of the plurality optically switchable windows, which subset of the optically switchable windows is dependent upon the location of the computing device.

In some embodiments, the computer program product further comprises instructions for displaying the one or more views comprise instructions for displaying at least one of the plurality of optically switchable windows in a manner dependent on the location or orientation of the computing device.

In some embodiments, the computer program product further comprises instructions for: receiving instructions from the user to create a customized view; and displaying the customized view.

In some embodiments, the computer program product further comprises instructions for: receiving user manipulation of the one or more smart objects, and providing a user with window information selected from the group consisting of, for the one or more optically switchable windows associated with the smart object: number of applied tint cycles, window manufacturing information, window health information, window dimensions, window type, window serial number, associated window components, window installation job number, window installation date, building information, window façade zoning information, temperature information from an associated temperature sensor, light intensity information from an associated light sensor, humidity information from an associated humidity sensor, and occupancy information from an associated occupancy sensor.

Another aspect of this disclosure pertains to methods of rendering a view displayed on a graphical user interface for a window network of one or more optically switchable windows in which each window is represented by a smart object. The methods may be characterized by: (a) receiving information that includes a window ID and location for each window on the window network; (b) selecting smart objects based upon the window information; (c) selecting a perspective for the view to be depicted in accordance with; and (d) displaying a view in which each selected smart object is placed in accordance with the locations of the optically switchable windows.

In some embodiments, selecting a perspective for the view in (c) comprises selecting a perspective from the group consisting of: a two-dimensional floorplan of a building, a three-dimensional perspective of a building from a vantage point outside the building, a two-dimensional perspective from a vantage point within a room, a three-dimensional perspective from a vantage point from within a room, a two-dimensional perspective that includes a plurality of floors, a perspective from a vantage point corresponding to the location and orientation of the device displaying the graphical user interface, and a custom view created by a user.

In some embodiments, the perspective in (c) is selected based upon user interaction with the graphical user interface.

In some embodiments, the perspective in (c) is selected based upon the position or orientation of a device displaying the graphical user interface.

In some embodiments, the perspective in (c) is selected based upon permissions granted to a user of the graphical user interface.

In some embodiments, the information received in (a) further comprises IDs and locations of one or more non-window components on a window network, and wherein one or more additional smart objects are selected based upon the IDs of the one or more other devices, and where the one or more additional smart objects are displayed in (d) in accordance to their location.

In some embodiments, each of the one or more devices is selected from the group consisting of a temperature sensor, a photosensor, a humidity sensor, an air flow sensor, an occupancy sensor, a window controller, a network controller, and a master controller.

One aspect of this disclosure pertains to methods of associating the network IDs of one or more optically switchable windows with the installed locations of the optically switchable window(s) in a building. In these methods each optically switchable window has a network ID and a transmitter configured for wireless communication. The methods may be characterized by: (a) receiving drawings or another representation of the building that provides locations of the optically switchable windows within or on the building; (b) receiving a wireless communication signal from the transmitter of at least one optically switchable window, that includes or identifies the network ID of the at least one optically switchable window; (c) analyzing the received wireless communication signal to determine the location of the at least one optically switchable window; and (d) comparing the location determined in (c) with the locations of at least some of the windows from the drawings or other building representation received in (a), and associating the network ID of the at least one optically switchable window with a location provided in the drawings or other representations.

In some embodiments, the transmitter of each of the plurality of the optically switchable windows is on or in the optically switchable window.

In some embodiments, the optically switchable window is an insulated glass unit comprising an electrochromic device.

In some embodiments, the wireless communication signal conforms to a wireless protocol selected from the group consisting of pulse-based ultra-wideband, Bluetooth, BLE, and Wi-Fi.

In some embodiments, the wireless communication signal conforms to pulse-based ultra-wideband protocol.

In some embodiments, the wireless communication signal conforms to ECMA-368 or ECMA-369.

In some embodiments, the one or more drawings or other representations comprise an architectural drawing or an interconnect drawing.

In some embodiments, the network ID is a CAN ID.

In some embodiments, the method further comprises storing the association from (d) of the network ID of the at least one optically switchable window with the one location provided in the one or more drawings or other representations.

In some embodiments, storing the association from (d) comprises storing the association from (d) in a network configuration file.

In some embodiments, the network configuration file is stored in memory at a location selected from the group consisting of a master controller, a network controller, a remote wireless device, and the cloud.

In some embodiments, the transmitter comprises an antenna is disposed on a window controller affixed to the window.

In some embodiments, the window controller is configured to issue pulse-based ultra-wideband communication signals.

In some embodiments, the transmitter is part of a micro-location chip.

In some embodiments, wherein the micro-location chip is configured to transmit the wireless communication signal in a manner permitting identification of the position of a micro-location chip to within about 10 centimeters or less.

In some embodiments, the one or more drawings or other representations in (a) further comprise locations of one or more non-window components, and wherein the one or more non-window components have a network ID and a transmitter for wireless communication, the method further comprising: receiving a wireless communication signal from the transmitter of at least one non-window component, wherein the communication includes the network ID of the at least one non-window component; analyzing the received wireless communication signal to determine the location of the at least one non-window component; and comparing the determined location of the at least one non-window component with the locations of the plurality of non-window components provided by the one or more drawings or representations in (a), and associating the network ID of the at least one non-window component with one location provided in the one or more drawings or other representations.

In some embodiments, the at least one non-window component is a master controller or a network controller of a window controller network.

Another aspect of this disclosure pertains to systems for associating network IDs of optically switchable windows with installed locations of optically switchable windows in a building. In these systems each optically switchable window has a network ID and a transmitter configured for wireless communication. The systems may be characterized by a window network comprising a plurality of optically switchable windows having transmitters that are installed at locations in or on a building and having transmitters and commissioning logic. The commissioning logic may be configured to execute the following operations: (a) receive one or more drawings or other representations of the building that provide the locations of the plurality of optically switchable windows within the building; (b) receive a wireless communication signal from the transmitter of at least one of the plurality of optically switchable windows, where the communication includes or identifies the network ID of the at least one optically switchable window; (c) analyze the received wireless communication signal to determine the location of the at least one optically switchable window; and (d) compare the location determined in (c) with the locations of at least some of the plurality of optically switchable windows from the one or more drawings or other representations received in (a), and associate the network ID of the at least one optically switchable window with one location provided in the one or more drawings or other representations.

In some embodiments, the transmitter of each of the optically switchable windows is configured for wireless communication using a wireless protocol selected from the group consisting of pulse-based ultra-wideband, Bluetooth, BLE, and Wi-Fi.

In some embodiments, the transmitter of each of the optically switchable windows is configured for wireless communication using a pulse-based ultra-wideband protocol.

In some embodiments, the transmitter of each of the optically switchable windows is configured for wireless communication using ECMA-368 or ECMA-369.

In some embodiments, the window network further comprises non-window components having a network ID and a transmitter for wireless communication, and wherein the commissioning logic is further configured to execute the following operations: receive a wireless communication signal from the transmitter of at least one non-window component, wherein the communication includes the network ID of the at least one non-window component; analyze the received wireless communication signal to determine the location of the at least one non-window component; and compare the determined location of the at least one non-window component with the locations of the plurality of non-window components provided by the one or more drawings or representations in (a), and associating the network ID of the at least one non-window component with one location provided in the one or more drawings or other representations.

Another aspect of the present disclosure pertains to a method for generating a graphical user interface of a computer program product for displaying one or more optically switchable windows on a window network. The method includes operations (a) through (e). In operation (a) a three-dimensional model of a building is received where the building model is at least partially defined by a plurality of surfaces, each surface having a node ID. In operation (b) information is received that includes a network ID for each of the optically switchable windows. In operation (c) the network ID of each of the optically switchable windows is paired with at least one node ID. In operation (d) one or more smart objects are defined that represent the optically switchable windows, where each smart object provides information regarding the optically switchable windows. Finally, in operation (e), the three-dimensional model and the smart objects are displayed on an electronic device.

In some cases, the three-dimensional model of a building is produced by a computer-aided design software which has a modeling environment for the design and examination of building structures. In some cases, pairing the network ID of each of the optically switchable windows with at least one node ID includes storing each pairing in a network configuration file.

In some cases, each smart object is configured to receive user input for controlling the optically switchable windows, and the method further includes operations of receiving user instructions for controlling at least one of the optically switchable windows via a smart object, and transmitting user instructions for controlling at least one of the optically switchable windows to a master controller.

In some cases, the received information includes location information for each of the optically switchable windows, and pairing the network ID of each of the windows with at least one node ID includes executing logic that compares the location information with a location of at least one of the plurality of surfaces within the three-dimensional model.

In some cases, pairing the network ID of each of the optically switchable windows with at least one node ID is performed via user selection after displaying the three-dimensional model.

In some cases, the three-dimensional model is generated by analyzing electromagnetic signals generated by a wireless powering transmission system in an interior region of the building. The wireless powering transmission system may be, in some cases, a subsystem of the window network.

These and other features of the disclosed embodiments will be described more fully with reference to the associated drawings.

DETAILED DESCRIPTION

Introduction

Figure 1:
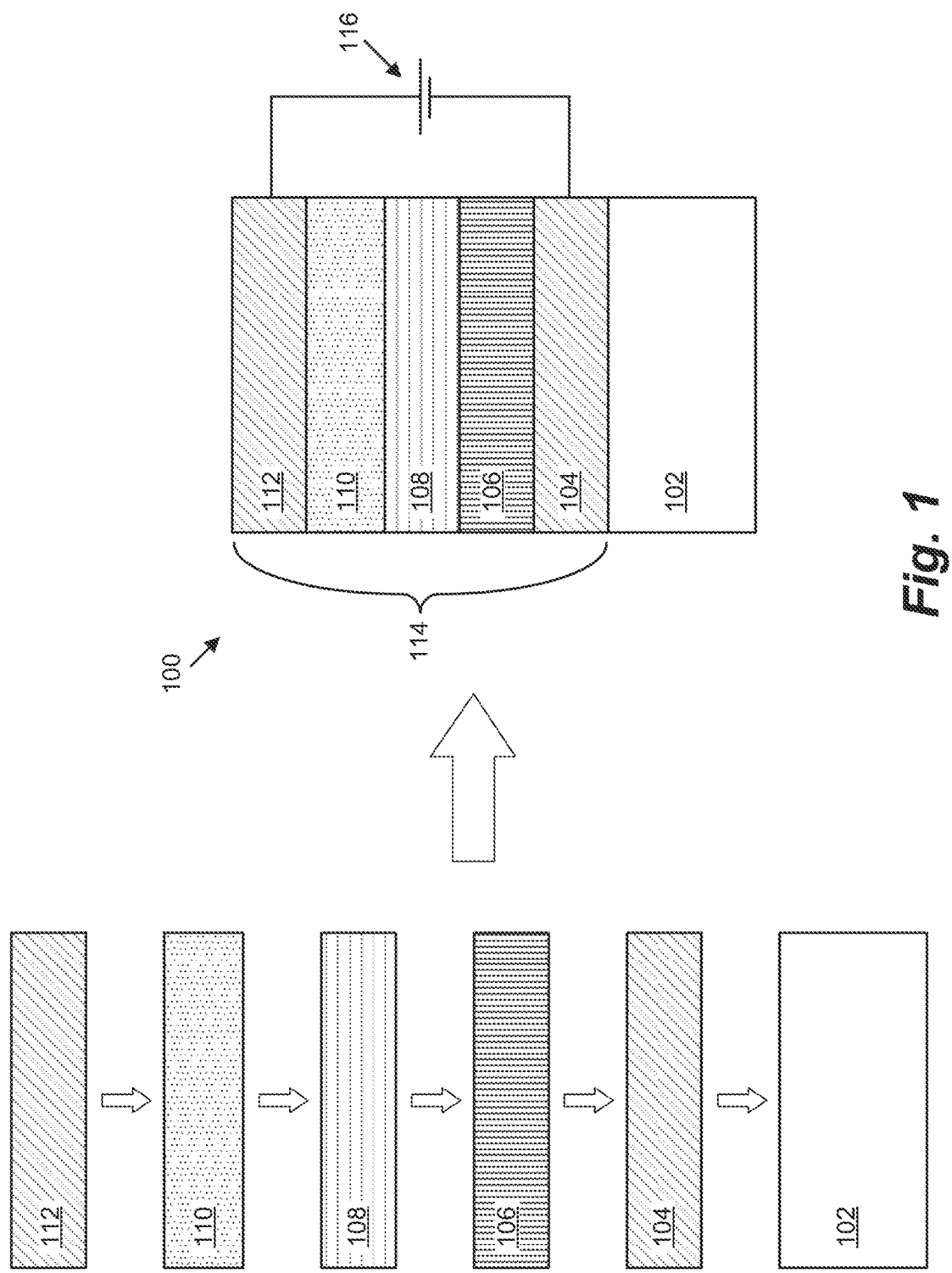
FIG. 1 is a schematic cross-section depicting conventional formation of an electrochromic device stack.

The following detailed description is directed to certain embodiments or implementations for the purposes of describing the disclosed aspects. However, the teachings herein can be applied and implemented in a multitude of different ways. In the following detailed description, references are made to the accompanying drawings. Although the disclosed implementations are described in sufficient detail to enable one skilled in the art to practice the implementations, it is to be understood that these examples are not limiting; other implementations may be used and changes may be made to the disclosed implementations without departing from their spirit and scope. Furthermore, while the disclosed embodiments focus on electrochromic windows (also referred to as smart windows), the concepts disclosed herein may apply to other types of switchable optical devices including, for example, liquid crystal devices and suspended particle devices, among others. For example, a liquid crystal device or a suspended particle device, rather than an electrochromic device, could be incorporated into some or all of the disclosed implementations. Additionally, the conjunction "or" is intended herein in the inclusive sense where appropriate unless otherwise indicated; for example, the phrase "A, B or C" is intended to include the possibilities of "A," "B," "C," "A and B," "B and C," "A and C" and "A, B and C." The terminology "designed to," "adapted to," "configured to," "programmed to", "operable to", and "capable of" may be used interchangeably where appropriate. Such terminology is not intended to invoke 35 U.S.C. 112 (f). Further, as used herein, the terms pane, lite, and substrate are used interchangeably. An electrochromic window may be in the form of an IGU, a laminate structure or both, i.e., where an IGU has one or more laminated panes as its lites, e.g., a double pane IGU where one pane is a single sheet of glass and the other pane is a laminate of two sheets of glass. A laminate may have two, three or more sheets of glass.

Electrochromic windows may be used in a variety of settings, for example in office buildings and residential buildings. The complexity of many conventional electrochromic windows (e.g., wiring, installation and programming of a controller, etc.) may discourage their use. For example, residential customers are likely to have windows installed by local contractors who may be unfamiliar with electrochromic windows and their installation requirements. As such, one goal in certain disclosed embodiments is to provide electrochromic IGUs and window assemblies that are as easy to install as non-electrochromic windows. Certain disclosed features that promote easy installation include wireless power capability and/or self-power capability, wireless control communication, self-meshing networks, on-board controllers, automated commissioning, and a form factor matching commonly available windows, e.g., double-pane or triple-pane IGUs. Other features that may be included in various embodiments include, but are not limited to, cellular or other antennas provided on a window, a cellular repeater in a controller, touch panel controls, mountable/removable controllers, learning functionality, weather tracking, sharing of sensor outputs and other control information between windows, sub-frames that may include certain controller components, wireless bus bars, built-in photo sensors and other sensors, etc. Any two or more of these features may be combined as desired for a particular application.

A challenge presented by nascent electrochromic window technology is correct assignment of network addresses and/or other identifying information to specific windows and their electrical controllers (window controllers), as well as the locations of the windows and/or window controllers in buildings. In order for tint controls to work (i.e. to allow the window control system to change the tint state of one or a set of specific windows or IGUs), a master controller (and/or other controller responsible for tint decisions) must know the network address of the window controller(s) connected to that specific window or set of windows.

Another challenge presented by electrochromic window technology is manual control of electrochromic device tint states in specific windows of a building having many such windows. Related to this is access to information about individual electrochromic windows or zones in a building having many windows. Both building administrators and occupants need at least some control over some or all electrochromic windows in a building.

In some embodiments, an IGU or other window assembly is provided as a simple, self-contained, ready-to-go unit that requires at most minimal physical connection (e.g., wires) before use. Such a unit can look like a conventional non-electrochromic IGU or window assembly (with a controller somewhere therein or thereon) and may be installed in substantially the same manner as a conventional IGU. These embodiments are particularly beneficial for residential customers who desire a quick install without significant additional work related to routing electrical power, communication lines, etc.

Electrochromic Device Structure

FIG. 1 depicts a conventional electrochromic device 100 disposed on a substrate 102. Device 100 includes, in the following order starting from the substrate, a first conductive layer 104, a first electrochromic layer (EC1) 106, an ion conductor layer (IC) 108, a second electrochromic layer (EC2) 110, and a second conductive layer 112. Components 104, 106, 108, 110, and 112 are collectively referred to as an electrochromic stack 114. In certain embodiments, the transparent conductor layers are made of a transparent material such as a transparent conductive oxide, which may be referred to as a "TCO." Since the TCO layers are transparent, the tinting behavior of the EC1-IC-EC2 stack is observable through the TCO layers, for example, allowing use of such devices on a window for reversible shading. A voltage source 116, operable to apply an electric potential across electrochromic stack 114, effects the transition of the electrochromic device from, for example, a clear state (i.e., transparent) to a tinted state. In certain embodiments, the electrochromic device does not include a distinct ion conductor layer. See U.S. Pat. No. 8,764,950 issued Jul. 1, 2014, and PCT Publication No. WO2015/168626, field May 1, 2015, both of which are incorporated herein by reference in their entireties.

In conventional devices such as those depicted in FIG. 1 as well as in certain devices of this disclosure, one of the first and second electrochromic layers is typically a cathodically tinting layer and the other is an anodically tinting layer. In such embodiments, the first and second electrochromic layers will tint when exposed to opposite polarities. For example, the first electrochromic layer may tint under an applied cathodic potential (and clear under an applied anodic potential), while the second electrochromic layer may tint under an applied anodic potential (and clear under an applied cathodic potential). Of course, the arrangement can be reversed for some applications. Either way, the first and second electrochromic layers work in concert to tint and clear.

In some embodiments, one of the first and second electrochromic layers can be substituted with a non-electrochromic ion storage layer. In such cases, only one of the two layers exhibits electrochromism such that it tints and clears under application of suitable potentials. The other layer, sometimes referred to as a counter electrode layer, simply serves as an ion reservoir when the other layer is exposed to a cathodic potential.

While FIG. 1 depicts a general electrochromic device structure, the structure is not meant to be limiting. For example, while FIG. 1 depicts a device stack having distinct layers, electrochromic stacks may be graded structures or may include additional components such as an antenna structure. While most of the discussion in the present disclosure focuses on windows having electrochromic devices, the disclosure more generally pertains to windows having any type of optically switchable device such as liquid crystal devices and suspended particle devices.

Window Controllers

Window controllers as described herein may have many sizes, formats, and locations with respect to the optically switchable windows they control. Typically the controller will be attached to glass of an IGU or laminate but may be in a frame that houses the IGU or laminate. An electrochromic window may include one, two, three or more individual electrochromic panes (an electrochromic device on a transparent substrate). Also, an individual pane of an electrochromic window may have an electrochromic coating that has independently tintable zones. A controller as described herein can control all electrochromic coatings associated with such windows, whether the electrochromic coating is monolithic or zoned.

The controller is generally configured in close proximity to the electrochromic window, generally adjacent to, on the glass or inside an IGU, within a frame of the self-contained assembly, for example. In some embodiments, the window controller is an "in situ" controller; that is, the controller is part of a window assembly, an IGU or a laminate, and may not have to be matched with the electrochromic window, and installed, in the field, e.g., the controller travels with the window as part of the assembly from the factory. The controller may be installed in the window frame of a window assembly, or be part of an IGU or laminate assembly, for example, mounted on or between panes of the IGU or on a pane of a laminate. In cases where a controller is located on the visible portion of an IGU, at least a portion of the controller may be substantially transparent. Further examples of on glass controllers are provided in U.S. patent application Ser. No. 14/951,410, filed Nov. 14, 2015, and titled "SELF CONTAINED EC IGU," which is herein incorporated by reference in its entirety.F In some embodiments, a localized controller may be provided as more than one part, with at least one part (e.g., including a memory component storing information about the associated electrochromic window) being provided as a part of the window assembly and at least one other part being separate and configured to mate with the at least one part that is part of the window assembly, IGU or laminate. In certain embodiments, a controller may be an assembly of interconnected parts that are not in a single housing, but rather spaced apart, e.g., in the secondary seal of an IGU. In other embodiments the controller is a compact unit, e.g., in a single housing or in two or more components that combine, e.g., a dock and housing assembly, that is proximate the glass, not in the viewable area, or mounted on the glass in the viewable area.

In one embodiment, the controller is incorporated into or onto the IGU and/or the window frame prior to installation of the electrochromic window. In one embodiment, the controller is incorporated into or onto the IGU and/or the window frame prior to leaving the manufacturing facility. In one embodiment, the controller is incorporated into the IGU, substantially within the secondary seal. In another embodiment, the controller is incorporated into or onto the IGU, partially, substantially, or wholly within a perimeter defined by the primary seal between the sealing separator and the substrate.

Having the controller as part of an IGU and/or a window assembly, the IGU can possess logic and features of the controller that, e.g., travels with the IGU or window unit. For example, when a controller is part of the IGU assembly, in the event the characteristics of the electrochromic device(s) change over time (e.g., through degradation), a characterization function can be used, for example, to update control parameters used to drive tint state transitions. In another example, if already installed in an electrochromic window unit, the logic and features of the controller can be used to calibrate the control parameters to match the intended installation, and for example if already installed, the control parameters can be recalibrated to match the performance characteristics of the electrochromic pane(s).

In other embodiments, a particular controller is not pre-associated with a window, but rather a dock component, e.g., having parts generic to any electrochromic window, is associated with each window at the factory. After window installation, or otherwise in the field, a second component of the controller is combined with the dock component to complete the electrochromic window controller assembly. The dock component may include a chip which is programmed at the factory with the physical characteristics and parameters of the particular window to which the dock is attached (e.g., on the surface which will face the building's interior after installation, sometimes referred to as surface 4 or "S4"). The second component (sometimes called a "carrier," "casing," "housing," or "controller") is mated with the dock, and when powered, the second component can read the chip and configure itself to power the window according to the particular characteristics and parameters stored on the chip. In this way, the shipped window need only have its associated parameters stored on a chip, which is integral with the window, while the more sophisticated circuitry and components can be combined later (e.g., shipped separately and installed by the window manufacturer after the glazier has installed the windows, followed by commissioning by the window manufacturer). Various embodiments will be described in more detail below. In some embodiments, the chip is included in a wire or wire connector attached to the window controller. Such wires with connectors are sometimes referred to as pigtails.

In this application, an "IGU" includes two (or more) substantially transparent substrates, for example, two panes of glass, where at least one substrate includes an electrochromic device disposed thereon, and the panes have a separator disposed between them. An IGU is typically hermetically sealed, having an interior region that is isolated from the ambient environment. A "window assembly" may include an IGU or for example a stand-alone laminate, and includes electrical leads for connecting the IGU's or laminate's one or more electrochromic devices to a voltage source, switches and the like, and may include a frame that supports the IGU or laminate. A window assembly may include a window controller as described herein, and/or components of a window controller (e.g., a dock).

As used herein, the term outboard means closer to the outside environment, while the term inboard means closer to the interior of a building. For example, in the case of an IGU having two panes, the pane located closer to the outside environment is referred to as the outboard pane or outer pane, while the pane located closer to the inside of the building is referred to as the inboard pane or inner pane. The different surfaces of the IGU may be referred to as S1, S2, S3, and S4 (assuming a two-pane IGU). S1 refers to the exterior-facing surface of the outboard lite (i.e., the surface that can be physically touched by someone standing outside). S2 refers to the interior-facing surface of the outboard lite. S3 refers to the exterior-facing surface of the inboard lite. S4 refers to the interior-facing surface of the inboard lite (i.e., the surface that can be physically touched by someone standing inside the building). In other words, the surfaces are labeled S1-S4, starting from the outermost surface of the IGU and counting inwards. In cases where an IGU includes three panes, this same trend holds (with S6 being the surface that can be physically touched by someone standing inside the building). In certain embodiments employing two panes, the electrochromic device (or other optically switchable device) is disposed on S3.

Figure 2A:
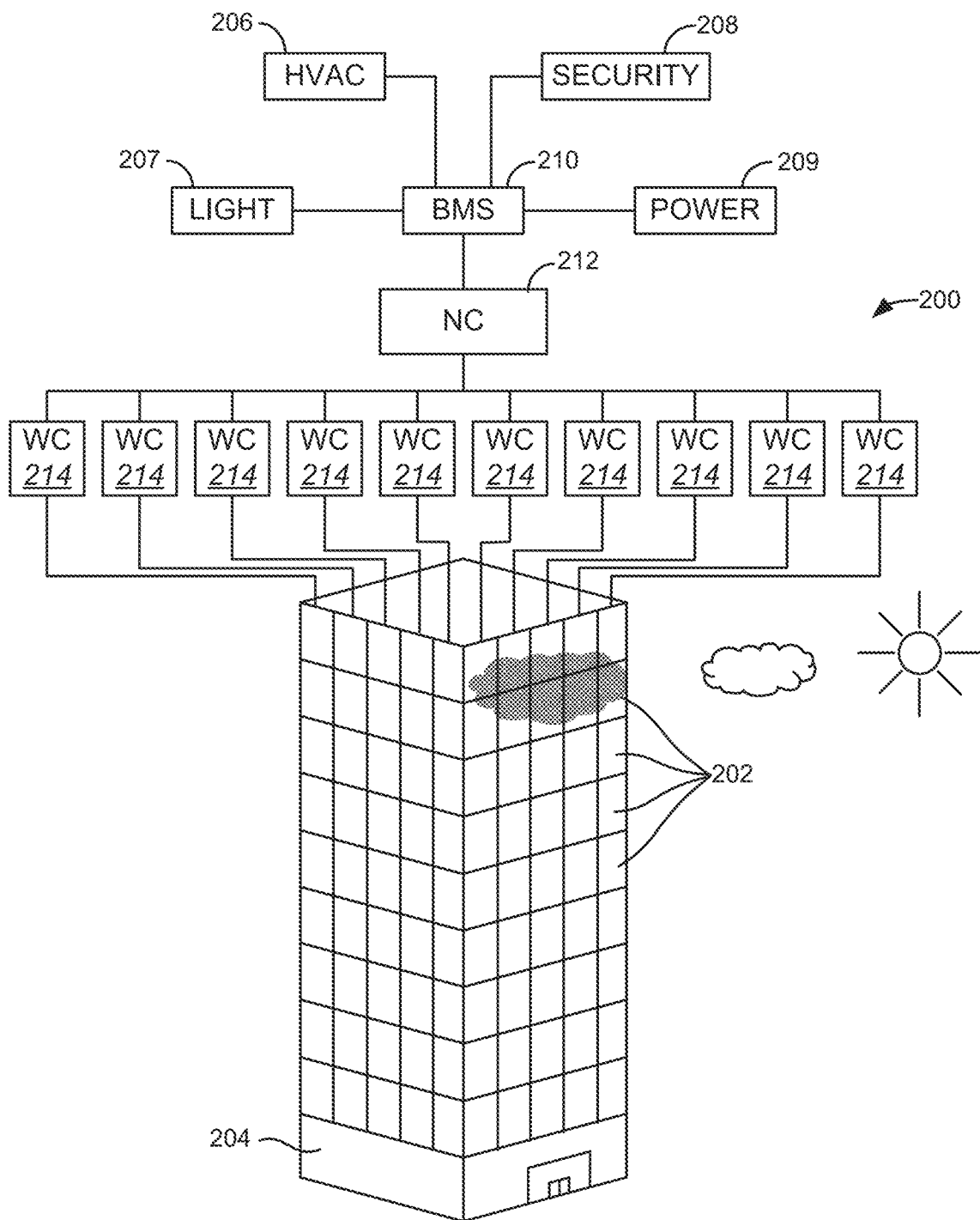
FIG. 2A shows a depiction of an example system for controlling and driving a plurality of electrochromic windows.

Further examples of window controllers and their features are presented in U.S. Provisional Patent Application No. 62/248,181, filed Oct. 29, 2015, and titled "METHOD OF COMMISSIONING ELECTROCHROMIC WINDOWS," and U.S. Provisional Patent Application No. 62/305,892, filed Mar. 9, 2016, and titled "METHOD OF COMMISSIONING ELECTROCHROMIC WINDOWS," each of which is herein incorporated by reference in its entirety Window Controller Networks FIG. 2A shows a depiction of an example system 200 for controlling and driving a plurality of electrochromic windows 202. It may also be employed to control the operation of one or more devices associated with an electrochromic window such as a window antenna. The system 200 can be adapted for use with a building 204 such as a commercial office building or a residential building. In some implementations, the system 200 is designed to function in conjunction with modern heating, ventilation, and air conditioning (HVAC) systems 206, interior lighting systems 207, security systems 208 and power systems 209 as a single holistic and efficient energy control system for the entire building 204, or a campus of buildings 204. Some implementations of the system 200 are particularly well-suited for integration with a building management system (BMS) 210. The BMS 210 is a computer-based control system that can be installed in a building to monitor and control the building's mechanical and electrical equipment such as HVAC systems, lighting systems, power systems, elevators, fire systems, and security systems. The BMS 210 can include hardware and associated firmware or software for maintaining conditions in the building 204 according to preferences set by the occupants or by a building manager or other administrator. The software can be based on, for example, internet protocols or open standards.

A BMS can typically be used in large buildings where it functions to control the environment within the building. For example, the BMS 210 can control lighting, temperature, carbon dioxide levels, and humidity within the building 204. There can be numerous mechanical or electrical devices that are controlled by the BMS 210 including, for example, furnaces or other heaters, air conditioners, blowers, and vents. To control the building environment, the BMS 210 can turn on and off these various devices according to rules or in response to conditions. Such rules and conditions can be selected or specified by a building manager or administrator, for example. One primary function of the BMS 210 is to maintain a comfortable environment for the occupants of the building 204 while minimizing heating and cooling energy losses and costs. In some implementations, the BMS 210 can be configured not only to monitor and control, but also to optimize the synergy between various systems, for example, to conserve energy and lower building operation costs.

Some implementations are alternatively or additionally designed to function responsively or reactively based on feedback sensed through, for example, thermal, optical, or other sensors or through input from, for example, an HVAC or interior lighting system, or an input from a user control. Further information may be found in U.S. Pat. No. 8,705, 162, issued Apr. 22, 2014, which is incorporated herein by reference in its entirety. Some implementations also can be utilized in existing structures, including both commercial and residential structures, having traditional or conventional HVAC or interior lighting systems. Some implementations also can be retrofitted for use in older residential homes.

The system 200 includes a network controller 212 configured to control a plurality of window controllers 214. For example, the network controller 212 can control tens, hundreds, or even thousands of window controllers 214. Each window controller 214, in turn, can control and drive one or more electrochromic windows 202. In some implementations, the network controller 212 issues high level instructions such as the final tint state of an electrochromic window and the window controllers receive these commands and directly control their windows by applying electrical stimuli to appropriately drive tint state transitions and/or maintain tint states. The number and size of the electrochromic windows 202 that each window controller 214 can drive is generally limited by the voltage and current characteristics of the load on the window controller 214 controlling the respective electrochromic windows 202. In some implementations, the maximum window size that each window controller 214 can drive is limited by the voltage, current, or power requirements to cause the desired optical transitions in the electrochromic window 202 within a desired timeframe. Such requirements are, in turn, a function of the surface area of the window. In some implementations, this relationship is nonlinear. For example, the voltage, current, or power requirements can increase nonlinearly with the surface area of the electrochromic window 202. For example, in some cases the relationship is nonlinear at least in part because the sheet resistance of the first and second conductive layers 214 and 216 (see, for example, FIG. 2A) increases nonlinearly with distance across the length and width of the first or second conductive layers. In some implementations, the relationship between the voltage, current, or power requirements required to drive multiple electrochromic windows 202 of equal size and shape is, however, directly proportional to the number of the electrochromic windows 202 being driven.

Figure 2B:
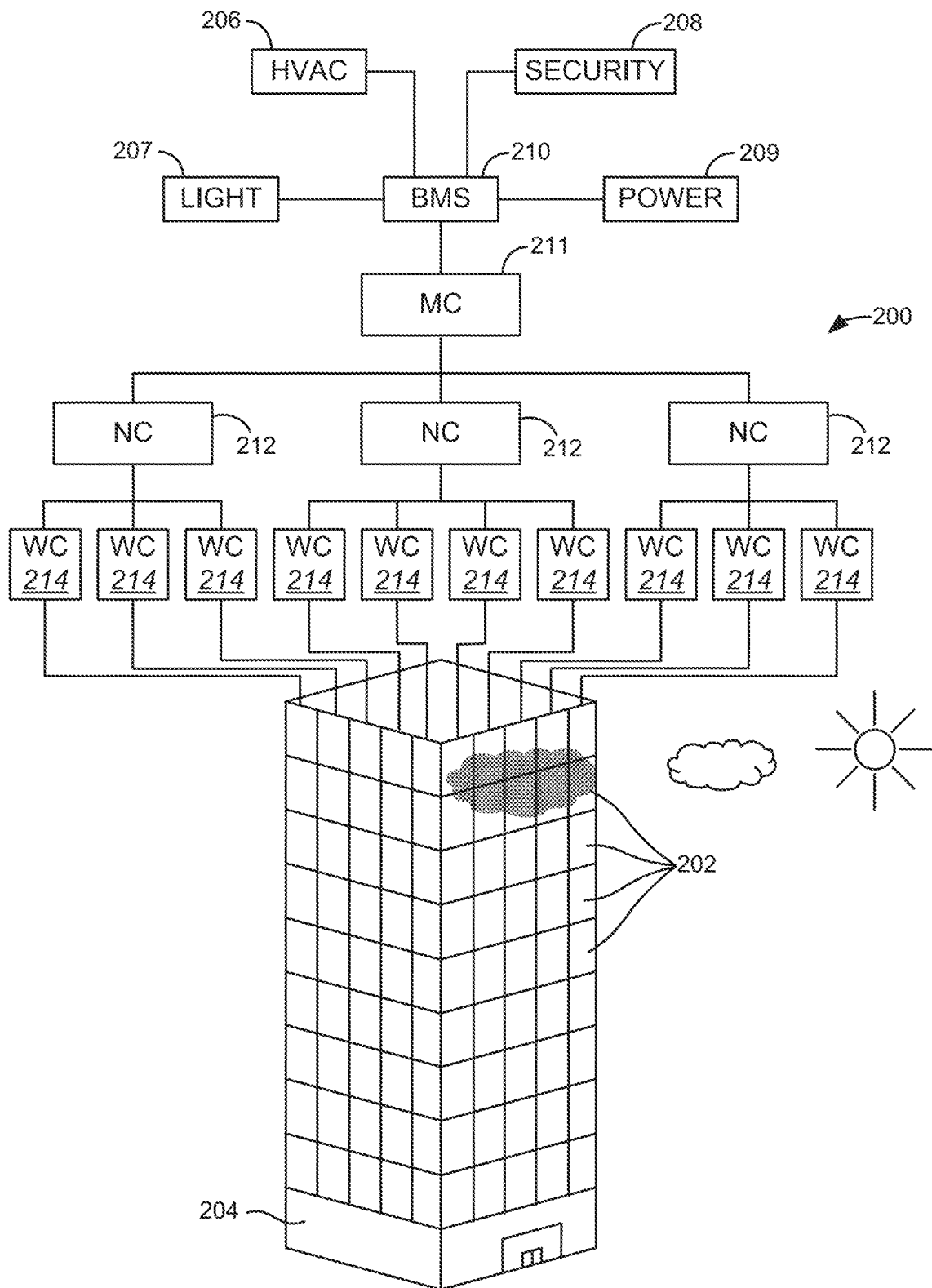
FIG. 2B shows a depiction of another example system for controlling and driving a plurality of electrochromic windows.

FIG. 2B depicts another example system 200 for controlling and driving a plurality of electrochromic windows 202. The system 200 shown in FIG. 2B is similar to the system 200 shown in FIG. 2A. In contrast to the system of FIG. 2A, the system 200 shown in FIG. 2B includes a master controller 211. The master controller 211 communicates and functions in conjunction with multiple network controllers 212, each of which network controllers 212 is capable of addressing a plurality of window controllers 214 as described with reference to FIG. 2A. In some implementations, the master controller 211 issues the high level instructions (such as the final tint states of the electrochromic windows) to the network controllers 212, and the network controllers 212 then communicate the instructions to the corresponding window controllers 214.

In some implementations, the various electrochromic windows 202 and/or antennas of the building or other structure are advantageously grouped into zones or groups of zones, each of which includes a subset of the electrochromic windows 202. For example, each zone may correspond to a set of electrochromic windows 202 in a specific location or area of the building that should be tinted (or otherwise transitioned) to the same or similar optical states based on their location. As a more specific example, consider a building having four faces or sides: a North face, a South face, an East Face and a West Face. Consider also that the building has ten floors. In such a didactic example, each zone can correspond to the set of electrochromic windows 202 on a particular floor and on a particular one of the four faces. In some such implementations, each network controller 212 can address one or more zones or groups of zones. For example, the master controller 211 can issue a final tint state command for a particular zone or group of zones to a respective one or more of the network controllers 212. For example, the final tint state command can include an abstract identification of each of the target zones. The designated network controllers 212 receiving the final tint state command can then map the abstract identification of the zone(s) to the specific network addresses of the respective window controllers 214 that control the voltage or current profiles to be applied to the electrochromic windows 202 in the zone(s).

In embodiments where at least some of the electrochromic windows have antennas, zones of windows for tinting purposes may or may not correspond to zones for antenna-related functions. For example, a master and/or network controller may identify two distinct zones of windows for tinting purposes, e.g. two floors of windows on a single side of a building, where each floor has different tinting algorithms based on customer preferences. In some implementations, zoning is implemented in a hierarchy of three or more tiers; e.g., at least some windows of a building are grouped into zones, and at least some zones are divided into subzones, with each subzone subject to different control logic and/or user access.

Figure 2C:
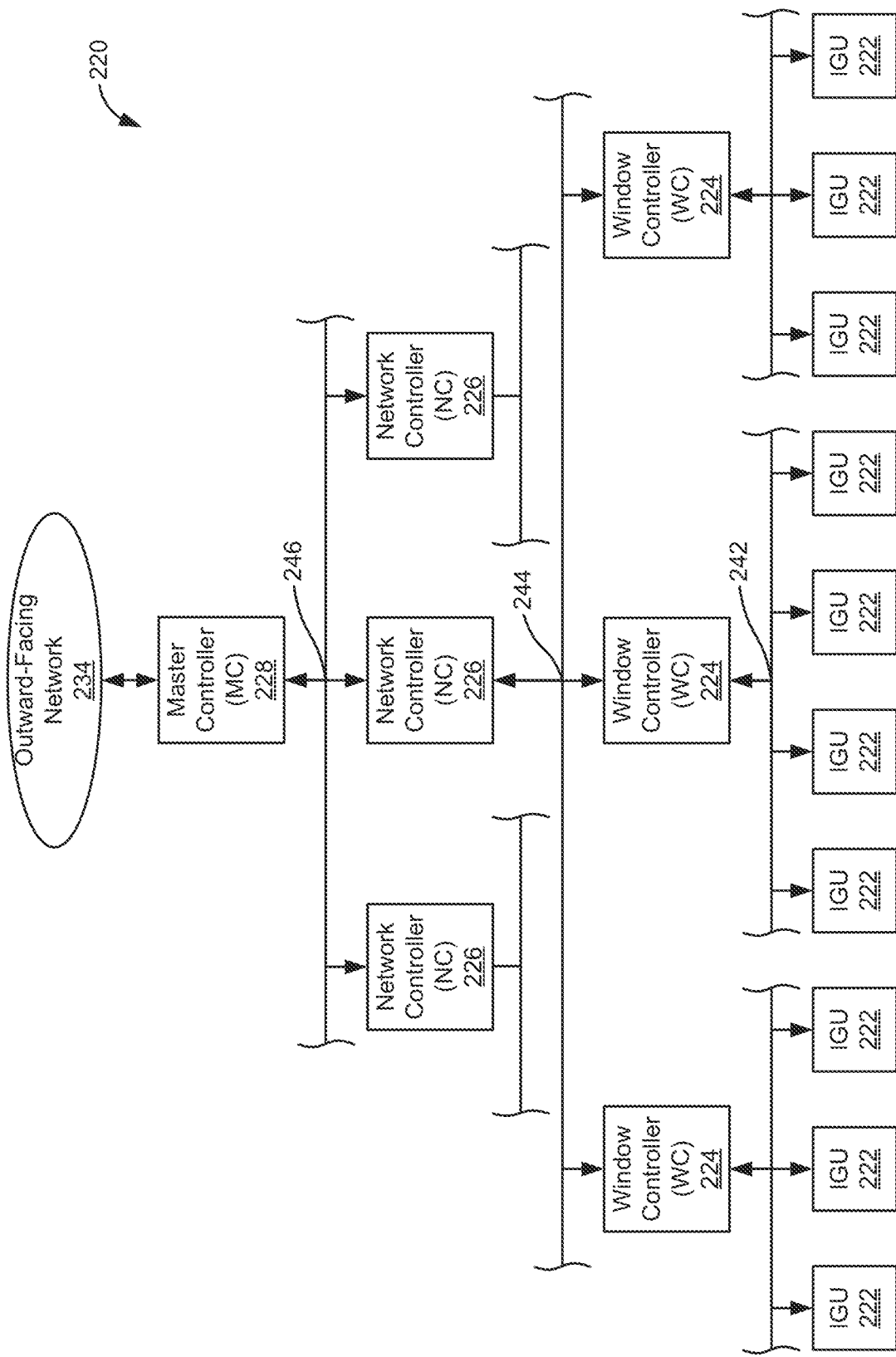
FIG. 2C shows a block diagram of an example network system, operable to control a plurality of IGUs in accordance with some implementations.

In many instances, optically-switchable windows can form or occupy substantial portions of a building envelope. For example, the optically-switchable windows can form substantial portions of the walls, facades and even roofs of a corporate office building, other commercial building or a residential building. In various implementations, a distributed network of controllers can be used to control the optically-switchable windows. FIG. 2C shows a block diagram of an example network system, 220, operable to control a plurality of IGUs 222 in accordance with some implementations. One primary function of the network system 220 is controlling the optical states of the electrochromic devices (or other optically-switchable devices) within the IGUs 222. In some implementations, one or more of the windows 222 can be multi-zoned windows, for example, where each window includes two or more independently controllable electrochromic devices or zones. In various implementations, the network system 220 is operable to control the electrical characteristics of the power signals provided to the IGUs 222. For example, the network system 220 can generate and communicate tinting instructions (also referred to herein as "tint commands") to control voltages applied to the electrochromic devices within the IGUs 222.

In some implementations, another function of the network system 220 is to acquire status information from the IGUs 222 (hereinafter "information" is used interchangeably with "data"). For example, the status information for a given IGU can include an identification of, or information about, a current tint state of the electrochromic device(s) within the IGU. The network system 220 also can be operable to acquire data from various sensors, such as temperature sensors, photosensors (also referred to herein as light sensors), humidity sensors, air flow sensors, or occupancy sensors, antennas, whether integrated on or within the IGUs 222 or located at various other positions in, on or around the building.

The network system 220 can include any suitable number of distributed controllers having various capabilities or functions. In some implementations, the functions and arrangements of the various controllers are defined hierarchically. For example, the network system 220 includes a plurality of distributed window controllers (WCs) 224, a plurality of network controllers (NCs) 226, and a master controller (MC) 228. In some implementations, the MC 228 can communicate with and control tens or hundreds of NCs 226. In various implementations, the MC 228 issues high level instructions to the NCs 226 over one or more wired or wireless links 246 (hereinafter collectively referred to as "link 246"). The instructions can include, for example, tint commands for causing transitions in the optical states of the IGUs 222 controlled by the respective NCs 226. Each NC 226 can, in turn, communicate with and control a number of WCs 224 over one or more wired or wireless links 244 (hereinafter collectively referred to as "link 244"). For example, each NC 226 can control tens or hundreds of the WCs 224. Each WC 224 can, in turn, communicate with, drive or otherwise control one or more respective IGUs 222 over one or more wired or wireless links 242 (hereinafter collectively referred to as "link 242").

The MC 228 can issue communications including tint commands, status request commands, data (for example, sensor data) request commands or other instructions. In some implementations, the MC 228 can issue such communications periodically, at certain predefined times of day (which may change based on the day of week or year), or based on the detection of particular events, conditions or combinations of events or conditions (for example, as determined by acquired sensor data or based on the receipt of a request initiated by a user or by an application or a combination of such sensor data and such a request). In some implementations, when the MC 228 determines to cause a tint state change in a set of one or more IGUs 222, the MC 228 generates or selects a tint value corresponding to the desired tint state. In some implementations, the set of IGUs 222 is associated with a first protocol identifier (ID) (for example, a BACnet ID). The MC 228 then generates and transmits a communication—referred to herein as a "primary tint command"—including the tint value and the first protocol ID over the link 246 via a first communication protocol (for example, a BACnet compatible protocol). In some implementations, the MC 228 addresses the primary tint command to the particular NC 226 that controls the particular one or more WCs 224 that, in turn, control the set of IGUs 222 to be transitioned. The NC 226 receives the primary tint command including the tint value and the first protocol ID and maps the first protocol ID to one or more second protocol IDs. In some implementations, each of the second protocol IDs identifies a corresponding one of the WCs 224. The NC 226 subsequently transmits a secondary tint command including the tint value to each of the identified WCs 224 over the link 244 via a second communication protocol. In some implementations, each of the WCs 224 that receives the secondary tint command then selects a voltage or current profile from an internal memory based on the tint value to drive its respectively connected IGUs 222 to a tint state consistent with the tint value. Each of the WCs 224 then generates and provides voltage or current signals over the link 242 to its respectively connected IGUs 222 to apply the voltage or current profile.

Figure 3:
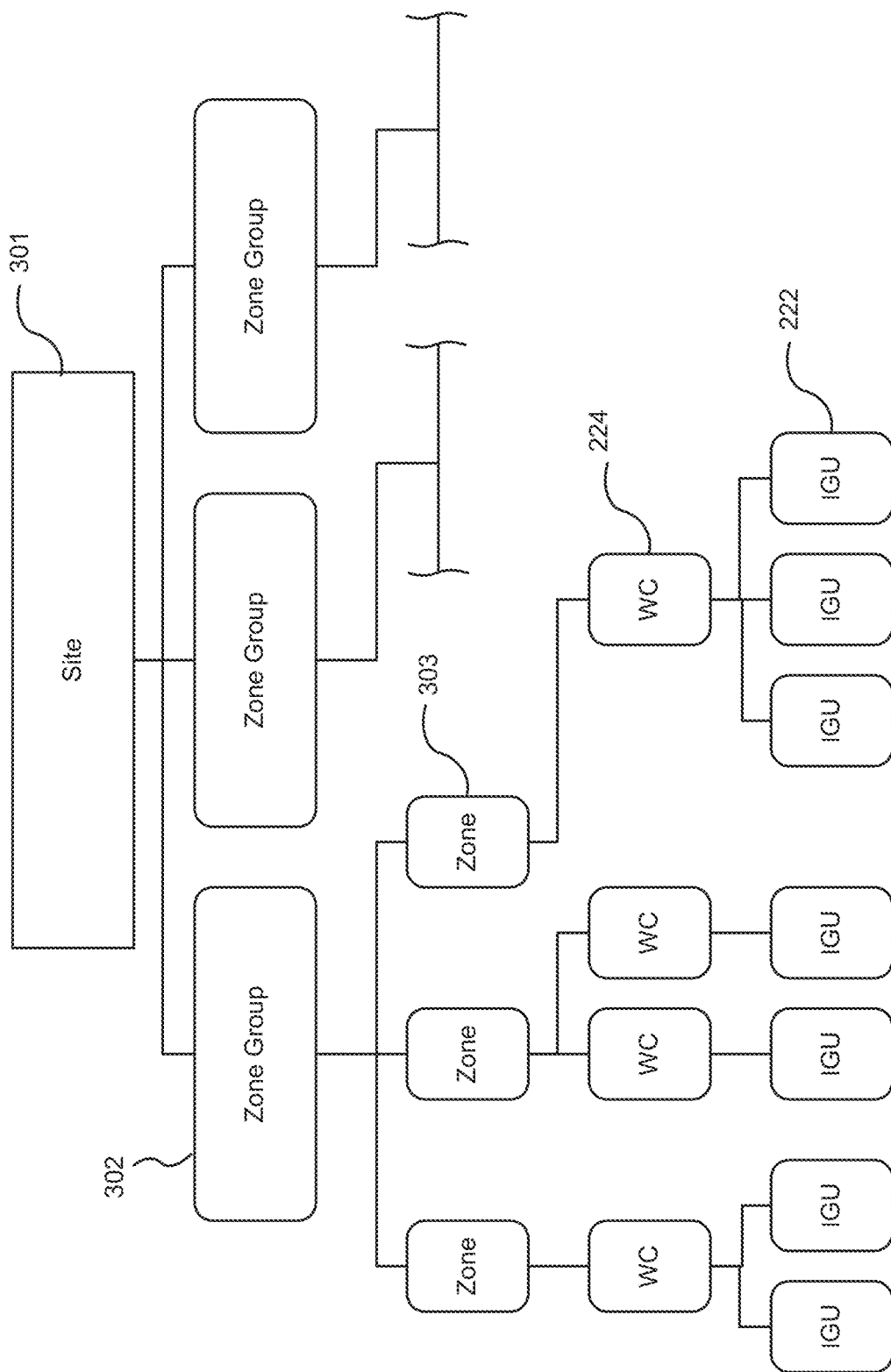
FIG. 3 depicts a hierarchal structure in which IGUs may be arranged.

Similarly to how the function and/or arrangement of controllers may be arranged hierarchically, electrochromic windows may be arranged in a hierarchical structure as shown in FIG. 3. A hierarchical structure helps facilitate the control of electrochromic windows at a particular site by allowing rules or user control to be applied to various groupings of electrochromic windows or IGUs. Further, for aesthetics, multiple contiguous windows in a room or other site location must sometimes need to have their optical states correspond and/or tint at the same rate. Treating a group of contiguous windows as a zone can facilitate these goals.

As suggested above, the various IGUs 222 may be grouped into zones 303 of electrochromic windows, each of which zones 303 includes at least one window controller 224 and its respective IGUs 222. In some implementations, each zone of IGUs 222 is controlled by one or more respective NCs 226 and one or more respective WCs 224 controlled by these NCs 226. In some more specific implementations, each zone 303 can be controlled by a single NC 226 and two or more WCs 224 controlled by the single NC 226. Said another way, a zone 303 can represent a logical grouping of the IGUs 222. For example, each zone 303 may correspond to a set of IGUs 222 in a specific location or area of the building that are driven together based on their location. As a more specific example, consider a site 301 that is a building having four faces or sides: a North face, a South face, an East Face and a West Face. Consider also that the building has ten floors. In such a didactic example, each zone can correspond to the set of electrochromic windows 200 on a particular floor and on a particular one of the four faces. Additionally or alternatively, each zone 303 may correspond to a set of IGUs 222 that share one or more physical characteristics (for example, device parameters such as size or age). In some other implementations, a zone 303 of IGUs 222 can be grouped based on one or more non-physical characteristics such as, for example, a security designation or a business hierarchy (for example, IGUs 222 bounding managers' offices can be grouped in one or more zones while IGUs 222 bounding non-managers' offices can be grouped in one or more different zones).

In some such implementations, each NC 226 can address all of the IGUs 222 in each of one or more respective zones 303. For example, the MC 228 can issue a primary tint command to the NC 226 that controls a target zone 303. The primary tint command can include an abstract identification of the target zone (hereinafter also referred to as a "zone ID"). In some such implementations, the zone ID can be a first protocol ID such as that just described in the example above. In such cases, the NC 226 receives the primary tint command including the tint value and the zone ID and maps the zone ID to the second protocol IDs associated with the WCs 224 within the zone. In some other implementations, the zone ID can be a higher level abstraction than the first protocol IDs. In such cases, the NC 226 can first map the zone ID to one or more first protocol IDs, and subsequently map the first protocol IDs to the second protocol IDs.

When instructions relating to the control of any device (e.g., instructions for a window controller or an IGU) are passed through a network system 220, they are accompanied with a unique network ID of the device they are sent to. Networks IDs are necessary to ensure that instructions reach and are carried out on the intended device. For example, a window controller that controls the tint states of more than one IGU, determines which IGU to control based upon a network ID such as a CAN ID (a form of network ID) that is passed along with the tinting command. In a window network such as those described herein, the term network ID includes but is not limited to CAN IDs, and BACnet IDs. Such network IDs may be applied to window network nodes such as window controllers 224, network controllers 226 and, master controllers 238. Oftentimes when described herein, a network ID for a device includes the network ID of every device that controls it in the hierarchical structure. For example, the network ID of an IGU may include a window controller ID, a network controller ID, and a master controller ID in addition to its CAN ID.

Commissioning Networks of Optically Switchable Windows

In order for tint controls to work (e.g., to allow the window control system to change the tint state of one or a set of specific windows or IGUs), a master controller, network controller, and/or other controller responsible for tint decisions must know the network address of the window controller(s) connected to that specific window or set of windows. To this end, a function of commissioning is to provide correct assignment of window controller addresses and/or other identifying information to specific windows and window controllers, as well the physical locations of the windows and/or window controllers in buildings. In some cases, a goal of commissioning is to correct mistakes or other problems made in installing windows in the wrong locations or connecting cables to the wrong window controllers. In some cases, a goal of commissioning is to provide semi- or fully-automated installation. In other words, allowing installation with little or no location guidance for installers.

In general, the commissioning process for a particular window or IGU may involve associating an ID for the window or other window-related component with its corresponding window controller. The process may also assign a building location and/or absolute location (e.g. latitude, longitude and elevation) to the window or other component. Further information related to commissioning and/or configuring a network of electrochromic windows is presented in U.S. patent application Ser. No. 14/391,122, filed Oct. 7, 2014, and titled "APPLICATIONS FOR CONTROLLING OPTICALLY SWITCHABLE DEVICES," U.S. patent application Ser. No. 14/951,410, filed Nov. 24, 2015, and titled "SELF-CONTAINED EC IGU," U.S. Provisional Patent Application No. 62/305,892, filed Mar. 9, 2016, and titled "METHOD OF COMMISSIONING ELECTROCHROMIC WINDOWS," and U.S. Provisional Patent Application No. 62/370,174, filed Aug. 2, 2016, and titled "METHOD OF COMMISSIONING ELECTROCHROMIC WINDOWS," each of which is herein incorporated by reference in its entirety.

After a network of optically switchable windows is physically installed, the network can be commissioned to correct any incorrect assignment of window controllers to the wrong windows (often as IGUs) or building locations. In some embodiments, commissioning maps (or pairs or links) individual windows and their locations with associated window controllers.

Sometimes commissioning is intended to address mis-pairing of window controllers and associated optically switchable windows during installation. For example, before installation, each window controller may be assigned to a particular window, which may be assigned to a particular location in the building. However, during installation a window controller and/or window may be installed in an incorrect location. For instance, a window controller may be paired with the wrong window, or the window may be installed in the wrong location. These mis-pairings can be difficult to address. Additionally, during the construction process, the physical window installation and the wiring installation in the building are typically done by different teams at different times. Recognizing this challenge, in some implementations, the windows and controllers are not pre-assigned to one another, but rather are paired during a commissioning process. Even if mis-pairing is not a problem because, for example, window controllers are physically affixed to their corresponding windows, the installer might not know or care which window (and hence which window controller) is installed at which location. For example, many windows may be identical in size, shape, and optical properties, and hence be interchangeable. Ideally, the installer would simply install such windows at any convenient location, without regard for the unique window controller associated with each such window. Various commissioning embodiments described herein permit such flexible installation.

Some concrete examples of issues that can arise during installation are the following:

Mistakes in placing windows in correct locations: electrically controllable windows are susceptible to mis-installation, particularly by technicians who are not accustomed to working with electrically controllable windows. These people are typically tradespeople such as glaziers and/or low voltage electricians (LVE's);

Misconnecting cables to window controllers: this is particularly a problem for multiple windows in close proximity. As mentioned, electrically controllable windows are susceptible to mis-installation particularly by technicians who are not accustomed to working with electrically controllable windows;

Broken windows or window controllers: An installer can simply install an available window or controller in place of the broken one. The new window or controller is not in the plan and thus is not accounted for and/or recognized during commissioning; and The process of installing many windows at the correct locations is complicated. It would be desirable to replace the paradigm of having installers be responsible for installing many unique windows in unique locations. As mentioned, electrically controllable windows are susceptible to mis-installation particularly by technicians who are not accustomed to working with electrically controllable windows. Therefore, it would be useful to do away with much or all of the window and controller location considerations, which complicate the installation process.

In one example, installation and attendant problems requiring improved methods of commissioning arise from the following sequence:

a. A unique network address (e.g., a CANID) is assigned to each window controller when the window controllers are manufactured.

b. The window manufacturer (not necessarily the window controller manufacturer), a building designer, or other entity specifies information about the window controller (with specified network address) and window (IGU). It does this by assigning a window controller ID (WCID), which is not the window controller's network address. The window manufacturer and/or other entity also specifies which IGU(s) are associated with the window controller (WCID). To this end, the entity specifies window IDs (WIDs) for the windows. In certain cases, the manufacturer and/or other entity does not specify a correlation between IGU and controllers, i.e. to which specific IGU(s) a controller needs to be connected. For example the window manufacture need not specify that a WC (with a CANID (e.g., 19196997)) needs to connect to any particular WID (e.g. 04349'0524'0071'0017'00). Instead the manufacturer or other entity specifies that a WC (with CANID (e.g., 19196997)) has a window controller ID of, e.g., WC10. The window controller ID may be reflected (e.g., appear) as a location tag (e.g. an arbitrary number assigned to windows in an installation) on an interconnect drawing, architectural drawing or other representation of a building, which may also specify that the window controller connects to particular IGUs identified by window IDs (e.g., W31 and W32 (location tag for IGs)).

c. As indicated, the manufacturer or other entity applies a window controller ID (WCxx label) on each window controller. The entity also enters a WCxx/CAN ID pair information in a configuration file used by master controller/network controller or other device containing logic responsible for issuing individual tint decisions.

d. This process requires that a LVE or other technician charged with installing and/or connecting electrically controllable windows to select a specific window controller from the boxes of window controllers and install it in a specific location in the building.

e. Any errors made in operations (c) or (d) lead to difficult troubleshooting in the field to find the mis-mapping and correct it.

f. Even if operations (c) and (d) are executed correctly, a window controller and/or window can be damaged, in which case it must be replaced during the installation. This again can cause problems unless the change is tracked manually and reflected in the configuration file.

As indicated, in various embodiments, the commissioning process pairs individual windows with individual window controllers responsible for controlling the optical states of the windows. In some implementations, the commissioning process pairs window and/or window controller locations with window controller IDs and/or window controller network identifiers (e.g., CANIDs) for controllers that are disposed on or proximate to windows. As explained, such controllers are typically configured to control the optical states of windows on which they are disposed or proximate to. In some instances, the commissioning process specifies the type of controller in a hierarchical network and optionally the logical position of the controller in that network's topology. Each individual optically switchable window has a physical ID (e.g., the window or lite ID (WID) mentioned above) and an associated controller with a unique network ID (e.g., the above-mentioned CANID). In some cases, the window controller also includes a physical ID (e.g., the above-mentioned WCID). In general a commissioning process can be used to link or pair any two related network components including but not limited to IGUs (or lites in IGUs), window controllers, network controllers, master controllers, and sensors. In some cases, the commissioning process may involve pairing network identifiers associated with IGUs or controllers to surfaces and/or features on a three-dimensional building model.

In certain embodiments described below, a commissioning linkage is made by comparing an architecturally determined location of a first component with a wirelessly measured location of a second component, which second component is associated with the first component. For example, the first component may be an optically switchable window and the second component may be a window controller configured to control the optical state of the optically switchable component. In another example, the first component is a sensor that provides measured radiation data to a window controller, which is the second component. Often the location of the first component is known with greater accuracy than the location of the second component, which location may be determined by a wireless measurement. While the accurate location of the first component may be determined from architectural drawings or a similar source, the commissioning process may employ alternative sources such as manually-measured post-installation locations of windows or other components. GPS may also be used. In various embodiments, the component whose location is determined by wireless measurement (e.g., a window controller) has a window network ID, and that network ID is made available during the commissioning process, e.g., via a configuration file. In such cases, the commissioning process may pair the accurate physical location of the first component with the network ID of the second component. In some embodiments, the first and second components are a single component. For example, a window controller may be such component; e.g., its position may be both determined from an architectural drawing and from wireless measurement. In such case, the commissioning process may simply ascribe the physical location from the architectural drawing with the network ID from the configuration file.

The linkages determined during commissioning are stored in a file, data structure, database, or the like that can be consulted by various window network components and/or associated systems such as mobile applications, window control intelligence algorithms, Building Management Systems (BMSs), security systems, lighting systems, and the like. In certain embodiments, the commissioning linkages are stored in a network configuration file. In some cases, a network configuration file is used by the window network to send appropriate commands between components on the network; e.g., a master controller sends a tint command to the window controller for a window designated, by its location in a structure, for a tint change.

Figure 4A:
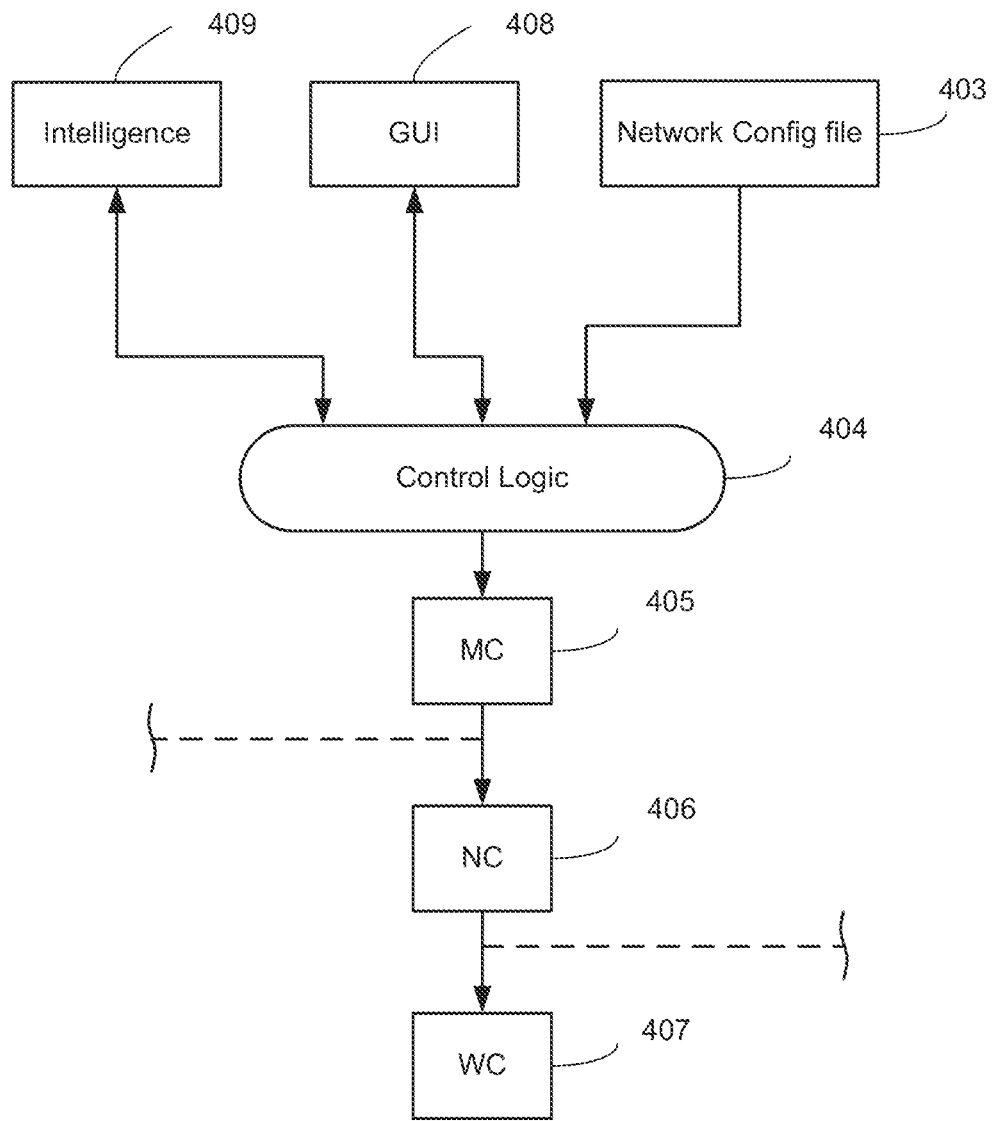
FIG. 4A depicts how a network configuration file is used by control logic to perform various functions on a window network.

FIG. 4A depicts an embodiment in which a network configuration file 403, may be used by control logic 404 to facilitate various functions on a network. While the following description uses the term "network configuration file," it should be understood that any suitable file, data structure, database, etc. may be used for the same purpose. Such file or other feature provides linkages between physical components of a window network (e.g., lite positions identified by a Lite ID) and network IDs (which may be or include network addresses) of controllers associated with such physical components (e.g., window controllers that directly control states of lites). Control logic refers to any logic that may use for making decisions or other purposes the linkages between physical components and associated controllers. As suggested, such logic may include logic provided with window network master controllers, network controllers, and window controllers, as well as associated or interfacing systems such as mobile applications for controlling window states, window control intelligence algorithms, building management systems, security systems, lighting systems, and the like. In some cases, a network configuration file 403 is used by control logic 404 to provide network information to a user interface for controlling the network 408, such as an application on a remote wireless device, or to an intelligence system 409 or a BMS. In some cases, a user interface 408 of a mobile application is configured to use information provided by a network configuration file to control a master controller, a network controller, a window controller, or other network components.

Figure 4B:
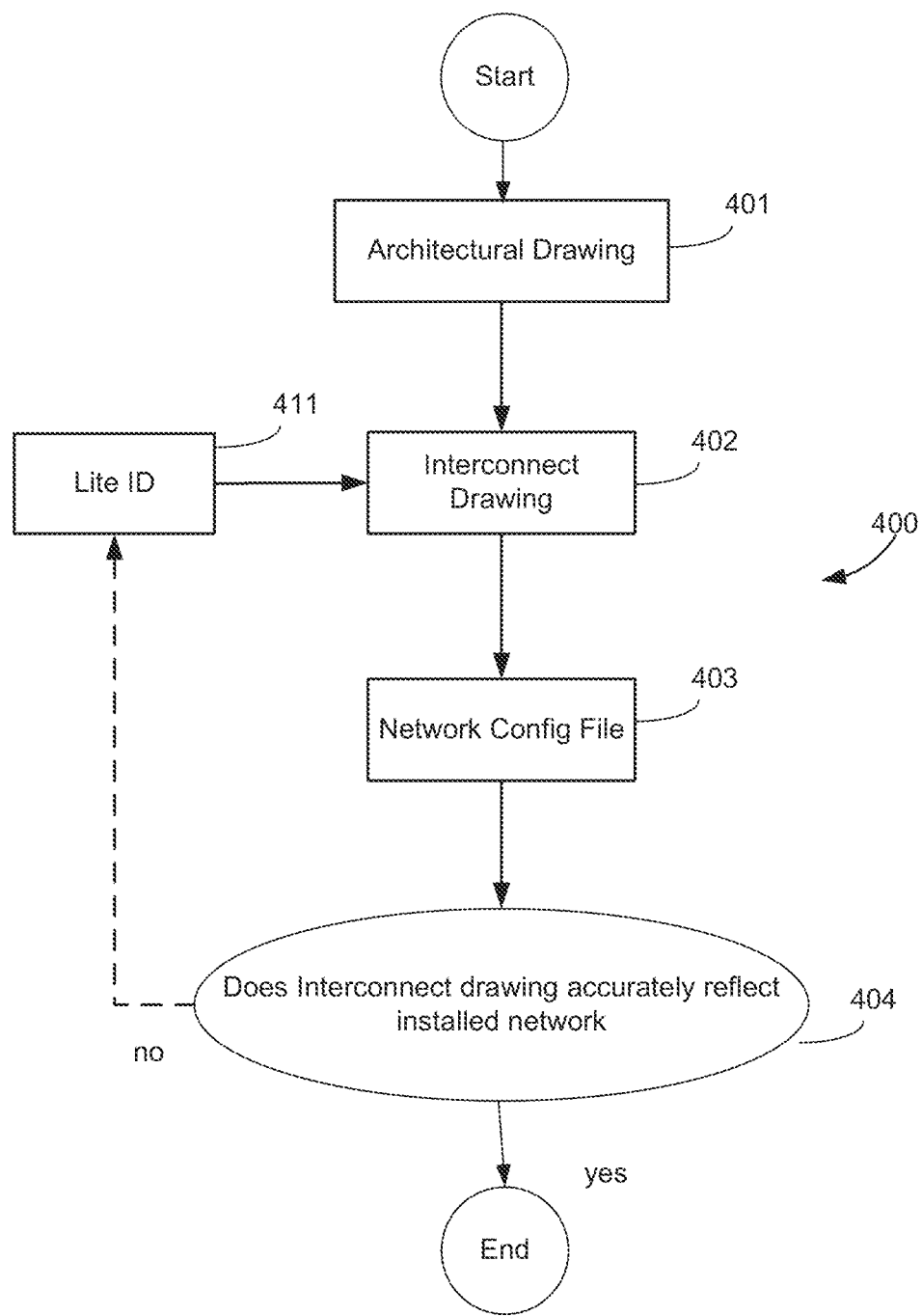
FIG. 4B depicts typical process of creating a network configuration file.

An example of a process of creating a network configuration file is shown in FIG. 4B. The first operation is to determine the physical layout of a site from building plans such as architectural drawings 401 so that the layout of a window network can be determined. Typically, architectural drawings 401 provide building dimensions, locations of electrical closets, and various other structural and architectural features. In some cases, such as when architectural drawings are not available, architectural drawings may be created by first surveying a site. Using architectural drawings, an individual or team designs the wiring infrastructure and power delivery system for the electrochromic window network. This infrastructure, which includes power distribution components, is depicted visually in modified architectural drawings that are sometimes referred to as interconnect drawings 402. Interconnect drawings depict wire routing (e.g., trunk lines) at a site, the positioning of various devices on the network (e.g. controllers, power supplies, control panels, windows, and sensors), and identifying information of network components (e.g., a network ID). In some cases an interconnect drawing is not completed until the lite IDs (WIDs or other IDs) of installed optically switchable windows are matched to the devices installed locations. Inherently or explicitly, an interconnect drawing may also depict a hierarchical communications network including windows, window controllers, network controllers, and a master controller at a particular site. Typically, however, an interconnect drawing as initially rendered does not include network IDs for lites or other components on an optically switchable window network.

After an interconnect drawing is created, it is used to create a network configuration file 403 which may be a textual representation of the interconnect drawing. Network configuration files may then be provided in a medium that is readable by control logic and/or other interfacing system, which allows the window network to be controlled in its intended fashion. So long as the interconnect drawing and the network configuration file accurately reflect the installed network 404, the process of creating a preliminary network configuration file is complete. However, commissioning may add other information to the file to link installed optically switchable windows are matched to corresponding window controller network IDs. If at any point it is determined that the interconnect drawing and network configuration file do not match the installed network 404, manual user intervention may be required to update the interconnect drawing 402 with accurate lite ID (or other ID) information 411. From the updated interconnect drawing the network configuration file 403 is then updated to reflect changes that have been made.

Figure 5A:
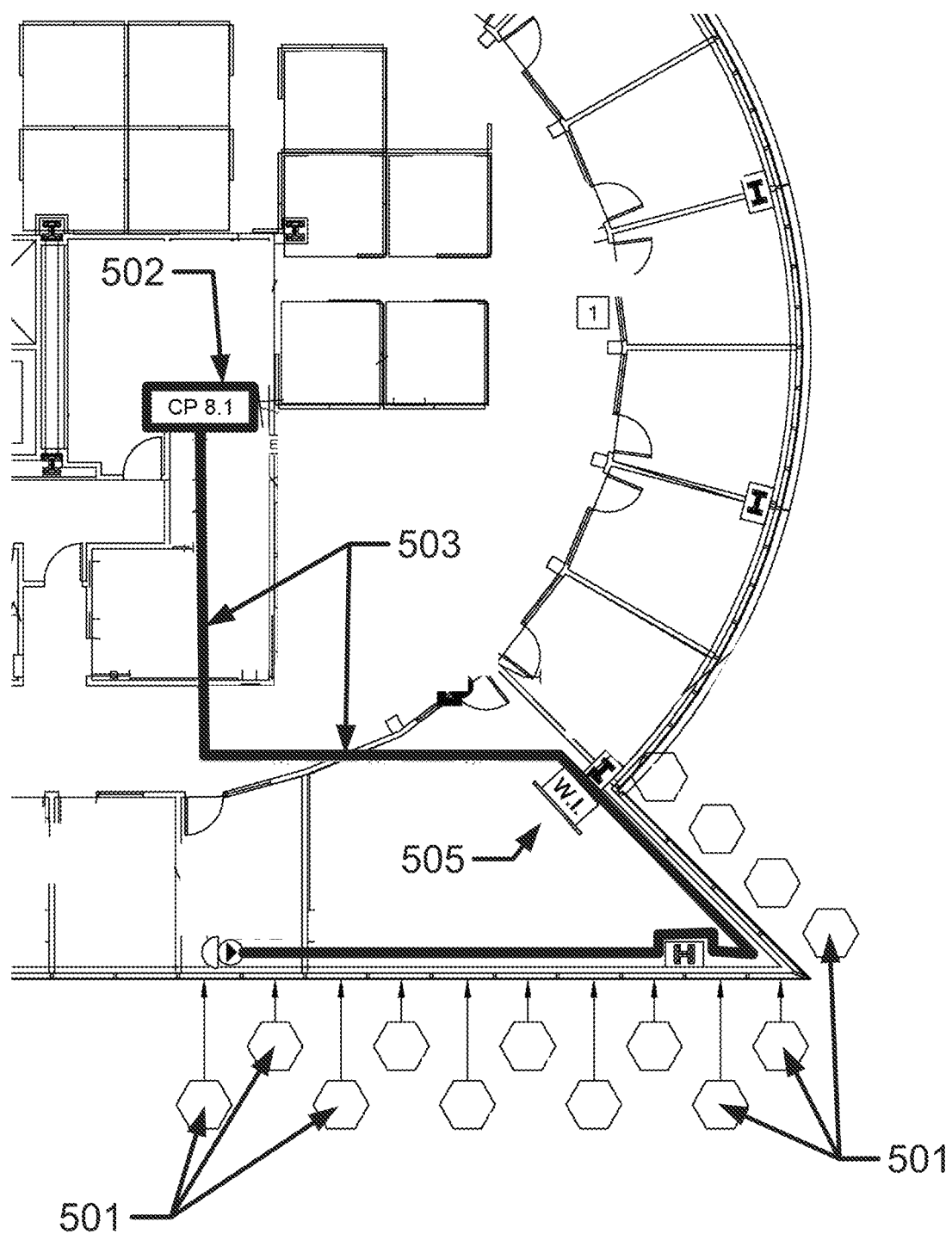
FIG. 5A depicts an interconnect drawing which is created from architectural floorplan.

FIG. 5A provides one example of an interconnect drawing which is created from architectural drawing/floorplan of the building. Interconnect drawings include the placement of IGUs and window controllers 501, control panels 502, trunk lines 503, wall interfaces 505, and various other network components such as master controllers, network controllers, and sensors. Although not shown, interconnect drawings may include additional information such as structural information, structural dimensions, and information such as the network IDs of various network components depicted.

Figure 5B:
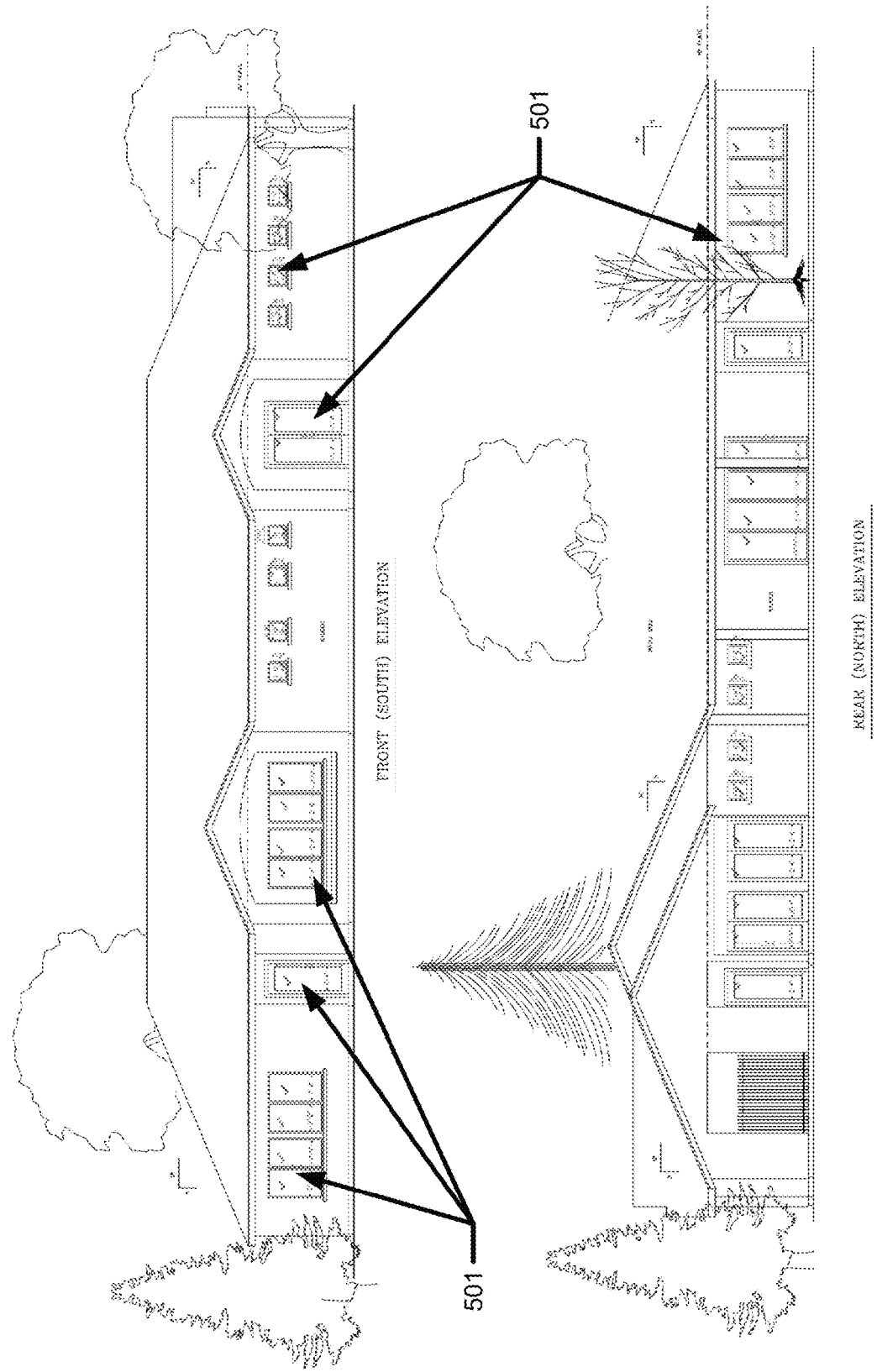
FIG. 5B depicts an elevation view of an interconnect drawing.

In some instances, an interconnect drawing is a package of drawings depicting many views of a structure. In some cases, an interconnect drawing package may include drawings that are similar but provide different information. For example, two drawings may depict the same floorplan, but one drawing may provide dimensional information while another provides network IDs of components on the network. FIG. 5B provides another example of an interconnect drawing that depicts an elevation view of a structure from which the coordinates of IGUs 501 and other network components may be determined. In some cases, interconnect drawings provide information relating to power distribution networks for electrochromic devices such as has been described in in U.S. application Ser. No. 15/268,204, filed Sep. 16, 2016, which is incorporated herein by reference in its entirety.

Modifications to interconnect drawings may be required in certain situations. For example, an installer can determine that a window opening is too small for the window prescribed by interconnect drawings and thus decide to install a smaller window. To correct for the change, the interconnect drawing may need to be updated. Regardless, a network configuration file or other structure storing mappings between optically switchable windows and associated controllers will need to be created or modified to reflect the current installation. With the correct mapping in place, the network will function properly. In some cases if a network configuration file is not representative of the physical network, then window tinting instructions may be sent to the wrong component, or communications may not be received at all.

When an interconnect drawing is revised, the corresponding network configuration file 403 will also need to be revised. In some cases, a network configuration file is not created until physical installation has been completed to ensure that any changes in an interconnect drawing are reflected in the network configuration file. In cases where the interconnect file is modified after the network file is created, care must be taken to ensure that the network configuration file is also updated to reflect changes. Failure to update an interconnect drawing or failure to update a network configuration file to reflect changes made to an interconnect drawing will result in a window network that does not respond to instructions as intended. Further, an interconnect file may be updated when commissioning takes place. To correct for changes made during installation that deviate from an interconnect drawing, optically switchable window information may be obtained from a file containing the lite ID 411 for a window.

When an interconnect drawing has been created, or when a drawing has been updated to account for a change in installation, a network configuration file is created or updated. The configuration file may be further updated when commissioning takes place. As with an interconnect drawing, the network configuration file, when initially rendered does not include network IDs for window controllers or other components on an optically switchable window network.

In certain embodiments, a network configuration file is a transcript of the interconnect drawings in a computer readable format that can be read, interpreted, and in some cases updated by control logic software. All of the network components (e.g., windows, window controllers, network controllers, and sensors) are represented by a network configuration file that contains information regarding how various devices on the network relate to each other in a hierarchical structure.

Typically a network configuration file is a textual description of the interconnect drawings. Network configuration files may have a flat file format with no structure for indexing and no structural relationship between records.

Examples of flat files types include plain text files, comma-separated value files, and delimiter-separated value files. Typically a JavaScript object notation format (JSON), or other object notation format that uses human-readable text to transmit data objects consisting of attribute-value pairs, is used for a network configuration file. Of course, as mentioned, the information in a network configuration file can be stored in other formats and locations.

In one embodiment, a network configuration file takes a JSON format. In this embodiment, various devices and groupings of devices will are defined as JSON objects. For example, when defining a zone of windows as an object, comma-separated text will be used to encode what zone group the zone is a part of, what network controller or controllers the zone group reports to, and the master controller in charge of the network. The object additionally will provide what window controllers, windows, and any additional network components (e.g., a photo sensor or window antenna) are included in the zone. Usually network components are referenced in an object by at least a network ID. As explained, when initially generated from an interconnect drawing, a network configuration file is incomplete in the sense that it does not yet include network IDs for window controllers.

Network configuration files may be stored at various locations in the window network. For example, a network configuration file may be stored on memory attached to a master controller, a network controller, a remote wireless device, or in the cloud. In some embodiments a network configuration file is stored in one location from which all other devices on the network can access it. In another embodiment, network configuration files are stored locally on a plurality of devices on the window controller network; when a network configuration file is updated at one location, as when a new device is added to the network, the updated network configuration file is used to replace the out of date network files at other.

Using information from the network configuration file, control logic is able to send instructions to windows and other components on the network. Control logic passes instructions to a master controller 405, which in turn transmits instructions to the appropriate network controller 406. In a primary embodiment a network controller transmits instructions to the appropriate window controller 407 over, e.g., a BACnet communication protocol (building automation and control networks protocol, ISO16484-5). Window controllers, then apply electrical signals to control the tint state of optically switching windows based upon a window controller's CAN ID.

Control logic may be stored and/or used at various places on a window network. For example, in one embodiment control logic may be stored and used on a master controller. In other embodiments, software containing the control logic may be run on the cloud or on a remote device which sends instructions to a master controller. In some cases, a control logic may be at least partially implemented via a facility management application that be operated from an electronic device.

One purpose of control logic is to present controllable options to a user in the form of a graphical user interface 408 that enables a user to control one or more electrochromic windows, and other devices, on a window network. For example, a user may be presented with a list of lite IDs on the network from which the user may select and modify the tint state of a particular window. Alternatively, a user may send instructions to control a grouping of windows based upon a zone of windows that has been predetermined or selected by a user.

In some embodiments, control logic can additionally communicate with window control intelligence 409, a BMS, a security system, etc. For example, a BMS may configure all windows to their tinted state in order to save cooling costs in the event of a power outage.

Automatic Location Determination

One aspect of the present disclosure allows for automated window location determination after installation. Window controllers, and in some instances windows configured with antennas and/or onboard controllers, may be configured with a transmitter to communicate via various forms of wireless electromagnetic transmission; e.g., time-varying electric, magnetic, or electromagnetic fields. Common wireless protocols used for electromagnetic communication include, but are not limited to, Bluetooth, BLE, Wi-Fi, RF, and ultra-wideband (UWB). The relative location between two or more devices may be determined from information relating to received transmissions at one or more antennas such as the received strength or power, time of arrival or phase, frequency, and angle of arrival of wirelessly transmitted signals. When determining a device's location from these metrics, a triangulation algorithm may be implemented that in some instances accounts for the physical layout of a building, e.g. walls and furniture. Ultimately, an accurate location of individual window network components can be obtained using such technologies. For example, the location of a window controller having a UWB micro-location chip can be easily determined to within 10 centimeters of its actual location. In some instances, the location of one or more windows may be determined using geo-positioning methods such as those described in PCT patent application Ser. No. 17/31106, filed on May 4, 2017 titled "WINDOW ANTENNAS," which is hereby incorporated by reference in its entirety. As used herein, geo-positioning and geolocation may refer to any method in which the position or relative position of a window or device is determined in part by analysis of electromagnetic signals.

Pulse-based ultra-wideband (UWB) technology (ECMA-368 and ECMA-369) is a wireless technology for transmitting large amounts of data at low power (typically less than 0.5 mW) over short distances (up to 230 feet). A characteristic of a UWB signal is that it occupies at least 500 MHz of bandwidth spectrum or at least 20% of its center frequency. According to the UWB protocol, a component broadcasts digital signal pulses that are timed very precisely on a carrier signal across a number of frequency channels at the same time. Information is may be transmitted by modulating the timing or positioning of pulses. Alternatively, information may be transmitted by encoding the polarity of the pulse, its amplitude and/or by using orthogonal pulses. Aside from being a low power information transfer protocol, UWB technology may provide several advantages for indoor location applications over other wireless protocols. The broad range of the UWB spectrum comprises low frequencies having long wavelengths, which allows UWB signals to penetrate a variety of materials, including walls. The wide range of frequencies, including these low penetrating frequencies, decreases the chance of multipath propagation errors as some wavelengths will typically have a line-of-sight trajectory. Another advantage of pulse-based UWB communication is that pulses are typically very short (less than 60 cm for a 500 MHz-wide pulse, less than 23 cm for a 1.3 GHz-bandwidth pulse) reducing the chances that reflecting pulses will overlap with the original pulse.

The relative locations of window controllers having micro-location chips can be determined using the UWB protocol. For example, using micro-location chips, the relative position of each device may be determined to within an accuracy of 10 cm. In various embodiments, window controllers, and in some cases antennas disposed on or proximate windows or window controllers are configured to communicate via a micro-location chip. In some embodiments, a window controller may be equipped with a tag having a micro-location chip configured to broadcast omnidirectional signals. Receiving micro-location chips, also known as anchors, may be located at a variety of locations such as a wireless router, a network controller, or a window controller having a known location. By analyzing the time taken for a broadcast signal to reach the anchors within the transmittable distance of the tag, the location of the tag may be determined. In some cases, an installer may place temporary anchors within a building for the purpose of commissioning which are then removed after the commissioning process is complete. In some embodiments in which there are a plurality of optically switchable windows, window controllers may be equipped with micro-location chips that are configured to both send and receive UWB signals. By analysis of the received UWB signals at each window controller, the relative distance between each other window controller located within the transmission range limits may be determined. By aggregating this information, the relative locations between all the window controllers may be determined. When the location of at least one window controller is known, or if an anchor is also used, the actual location of each window controller or other network device having a micro-location chip may be determined. Such antennas may be employed in an auto-commissioning procedure as described below. However, it should be understood that the disclosure is not limited to UWB technology; any technology for automatically reporting high-resolution location information may be used. Frequently, such technology will employ and one or more antennas associated with the components to be automatically located.

As explained, interconnect drawings or other sources of architectural information often include location information for various window network components. For example, windows may have their physical location coordinates listed in x, y, and z dimensions, sometimes with very high accuracy; e.g., to within 1 centimeter. Similarly, files or documents derived from such drawings, such as network configuration files, may contain accurate physical locations of pertinent window network components. In certain embodiments, coordinates will correspond to one corner of a lite or IGU as installed in a structure. The choice of a particular corner or other feature for specifying in the interconnect drawing coordinates may be influenced by the placement of an antenna or other location aware component. For example, a window and/or paired window controller may have a micro-location chip placed near a first corner of an associated IGU (e.g., the lower left corner); in which case the interconnect drawing coordinates for the lite may be specified for the first corner. Similarly, in the case where an IGU has a window antenna, listed coordinates on an interconnect drawing may represent the location of the antenna on the surface of an IGU lite or a corner proximate the antenna. In some cases, coordinates may be obtained from architectural drawings and knowledge of the antenna placement on larger window components such as an IGU. In some embodiments, a window's orientation is also included interconnect drawing.

While this specification often refers to interconnect drawings as a source of accurate physical location information for windows, the disclosure is not limited to interconnect drawings. Any similarly accurate representation of component locations in a building or other structure having optically switchable windows may be used. This includes files derived from interconnect drawings (e.g., network configuration files) as well as files or drawings produced independently of interconnect drawings, e.g., via manual or automated measurements made during construction of a building. In some cases where coordinates cannot be determined from architectural drawings, e.g. the vertical position of a window controller on a wall, unknown coordinates can be determined by personnel responsible for installation and/or commissioning. Because architectural and interconnect drawings are widely used in building design and construction, they are used here for convenience, but again the disclosure is not limited to interconnect drawings as a source of physical location information.

In certain embodiments using interconnect drawings or similarly detailed representation of component locations and geo-positioning, commissioning logic pairs component locations, as specified by interconnect drawings, with the network IDs (or other information not available in interconnect drawings) of components such as window controllers for optically switchable windows. In some embodiments, this is done by comparing the measured relative distances between device locations provided by geo-positioning and the listed coordinates provided on an interconnect drawing. Since the location of network components may be determined with a high accuracy, e.g., better than about 10 cm, automatic commissioning may be performed easily in a manner that avoids the complications that may be introduced by manually commissioning windows.

The controller network IDs or other information paired with the physical location of a window (or other component) can come from various sources. In certain embodiments, a window controller's network ID is stored on a memory device attached to each window (e.g., a dock for the window controller or a pigtail), or may be downloaded from the cloud based upon a window serial number. One example of a controller's network ID is a CAN ID (an identifier used for communicating over a CAN bus). In addition to the controller's network ID, other stored window information may include the controller's ID (not its network ID), the window's lite ID (e.g. a serial number for the lite), window type, window dimensions, manufacturing date, bus bar length, zone membership, current firmware, and various other window details. Regardless of which information is stored, it may be accessed during the commissioning process. Once accessed, any or all portions of such information are linked to the physical location information obtained from the interconnect drawing, partially completed network configuration file, or other source.

Figure 6:
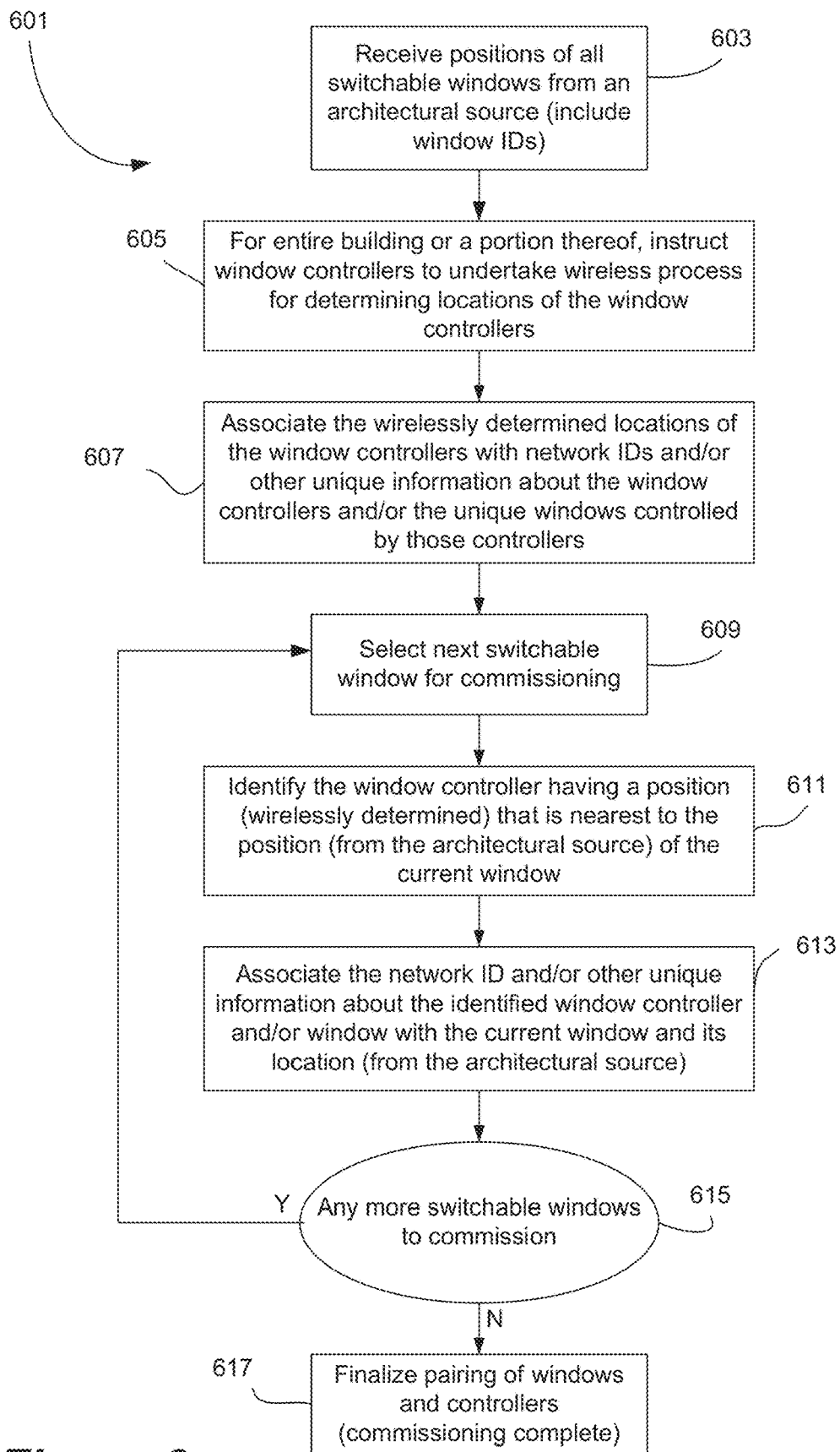
FIG. 6 is a flow chart depicting operations associated with an embodiment of auto-commissioning.

FIG. 6 presents an example process flow for commissioning installed optically switchable windows. As depicted, a commissioning process 601 begins with a process operation 603 in which the commissioning system receives positions of each of the optically switchable windows from an architectural source such as an interconnect drawing or a configuration file derived therefrom. These windows may include all switchable windows present in a particular building or a portion of the building such as one floor of the building or a façade of the building. In certain embodiments, in addition to receiving the positions of the windows, the commissioning system also receives IDs associated with the windows, e.g., lite IDs or serial numbers, which may be included in the architectural source or in another source. As explained above, the location information obtained from an architectural source or similar source contains highly accurate three-dimensional positions of the windows. In certain embodiments, the locations received in operation 603 are accurate to within about 10 centimeters, or about 5 centimeters, or about 1 centimeter.

While operation 603 provides the highly accurate window positional information needed for commissioning, operations 605 and 607 provide information needed for uniquely identifying the window controller and/or the window(s) it controls. As depicted at process operation 605, the commissioning system instructs the window controllers for the entire building or portion thereof to undertake a wireless process for determining the locations of the window controllers. As explained, such operation may employ UWB protocol communications or other wireless process that provides reasonably high accuracy location information about the window controllers or other window network component that is used for commissioning. As explained, UWB processing can often provide location information to within about 10 centimeters of the network component containing a micro location chip configured to implement the UWB protocol. In principle, any suitably accurate wireless or even non-wireless protocol can be employed to provide the needed locational information for associating network controllers or other components with the high accuracy positional information obtained for the optically switchable windows. In certain embodiments, any such procedure for locating window controllers will provide locational information for the network controller to an accuracy of at least about 20 centimeters or at least about 15 centimeters or at least about 10 centimeters.

In process operation 607, the location information for the window controllers obtained in process operation 605 is associated with the unique information about the window controllers. Such information uniquely describes the window controller and, in some embodiments, a window or windows associated with such controller. Examples of such unique information include network IDs for the window controllers, physical (non-network) IDs for the window controllers, configuration parameters for the window controllers, the serial numbers of any windows to be controlled by the window controller, and various other parameters describing the windows to be controlled by the window controllers. The commissioning system produces a file or other collection of information that contains a rough positional location of the window controller—obtained through the wireless measurement procedure of operation 605—and unique identifying information about the window controller. With this information, the commissioning system has all it needs to undertake the actual commissioning process.

In the depicted embodiment, the commissioning process loops over each of the windows in an installation or portion of the installation and commissions each one in succession. Of course, in some embodiments, the analysis or commissioning of the various windows may be conducted in parallel. In the embodiment depicted in FIG. 6, the individual windows are considered successively with current windows for commissioning being selected at a process operation 609. With the current window selected for commissioning, the commissioning system identifies the window controller having a position—as determined wirelessly in operation 605—that is nearest to the position of the current window, as determined from the architectural source at process operation 603. See process operation 611. Given the relative size of most windows and the accuracy of the wirelessly measured position of the window controllers, there is often little ambiguity in associating particular windows with their associated window controllers. Various techniques for determining distances between locations of windows and window controllers may be used. Some are described below. The techniques may consider windows in isolation or collectively.

After the commissioning system determines the closest window controller in operation 611, the system associates the network ID and/or other unique information about the identified window controller (and/or its window(s)) with the current window and its location, as determined from the architectural source. See process operation 613.

At this point, the current window has been effectively commissioned, so the commissioning system determines whether there are any more switchable windows to be commissioned. See decision operation 615. If more such windows exist, process control returns to process operation 609, where the commissioning system selects the next switchable window for commissioning. If, on the other hand, there are no more windows to be commissioned, process control is directed to a process operation 617 which finalizes the pairing of the windows and controllers and otherwise completes the commissioning process.

Figure 7:
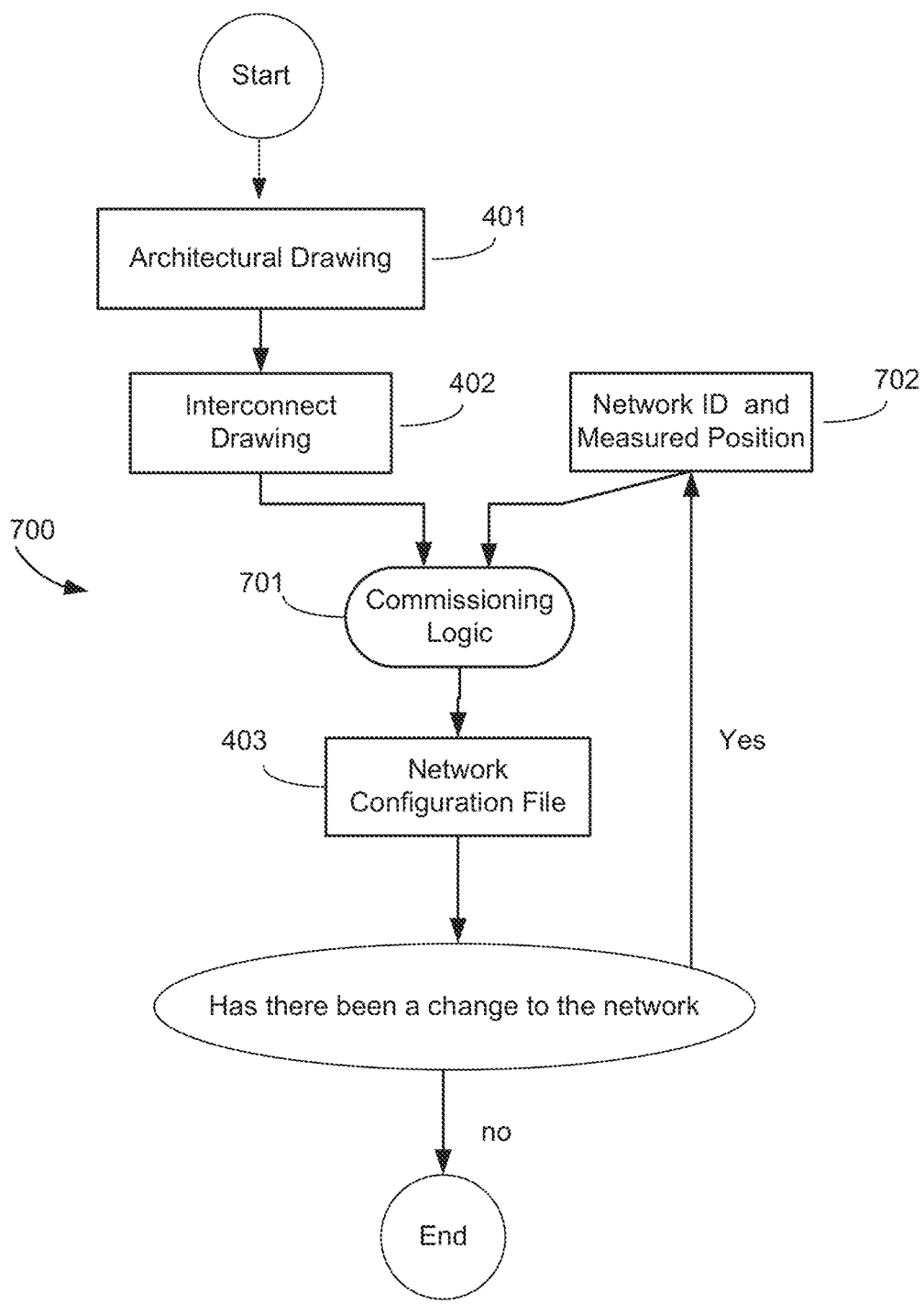
FIG. 7 shows the process in which commissioning logic may be used to generate a network configuration file.

FIG. 7 depicts a process 700 involving commissioning logic 701 (part of a commissioning system) and a network configuration file 403. As with process 400, process 700 begins by gathering building information from architectural drawings 401. Using the building information provided by architectural drawings, a designer or design team creates interconnect drawings 402 which include plans for a window network at a particular site. Once network components such as IGUs and window controllers are installed, the relative positions between devices can be measured by analysis of electromagnetic transmissions as has been described elsewhere herein. The measured positions and network ID information 702 is then passed to commissioning logic 701 which pairs the network ID (or other unique information) of a device with its place within a hierarchal network as depicted in the interconnect drawings 402. The location of an associated window or other device, as taken or derived from the interconnect drawing, is also paired with the network ID or other unique information. The paired information is then stored in a network configuration file 403. As long as no changes are made to the network or window installations, no changes are needed to the network configuration file. If, however, a change is made, for example an IGU is replaced with one having a different window controller, then commissioning logic 701 is used once to determine the change and update the network configuration file 403 accordingly.

As a teaching example, consider an interconnect drawing having window controllers located at three positions (each associated with the lower left corner of an associated window) along the wall of the building: a first position intended to have a first window controller at (0 ft, 0 ft, 0 ft), a second position intended to have a second window controller at (5 ft, 0 ft, 0 ft), and a third position intended to have a third window controller at (5 ft, 4 ft, 0 ft). When measuring coordinates of the three controllers, one of the controllers is set as a reference location (e.g. the controller personnel responsible for commissioning sets the controller in the first position as a reference point). From this reference point the coordinates of the other two windows are measured resulting in window coordinates of (5.1 ft, 0.2 ft, 0.1 ft) and (5.0 ft, 3.9 ft, −0.1 ft). Commissioning logic then easily perceives the window having coordinates (5.1 ft, 0.2 ft, 0.1 ft) to be in the second position and a window having coordinates (5.0 ft, 3.9 ft, −0.1 ft) to be in the third position. Information describing the physical and hierarchical position of each component from interconnect drawings is then paired with the network ID information (or other unique information) which may be transmitted to the commissioning logic over the network when the position of network components is determined.

Commissioning logic may incorporate a range of statistical methods to match physical device coordinates with coordinates listed on an interconnect drawing. In one embodiment, matching is performed by iterating through the various permutations of assigning a device to each of the possible interconnect locations and then observing how closely the location of other components, as determined using relative distance measurements, correspond to the locations of other network component locations as specified on the interconnect drawing. In some instances, network components are matched with coordinates listed on an interconnect drawing by selecting the permutation that minimizes the mean squared error of the distance of each component to the closest component location specified by the interconnect drawing.

This auto commissioning method may also useful if, for example, a new component is added to the network, an old component is removed from a network, or replaced on the network. In the case of a new component, the component may be recognized by the window network and its location may be determined by one of the previously described methods. Commissioning logic may then update the network configuration file to reflect the addition. Similarly, commissioning logic may update a network configuration file when a component is removed and no longer recognized by the window network. In cases where a component is replaced, commissioning logic may notice the absence of a component on the network and the presence of a new component reporting from the same coordinates of the missing component. Commissioning logic may conclude that a component has been replaced, and thus updates the network configuration file with the network ID of the new component.

Figure 8:
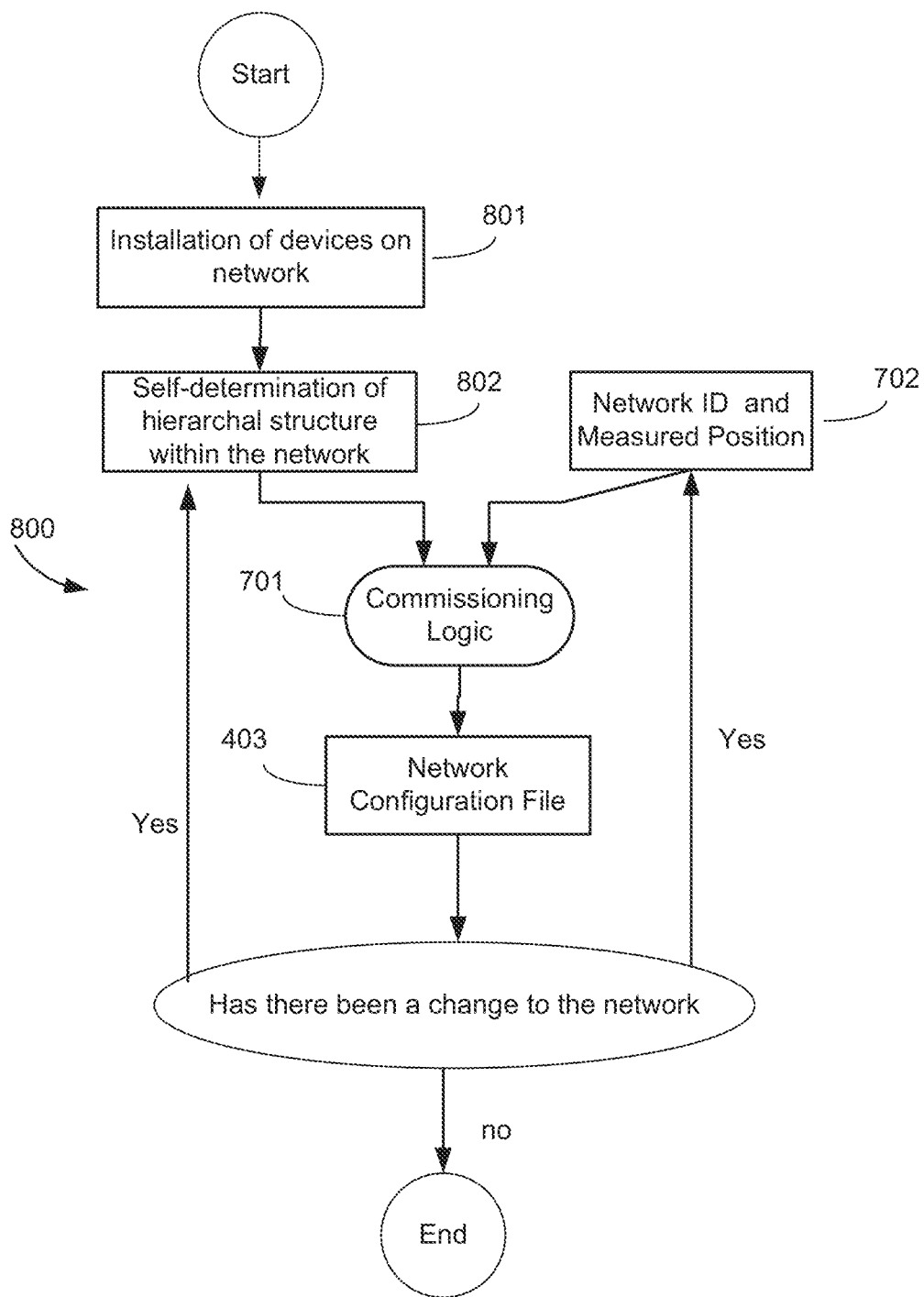
FIG. 8 shows the process in which commissioning logic may be used to generate a network configuration file without the need of an interconnect drawing.

In some embodiments commissioning logic may also generate the network topology portion of a network configuration file by a process 800 as depicted in FIG. 8. In this embodiment, window devices are installed at a site 801 and network components self-determine the hierarchical structure of the network by communicating with each other 802. The hieratical structure of a network may be determined when each component self-reports to the network component above it reporting its network ID (or other ID) information as well the network ID (or other ID) information of any devices below it in the hierarchy. For example, an IGU may report to a WC, which may report to an NC, which may report to a MC. When this pattern in repeated for every component on the network, then the system hierarchy may be self-determined. In this case a network avoids network topology errors that may easily be introduced by deviations from an interconnect drawing that occur during installation. This self-determined structure is then passed to commissioning logic 701 which may use the measured positions 702 of devices to when creating a network configuration file 403.

The instructions and logic for performing the steps shown in FIG. 6 or in other commissioning procedures described herein may be deployed on any suitable processing apparatus including any controller on the window network with sufficient memory and processing capability. Examples include master controllers, network controllers, and even window controllers. In other embodiments, the commissioning system executes on a dedicated administrative processing machine that performs only commissioning or related administrative functions, but communicates with the associated window network. In some embodiments, the commissioning system resides outside the building having the windows to be commissioned. For example, the commissioning system may reside in a switchable window network remote monitoring site, console, or any ancillary system such as a building lighting system, a BMS, a building thermostat system (e.g., NEST (Nest Labs of Palo Alto, California), or the like. Examples of such systems are described in PCT Patent Application Publication No. 2016/094445, filed Dec. 8, 2015 and PCT Patent Application Publication No. 2015/134789, filed Mar. 5, 2015, each incorporated herein by reference in its entirety. In certain embodiments, the commissioning system executes in a shared computational resource such as a leased server farm or the cloud.

Graphical User Interfaces for Controlling and Accessing Information about Switchable Windows Another aspect of this disclosure relates to graphical user interfaces (GUIs) that allow a user to control one or more optically switchable windows from a remote device connected to a window network. Examples of applications that have used GUIs to facilitate user control of windows include Dynamic Glass™, available from View Inc., which is available for iOS and Android mobile device platforms. Other examples of the mobile applications for controlling optically switchable windows are described in PCT Patent Application Publication No. 2013/155,467, filed Apr. 12, 2013, entitled "Applications for Controlling Optically Switchable Windows," by Dharia Shrivastava, which is incorporated herein by reference in its entirety.

Figure 9:
FIG. 9 shows a typical GUI for controlling IGUs in which zones and zone groups are provided in a list format.
Figure 10:
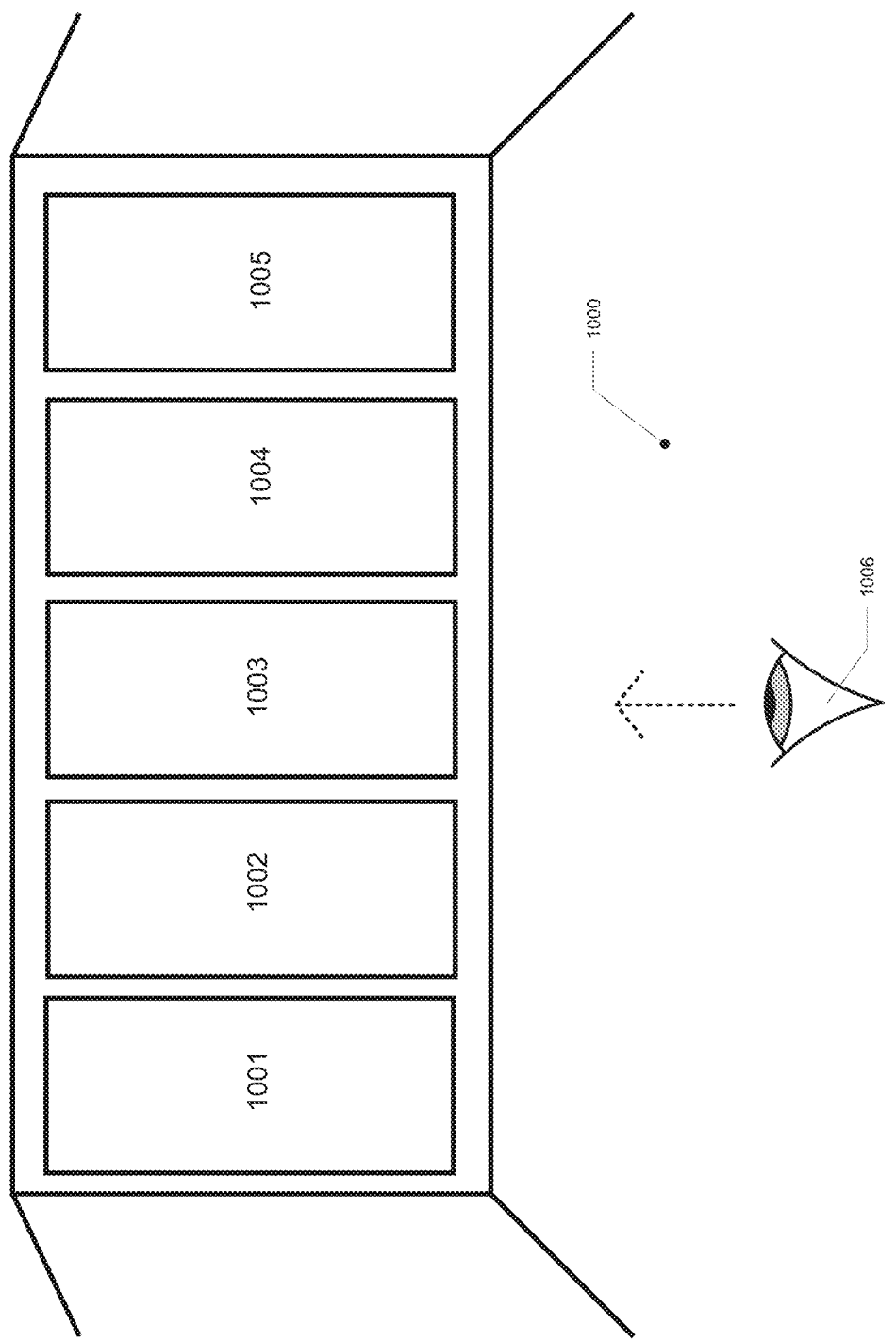
FIG. 10 depicts the interior of a room having five electrochromic windows, as would be perceived from within the room.

While applications that allow a user to control the optical state of electrochromic windows from a remote device exist, they often provide only a limited user experience. FIG. 9 depicts an example of a prior user interface for a mobile device application. Applications such as this one can be cumbersome to navigate for a first time user, when the user finds themselves presented with a list of zone groups (in this case labeled "Groups") 901 or zones from which the user can select which windows to send tinting commands to. For a user that has not memorized the names of the zone groups or specific zones at a particular site, this can be an unwieldy interface to navigate. Take for example, FIG. 10, which depicts the interior of a room 1000, where the room has five windows 1001-1005 adjacent to each other. In FIG. 10, the room is viewed from the perspective of the stylized eye 1006. Even if the windows are given a logical naming system, e.g. sequentially numbered such that 1001="WC1", 1002="WC2", etc., it may not be immediately clear to the user in which order the numbering begins. For example, the numbering may run left to right, or right to left, as seen by an observer. Further, the numbering could begin on the left most window 1001, begin at the right most window 1005, or begin at one of the interior windows 1002-1004. This problem becomes significantly more complex when considering a large site such as a large office building which may contain hundreds of optically switching windows, often grouped into zones and sometimes subzones.

While a list-type interface presenting a sequential list of window controller names is sometimes workable, a more intuitive interface is one in which the windows are graphically depicted in the arrangement and/or orientation in which they actually occur. Further, the graphical depiction of a window may be a smart object. It has been found that a user experience is greatly improved when windows are presented to a user as smart objects that are graphically depicted as scaled images.

A "smart object," as described herein, is a representation of one or more material items that can be manipulated by a user (e.g., by contact with a touch sensitive display) to gather and/or present information about the one or more physical devices the smart object represents. Examples of items that may be represented by a smart object include a window, a zone of windows, a building in which windows are installed, structures contacting or adjacent to windows, and window network components such as controllers, sensors, and wiring. In some embodiments, a smart object also provides a user interface for controlling the network component(s) represented by the object. In some embodiments, user interaction with a smart object triggers a change in window tint or a change in a schedule or algorithm for window tinting. User manipulation with smart objects as described herein may refer to any user action that may be detected and/or measured by the device running the GUI application. For example, smart objects may be manipulated by tactile interaction (e.g. touch or force), sound, motion (e.g. linear or angular accelerations), or a user's position within a site. In a one embodiment, smart objects of windows are depicted graphically as they would be seen by the user. In other words, the objects may mimic features of the actual windows they represent; e.g., the windows' shapes and arrangements (with respect to the room, the building, or other windows). Smart objects may be associated with data in a data store (e.g., a database) or queries for such data. For example, user interaction with a smart object may trigger retrieval of data from a data store or storing data in a data store.

Figure 11:
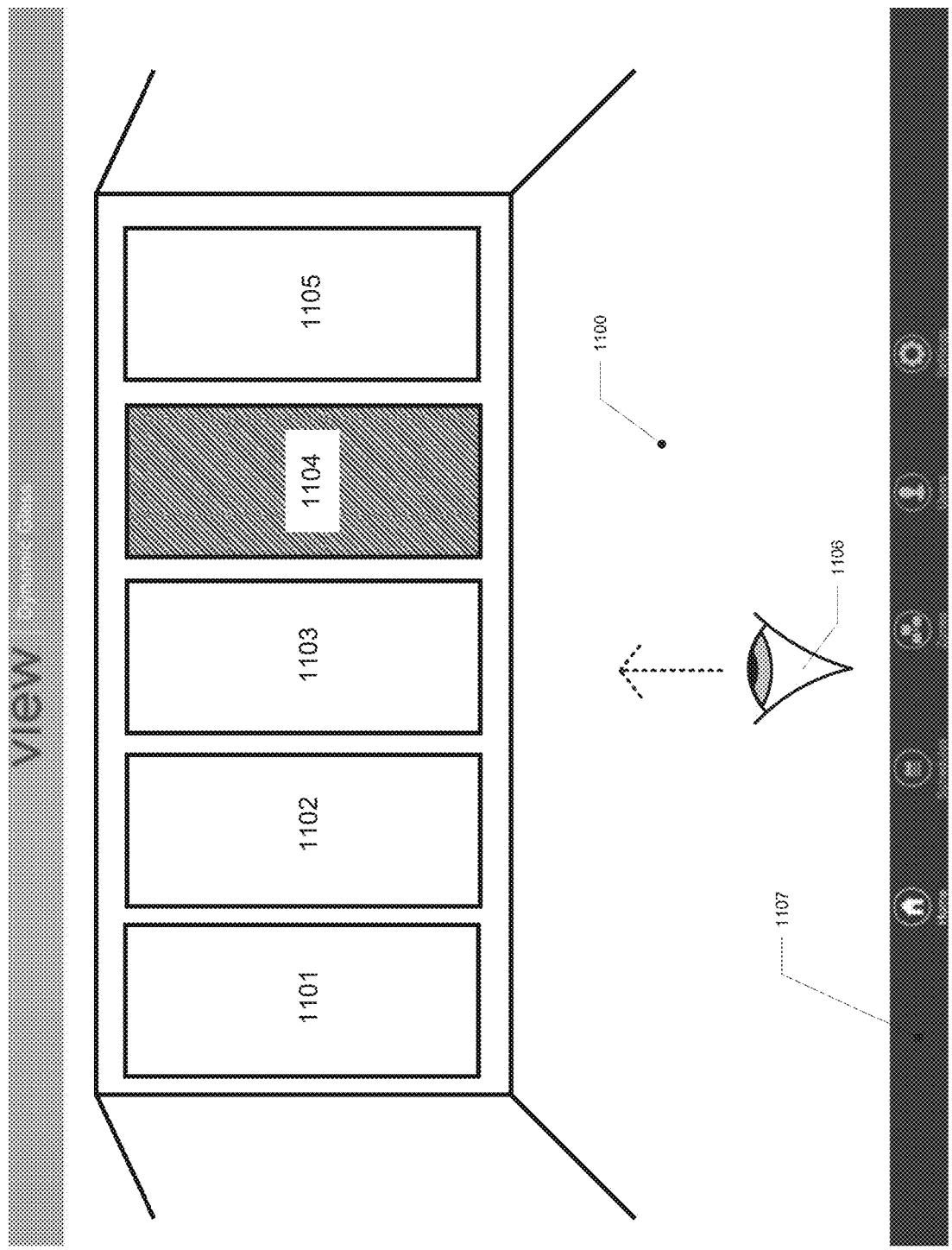
FIG. 11 is a GUI, depicting an interior perspective that uses smart objects to provide a user with control of a window network.

FIG. 11 depicts a GUI displaying smart objects that are presented to a user for the control of five adjacent windows 1001-1005 in room 1000 as shown in FIG. 10. In this example, windows 1001-1005 are represented, in the GUI, by smart objects 1101-1105 which can be easily understood by a user to represent the associated windows. To make smart objects more recognizable, additional features of the room 1000 such as walls and ceilings may also be depicted in a GUI's representation of a room 1100 shown by the GUI. In some cases additional features may be depicted in accordance with a wire-frame model of the room. In some implementations, such as when a mobile device running the GUI has a compass, an orienting feature 1106 will rotate in conjunction with the orientation of the mobile device, and in some cases smart objects themselves are moved and transformed on the GUI such that a user is presented with a similar orientation view to that which is perceived by a user. Using GUI embodiments such as the one shown in FIG. 11, a user may select a window by simply touching it, moving a cursor to it, clicking on it, or in some other way may selecting the smart object. In some cases, smart objects such as smart object 1104, representing window 1004, may change in appearance (e.g., becoming shaded, highlighted, enlarged, etc.) to indicate that it has been selected by the user, for example by touch or force. In some cases, selecting a smart object results in the GUI displaying information about the network component the smart object represents or displaying controllable options for a user. Examples of information that may be displayed include component type (e.g., an electrochromic window of a defined size, a sensor or controller of a particular type, etc.), an identification number or code (e.g., a CANID, LiteID, serial number, or IP address), manufacturing date, installation date, number of cycles (for windows), associated components (e.g., the window controller when the object is an electrochromic window), a zone and/or subzone to which a window belongs, and the like.

Creating zones in a GUI with smart objects may be an intuitive task. Continuing with the example of room 1000, a user wishing to create a zone group of windows 1002, 1002, and 1003 from a GUI that displays a list of zones may first have to decipher which zone labels correspond to which windows. Alternatively, using a GUI with smart objects the process of selecting the three leftmost windows (1001-1003) may be done though initiative user manipulation. For example, the left three windows (1001-1003) can be selected by tapping on 1101-1103 individually, or by swiping a finger over 1101-1103. Before or after this step, the GUI receives user input requesting that the selected windows become part of a zone. By a similar process, windows may be removed from a zone. This zoning process will change a zoning property of the selected smart objects. An appropriate control system operating over the window network presents this change to a master controller or other entity responsible for maintaining zone information.

In the same way that commissioning may be automated with geo-positioning, window position information for a graphical user interface may be automatically generated with logic that links the positional coordinates and the network ID of each network component or combination of components (e.g., optically switchable window and associated window controller). In fact, the commissioning logic described above may be employed to provide the location and network ID for the GUI.

In certain embodiments, to generate a user interface, application logic responsible for rending the GUI for a building or other structure first takes inventory of all the devices on the network and identifies and/or produces corresponding smart objects that graphically represent the network components. In some cases taking inventory simply means accessing a network configuration file (or similar file containing window position and controller information), and in some cases taking inventory requires requesting information from various network components. Typically the smart objects in a GUI are represented by scaled images of the components they represent. In some cases this may require correlating a CAN ID or controller ID to a smart object that has been designed for a particular device type. In some interfaces, smart objects are used only for electrochromic windows, however, other applications may include smart objects for other devices, or group of devices, on the network. Using coordinate information, control logic then displays the identified smart objects in a way that represents their physical location.

As explained, in some embodiments the positions of network components to be displayed in the GUI are provided or determined through geo-positioning. In some embodiments, positional coordinates are provided from a network configuration file or from an interconnect drawing. In yet another embodiment, coordinate information is manually provided to GUI logic by an installer after inspecting an architectural drawing or after taking manual measurements at the site.

A generated user interface, where network components are represented by smart objects, may be saved in a computer readable file format. The GUI logic may be stored and executed at various locations on the window network and/or a user device for displaying the GUI. In one embodiment the GUI logic executes on a master controller. In some embodiments, a network configuration file containing window location information along with network IDs, lite IDs, etc. is passed to a remote device (e.g. a phone or tablet) having all or part of the GUI logic required to render and/or present the required graphical user interface. In other embodiments, GUI logic resides in the cloud and generates a file which can be downloaded to devices such as computers and phones running the graphical user interface.

While a GUI is often presented to a user on a remote device, files containing the information generated by GUI logic may be stored at a number of locations including but not limited to, a network controller, a master controller, a remote device, or the cloud. In some embodiments the information generated by GUI logic is stored in a network configuration file. In some cases the GUI logic is executed each time the application which presents the GUI is accessed by a user. Examples of devices on which the GUI may be displayed include smart phones, tablets, desktop computers, laptop computers, televisions, transparent displays located on optically switchable devices, etc.

Figure 12:
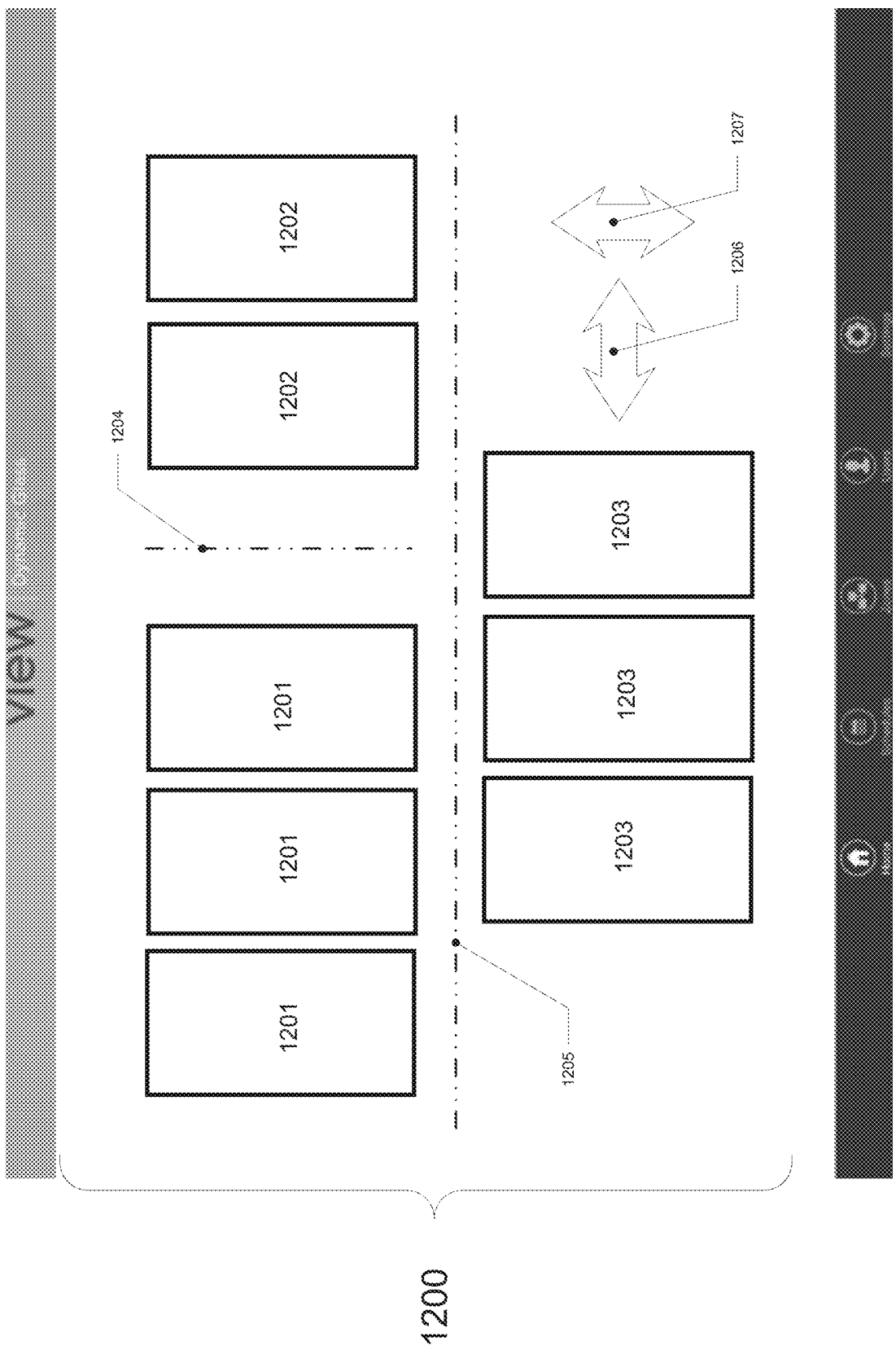
FIG. 12 is a GUI, depicting a 2-dimensional perspective that uses smart objects to provide a user with control of a window network.

FIG. 12 depicts an embodiment in which multiple floors and rooms may be shown in the same view (e.g., on a screen of a user device at one time). In some embodiments a space or demarcation 1205 is used to distinguish between windows located on one floor (e.g. 1203) from windows located on a different floor (e.g., 1201 and 1202). In some embodiments, windows that are not typically viewed at the same time on a single screen, such as the windows depicted by smart objects 1201 and 1202, have an enlarged space or demarcation 1204 between them that is used to distinguish groupings of windows. In embodiments where there are multiple IGUs on a particular floor, a GUI may provide options for panning the presented in view 1200 laterally through user manipulation, for example with a touch sensitive button 1206. When a site contains many floors, a user may scroll through the floors with for example, a touch sensitive button 1207. A finger swipe may serve the same purpose.

In some cases a GUI presents a 2D or 3D perspective of a building, room, or structure by making use of a wire-frame model. As used herein, a wire-frame model is a 3D model created from a series of lines which depicts the shape of the represented structure. Typically, lines appear at edges of continuous surfaces thus providing a visual outline that allows an observer to appreciate the structure that the model represents. In some cases lines may also correspond to features that would easily be distinguished by the human eye (e.g. a change in the coloring or material along a surface of a building). Wire-frame models used in a GUI may be generated from a variety of sources. In some cases, a wire-frame model of a particular site may be adapted from architectural drawings or design models of a building. In some cases, a wireframe model may be quickly created by a window network installer using CAD software such as Trimble Navigation's SketchUp™, Autodesk Revit, and the like. In some cases, a wire-frame model may be patterned or textured such that the model more closely resembles the structure it represents. In some cases, images may be patterned onto a wire-frame model to provide the model with a more realistic appearance. In some cases, a wire-frame model is created for the interior of a building using a 3D camera, such as Mattherport's Pro 3D Camera.

Figure 13:
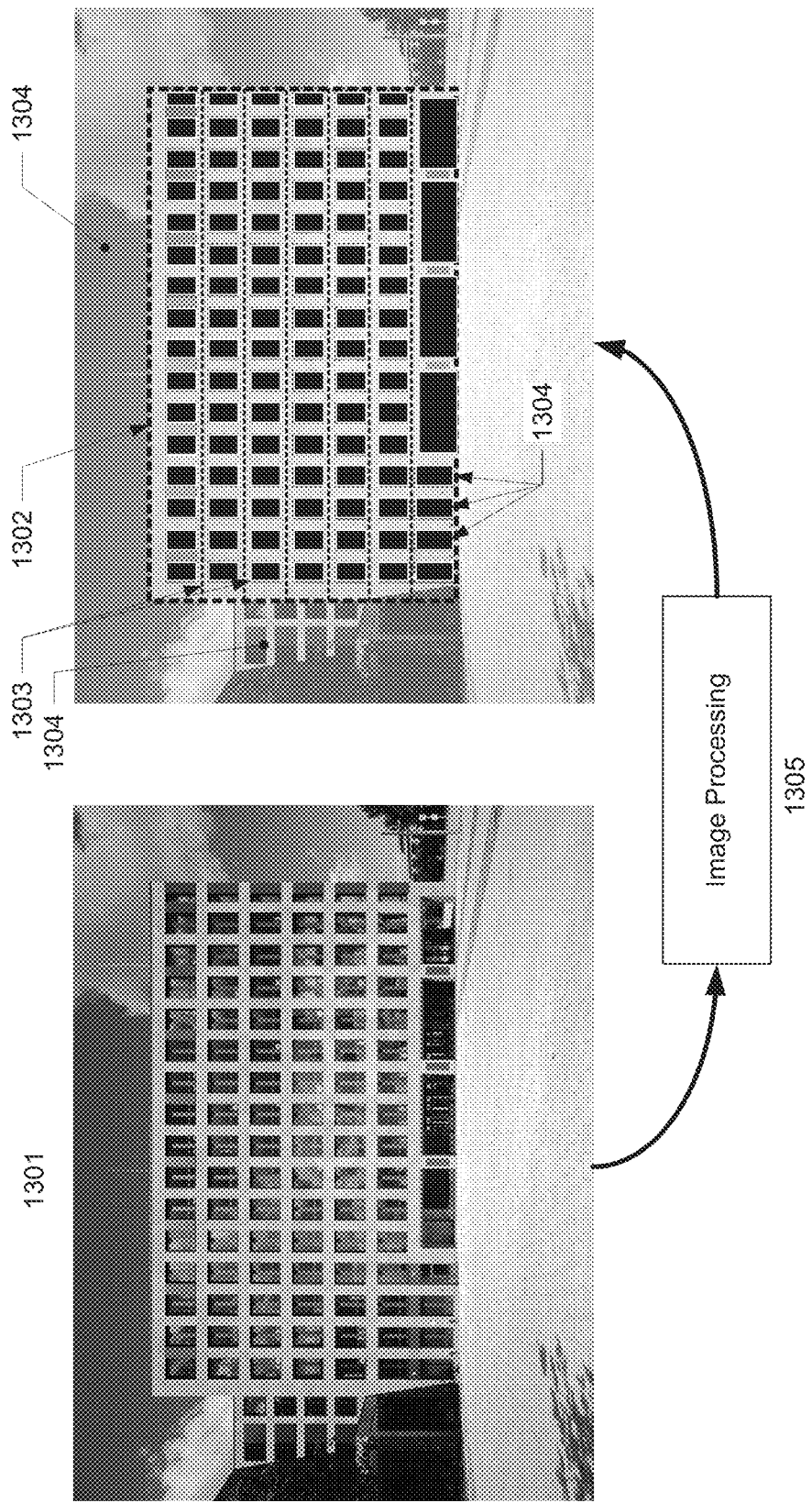
FIG. 13 is depicts the process of generating a wire-frame model from an image.

FIG. 13 depicts a process of creating a 2D wireframe of one exterior surface of a building. In this process a user first takes or selects a picture 1301 of the exterior of a building, e.g., a picture may be taken a cell phone or tablet. The picture is then processed by image-processing software that recognizes patterns in the image, corresponding to structural features of the building, and creates a wire-frame model 1302. In this example, the wire-frame model has identified floor demarcations of the building 1303 and window locations 1304. In some cases, an installer may have the ability to edit the wireframe model such that features such as an unwanted part of a building 1304 are not included in the wire-frame model. As shown in FIG. 13 the wire-frame model may be overlaid on top of the picture 1304 used to create the model such that the wireframe model is more recognizable when presented in a GUI. The location of windows 1304 on a wire-frame model may be quickly paired to smart objects representing specific windows to locations on the wire-frame. In some cases, such as when geo-positioning methods are used, this is done automatically by the GUI logic. While the process describe depicts a process for creating a 2D wire-frame model, a 3D model may easily be created by taking additional pictures of a building from alternate perspectives. In some cases, the image processing 1305 is done directly through commercial software such as Revit made by AutoDesk, Inc. of San Rafael, California, and in some cases the image processing is done using software tailored for generating a GUI based upon a wireframe model. In some cases tailored software for image processing may be run from a smartphone or tablet allowing an installer to quickly create a wire-frame model immediately at the time of installation.

Figure 14:
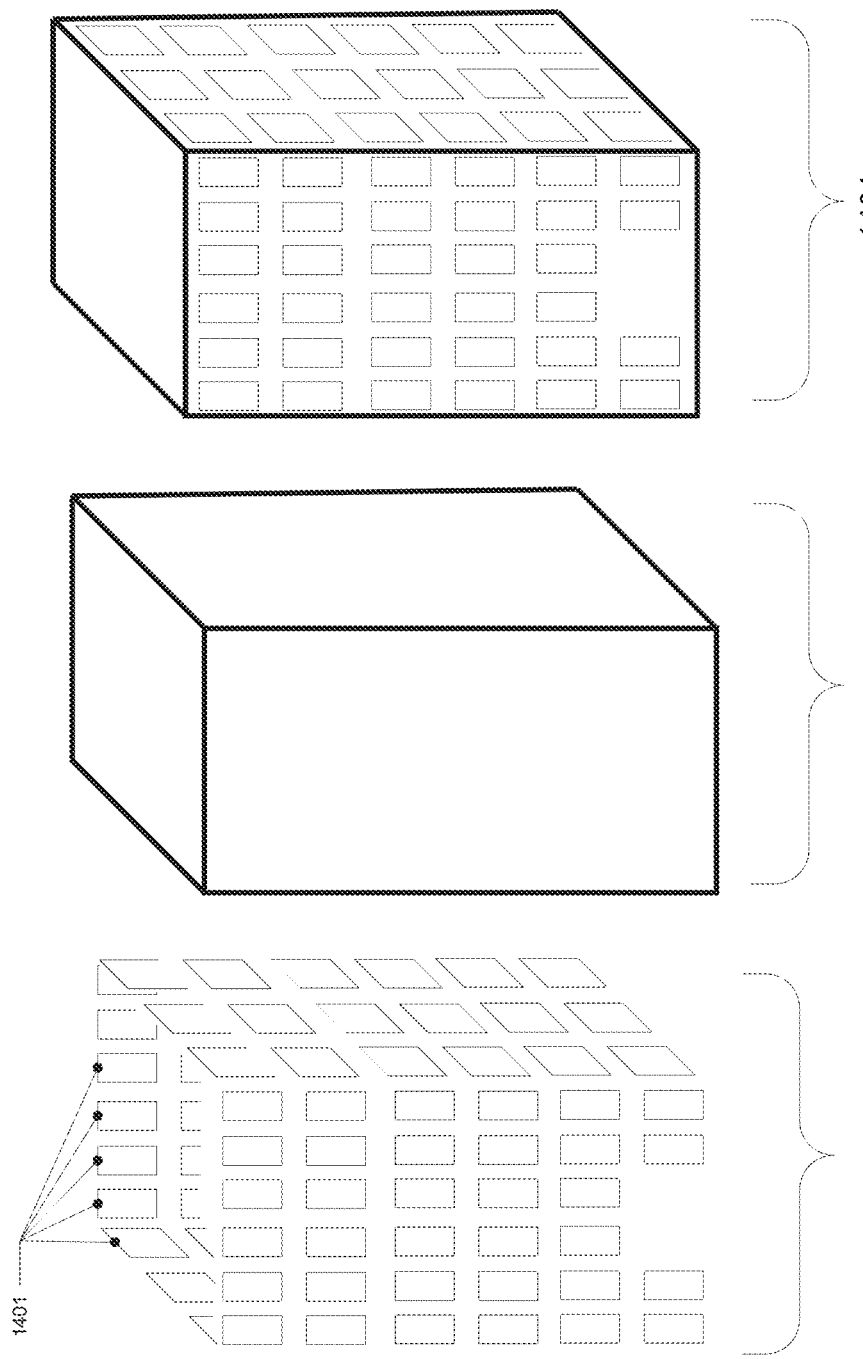
FIG. 14 depicts how smart objects along with their determined location may be used to generate a more recognizable model of a building

FIG. 14 depicts an embodiment in which a collection of smart objects (represented by sample smart objects 1401) representing optically switchable windows and/or associated IGUs may be used by GUI logic to create recognizable wire-frame models of buildings and other structures at which a window network is installed to further facilitate the selection and control of IGUs. A wireframe generated by GUI may be useful, for example when there is not already an available wireframe model for a building. In some cases, it is necessary to provide orientation information to GUI logic such that an accurate wireframe model is created. To appreciate the importance of orientation information one may consider an IGU in the north-east corner of a room. If the window is geo-located by its upper corner, it may be difficult to determine if a window is on the north side of the room, the east side of the room, or if the window is a skylight in the room. In some cases the orientation of an IGU may be provided by information from an interconnect drawing, a network configuration file, or from sensors such as inclinometers or a compasses associated with the IGU device. GUI logic is then used to create a depiction of all the IGUs, often resembling the structure of a building 1402. In some cases, GUI logic creates a wire-frame or shell model 1403 of the building using the placement and orientation of smart objects 1401. In some cases, the smart objects 1401 are overlaid on top of a wireframe 1403, to create a more recognizable building structure 1404.

The building-wide views presented in FIG. 14 may also be useful to a user such as a building or network administrator, who has responsibility for all windows, to quickly select windows or a region of building where windows are located. By selecting a region or window from the full building view, the GUI may next depict a "zoomed in" view of the region selected. This "zoomed in" view may not show the entire building, but only the window or windows within the region selected. In some cases a "zoomed in" view may be shown from a different perspective than a full building view to show the selected region more clearly.

Figure 15:
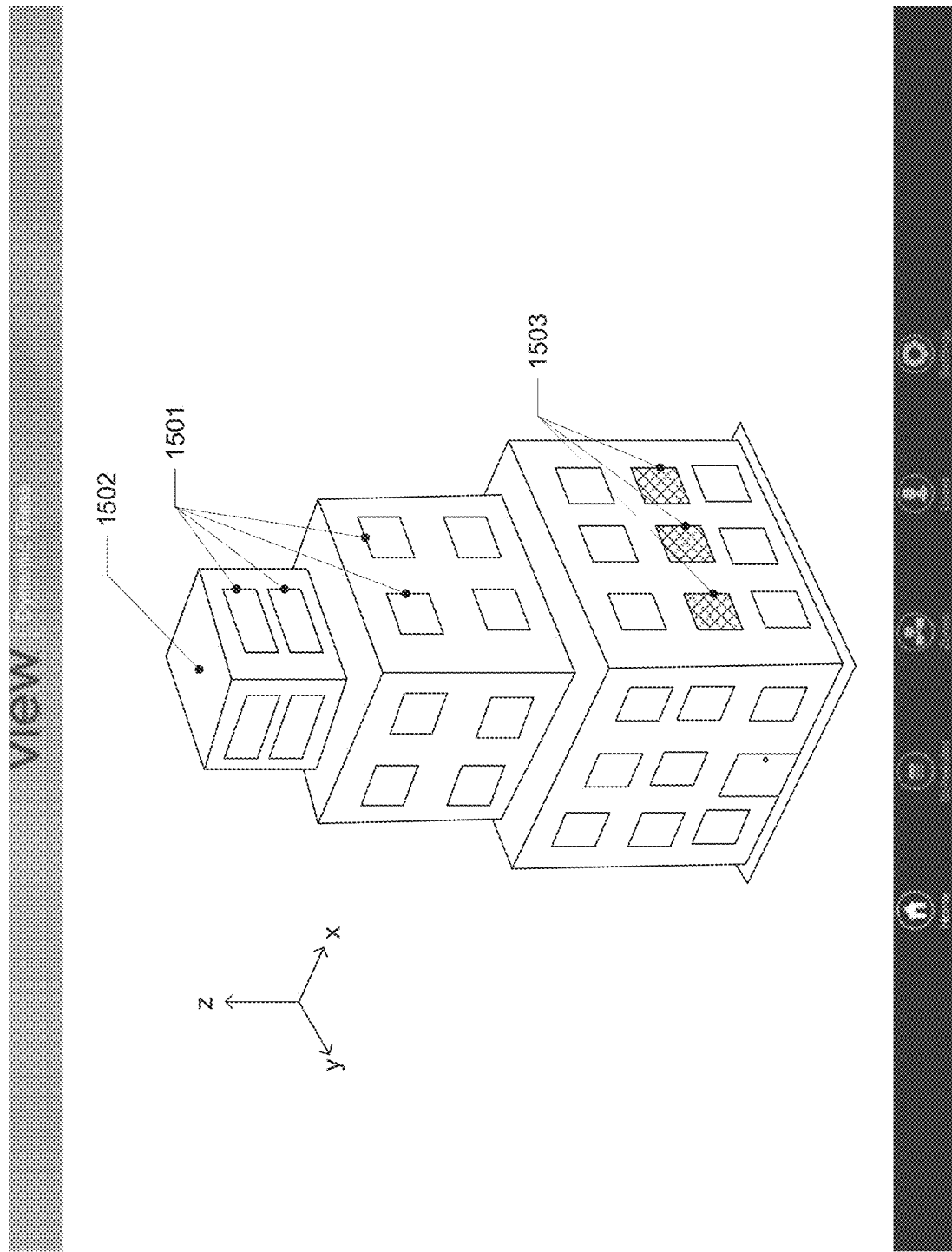
FIG. 15 is a GUI, depicting an exterior perspective that uses smart objects overlaid on a 3D model of a building to provide a user with control of a window network.

FIG. 15 depicts an embodiment in which smart objects 1501 representing IGUs are overlaid on a 3D model of a building 1502. In cases where smart objects are overlaid on a 3D model of a building, such as a wire-frame model, a representation of the building is created that it is immediately recognizable to a person who has seen the building from the outside. Such embodiments may be particularly useful for a user such as a facilities manager who is interested in controlling many windows at a particular site. In some embodiments, smart objects may be shaded 1503 to indicate a current tint state. In certain embodiments, the 3D rendering of the building 1502 is a smart object as well, e.g. it may be manipulated by the end user by turning in along a z-axis so the end user can see smart objects on each face of the building. In another example, the end user touches on the building object 1502 (e.g., by touching at a location such as the roof or the space between windows) and information is displayed about the building such as, name and location of building, job number (for window supplier), number of building in this job site (e.g. 1 of 3 buildings in installation), number of windows in installation, square footage of windows for installation, square footage of windows on facade showing in GUI, zoning information for facade showing on GUI, etc.

Figure 16:
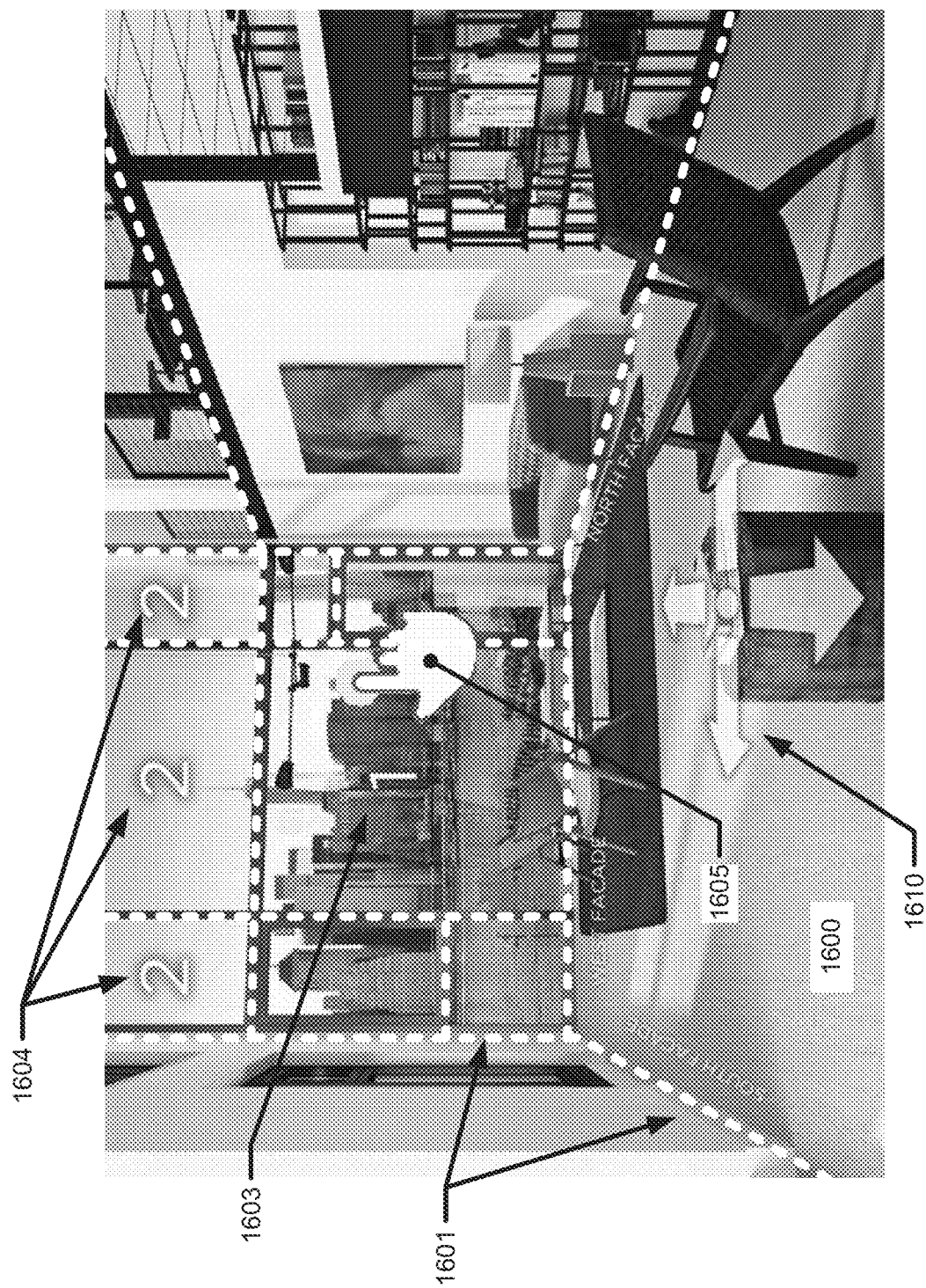
FIG. 16 is a GUI, depicting an interior perspective making use of a wire frame model overlaid with pictures that uses smart objects to provide a user with control of a window network.

FIG. 16 depicts a GUI embodiment showing the perspective from the interior of a room 1600. In this example a photograph of a room's interior has been paired to a wireframe model of the room 1601, such that smart objects of optically switchable windows 1603 and 1604 appear as overlaid features on the on the windows they represent. In doing so a life-like user interface is provided to the user. While the wireframe model 1601 is depicted in FIG. 16, in some embodiments the wireframe itself may be hidden from view so as not to distract a user. In some cases such as when the interior of a building is modeled, for example using Matterport PRO Camera to create an immersive virtual space, a GUI may also include navigation features 1610, such that one can move to a different perspective within the room or move to an adjacent room. In some cases the image depicted in the GUI may be a 3D rotatable image of the room, such as used in online real estate viewing applications. In some embodiments, the GUI may further include notifications to a user based upon the user's interaction within the GUI interface, e.g. an icon 1605 may appear to notify a user that they can change the tint status of the selected window.

In some embodiments a GUI perspective, such as the one depicted in FIG. 16 may depict live picture or video or stream from the room 1600. For example, a GUI interface may be updated from a security camera, e.g., a Nest Cam security camera, such that a user sees the appearance of a room in real time. This may be useful to a remote user, such as a facilities manager, to determine if the space is being used and how the lighting in the room appears.

Figure 17:
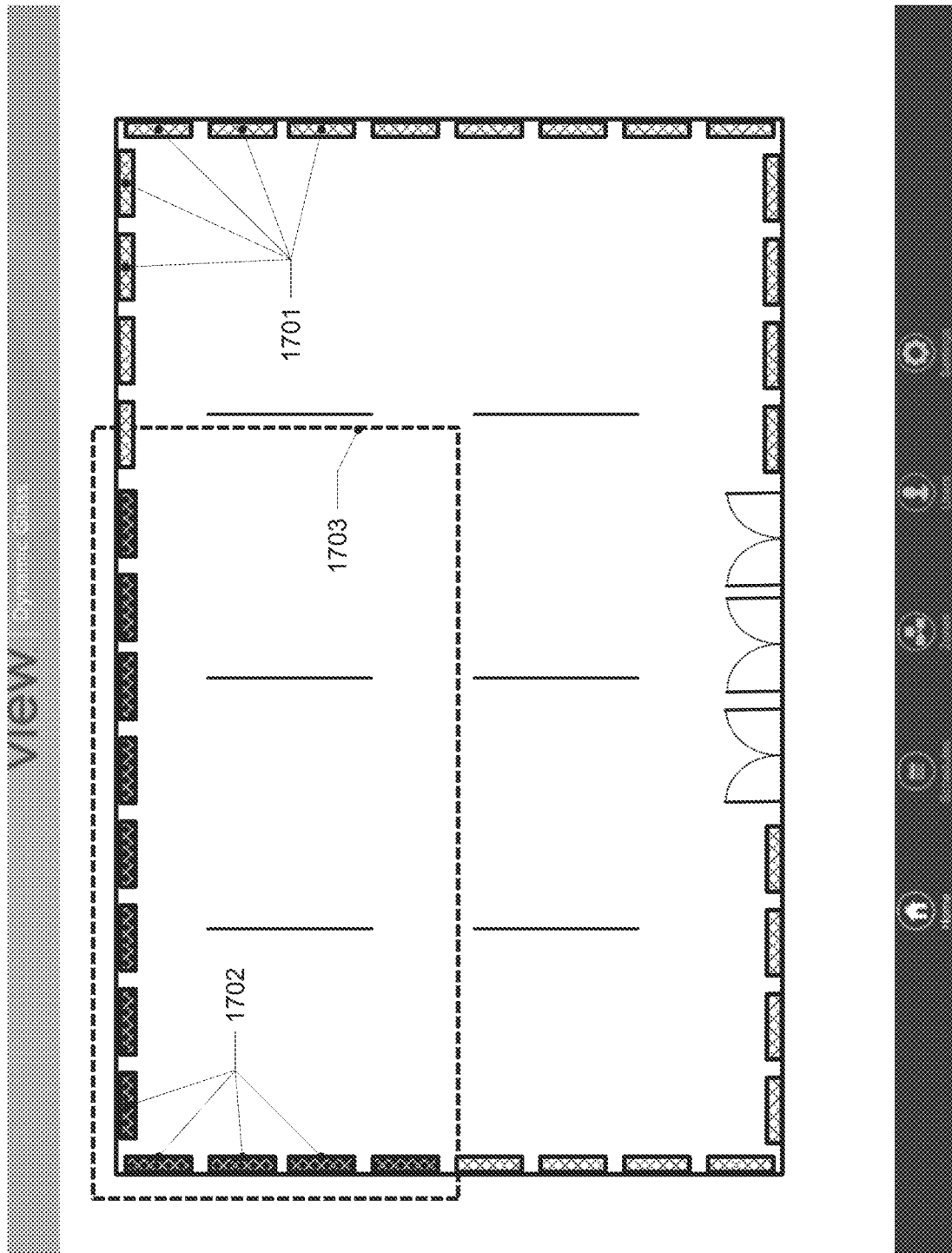
FIG. 17 is a GUI, depicting a 2-dimensional floorplan perspective that uses smart objects to provide a user with control of a window network.

FIG. 17 depicts a GUI embodiment in which GUI logic is used to overlay smart objects of optically switchable windows 1701-1702 onto a 2D floorplan of a building. In some cases a 2D floorplan is created architectural drawings and in some cases a floorplan is manually created by an installer. In some instances this perspective provides advantages over 3D perspectives, such as when there are many windows along one side of a building and it would be easier to select a window based upon a user's knowledge of the interior of a building. Using this perspective, smart objects may be easily selected by, for instance, by dragging out selection rectangle 1703 over the desired windows 1702 which are shown as colored indicating that they have been selected.

In some embodiments the software using the GUI also allows a user to create customized views. For example, a customized view may be created that only displays smart objects of devices that are controllable by a user, thus limiting a user's control. In some instances a customized view may only show smart objects that are within a specified proximity to a remote wireless device from which the GUI is presented to a user. In other embodiments a customized view may be created based upon IGU units that are most frequently used or IGUs that that have been selected by a user to be included in the customized view. For example, an office worker may have GUI/software configured to show only the windows of their office and a conference room where they frequently holds meetings.

Figure 18:
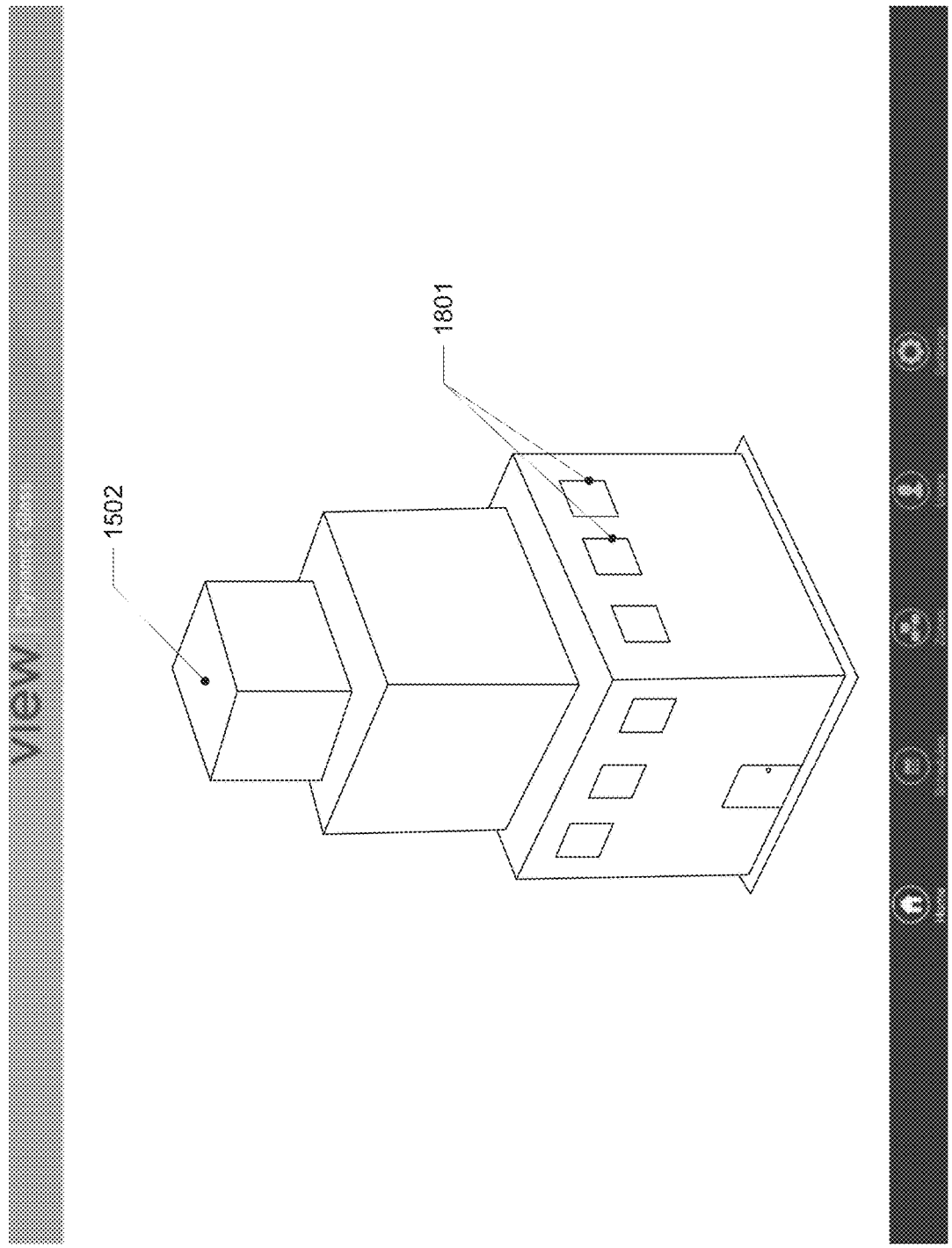
FIG. 18 is a GUI, depicting a customized view in which a chosen selection of smart objects is displayed.

FIG. 18 shows an example of a customized view 1502 of building in which only smart objects 1801 for optically switchable windows on the third story are displayed. The illustrative GUI shown FIG. 18 may be relevant to, for example, tenants who have rented out selected rooms within a building. To avoid burdening the tenants with options that are not relevant to them and/or to prevent them from controlling windows in rooms not leased to them, the smart objects corresponding to other areas of the building have been removed. For example, the customized view may also remove one tenant's ability to control the tint state of windows belonging to a different tenant.

In some embodiments customized views may also be created by a user having a preference for a particular vantage point. For example one user may typically prefer an interior GUI perspective such as the one shown in FIG. 11 or 13, while another user, such as a facilities manager, may typically prefer an external perspective such as the GUI depicted in FIG. 15.

In some embodiments the perspective depicted by a GUI, and in some cases the perspective of a customized view, may be dependent upon the location of the remote device providing the GUI. For example, whether an interior perspective (such as FIG. 11) or an exterior perspective (such as FIG. 15) is provided to a user may be dependent on if the remote device running the GUI is determined to be within a room of a building outside a building.

Any of the previously disclosed GUI embodiments may also allow for a simplified access for retrieving window information. Oftentimes gathering window information may require steps that are perceived as being laborious to a user. For instance, if a user wishes to collect information regarding a particular window he or she might first have to locate the window on an interconnect drawing and collect a lite ID. Once a lite ID is determined, window information may then be retrieved by contacting a team of support engineers or by referring to a database comprising lite ID information.

Using one of the previously described embodiments a user may be able to collect window information directly from the application running the GUI. For example, after selecting a window a user may be able to select an option requesting window information. Upon requesting information through interaction with a GUI, for example by pressing a button, the GUI may display information including but not limited to a CAN ID, the physical window coordinates, the window dimensions, the current tint level, the manufacturing date, the manufacturing facility, the health of the window when it left the factory, and the number of tint cycles that the window has undergone.

In some embodiments, a user may be presented with an option to contact a support team to diagnose a problem. In some cases, window information may be included with the communication to the support team. In some embodiments, a user may be presented with an opportunity to describe a perceived problem through text. In some embodiments a user may attach images depicting a perceived problem, for example, a user may attach a photograph captured on the remote device. In some cases, additional information collected on a window controller or other network components, such as the leakage current or usage history of an IGU, may also be sent to a support team to help identify a problem. In one embodiment, the end user is presented with the option of alerting a support service using one of the aforementioned smart objects, e.g., a window smart object. For example, when the smart object is touched on the screen, a menu appears that includes a selection indicating a problem with the window. When the user selects this choice, another menu (e.g. a pull-down menu) appears to allow the user to send an alert or another message to the support service. The problem may or may not be already known to the support service, e.g. a tinting problem may be known to the support service due to I/V data collected by the service, or e.g., the end user may see a problem not known to the support service, such as a compromised seal allowing moisture into an IGU (though this may be indicated by I/V data to the support service if the electrochromic device inside the IGU is not otherwise hermetically sealed).

System for Viewing Optically Switchable Windows

In certain embodiments, a software tool (also referred to as a facility management application) provides a three-dimensional, user-recognizable, graphical user interface for interacting with optically switchable windows in a building or group of buildings. In some implementations, the tool includes a user mode that allows a user to control or receive information about windows and a configuration mode that allows a user to design, set up, and/or configure how the software operates in the user mode of operation. The facility management application is described using these two modes, however, it should be understood the features described as being in the user mode may also be present in the configuration mode and vice versa. Further, separate tools or modules, rather than a single application, may be used to implement the two modes. The graphical user interface of the facility management application may be displayed on variety of electronic devices such as a computer, phone, or tablet. In some cases, the graphical user interface may be displayed on an administrator console and in some cases, the graphical user interface may be displayed on a transparent display located on the surface of an optically switchable window. Examples of transparent display technologies that may be incorporated with optically switchable windows are described in U.S. Provisional Patent Application No. 62/523,606, filed Jun. 22, 2017, and titled "ELECTROCHROMIC WINDOWS WITH TRANSPARENT DISPLAY TECHNOLOGY," which is herein incorporated by reference in its entirety.

The tool provides a graphical user interface that uses 3D building models that may have already been created for another purpose, eliminating or reducing costs of creating a building model solely for the purpose of the software tool. For many modern buildings in which a window network is installed, an accurate and detailed 3D building model already exists. Such models are used by architects and engineers when designing new buildings, and such models may be meticulously updated when a building is retrofitted. By using such a 3D building model, a tool may generate a powerful and intuitive graphical user interface that allows a user to view detailed information about windows on a window network, and may allow the user to control switching of such windows.

A 3D building model uses mathematical representations that reflect the three-dimensional geometry of a building. The model may be implemented as a file that contains parameters that, when interpreted by appropriate software, can provide details about the building's features and its geometric properties (e.g., dimensions, surfaces, and volumes defined by one or more surfaces). Features of a building (e.g., any structural component or any component placed within a building such as furniture) are represented by one or more surfaces. For example, a window may be represented by a single surface representing one or more window panes. In a more detailed or accurate model, a window may be represented as a plurality of surfaces which define all or most exterior surfaces of the window including the window frame. In some cases, a feature may be an accurate computer-aided design model for a part or particular feature that was used for the design or manufacture of that feature. Details of a feature in a building model may include details such as an exact location of a its one or more defining surfaces, dimensions of the defining surface(s), the manufacturing information of the feature/component, history information of the feature/component, etc. as explained below.

A viewer module may read the building model file to generate a three-dimensional visualization of the building which may be depicted on a screen of an electronic device. The three-dimensional visualization is rendered from a plurality of surfaces of the various building features, each of which is defined by one or more polygon shapes. The surfaces correspond to the features or physical aspects that make up a building. For example, a beam or a framing structure may each be represented by one or more surfaces within the building model. The resolution of the surfaces may be very high; sometimes the dimensions reflected in a model may be within a few centimeters of the actual building structure. In some cases, surfaces, when rendered, are colored or textured to more accurately reflect the visual appearance of a building. Within the building model, surfaces are identified with an identifier such as a node ID, although such IDs need not be displayed with the viewer. In some cases, wireframe models or shell models that are described elsewhere herein may be compatible with the software tool or application.

Building models are typically generated during the design phase of a building and may be provided by the building owner or a vendor of the owner who is responsible for design and construction of the building. In many cases, 3D building models are generated using computer-aided design software such as Autodesk Revit or another similar software design package. In some cases, a building model is created only after the construction of the building, in which case it can take advantage of a locating detecting system such as Light Detection and Ranging (LiDAR). For example, a building model may be generated using a LiDAR camera, such as the Matterport 3D camera. In some embodiments, a 3D model of the building space(s) may be generated using an omnidirectional beacon that sends, e.g., RF waves, and then receives input from energy reflected back, or transmitted back from one or more devices that receive the RF waves (reflected or directly), to one or more receivers. One such system that has this capability is the Ossia™ wireless powering system as described in U.S. Patent Application serial number U.S. Ser. No. 14/945,741, filed Nov. 19, 2015, and published as US20160299210A1, titled "Techniques for Imaging Wireless Power Delivery Environments and Tracking Objects Therein" which is herein incorporated by reference in its entirety. In certain embodiments, EC windows are configured to receive and/or transmit wireless power. When used in conjunction with such wireless power capabilities, the EC system can auto-commission as described herein, where the building or space map is generated by the EC window system/window network using its wireless power transmission subsystem.

Three-dimensional (3D) models often contain various building information that may be relevant to an engineer, architect, or a facility manager. A building model file may contain metadata corresponding to building features and how those features interact with one another. As an illustrative example, consider a pipe used to deliver natural gas within a building. Metadata within the file may include information linked to a representation of the pipe (which may be displayed using one or more surfaces) that includes information such as the model, manufacturer, date of installation, installing contractor, material, dimensions, and fitting type of the pipe. As another example, all or a portion of an I-beam in a building may be represented as a surface, and such surface may contain information about the location of the I-beam, its structural materials, its vendor, etc.

In yet another example, surfaces or features of a building model may be indexed within a model file using tags or keywords. These tags may be included in the name associated with the surface/feature, or in the corresponding metadata. A surface or feature may have tags that link the surface/feature to various categories. Categories may be based on, e.g., feature type, feature model, size, location, or any other relevant parameter. The facility management application may then, in some cases, identify features corresponding to a certain tag. The facility management application may also be used to search features within the building model. For example, a user may identify all the overhanging features on the west facing, $3^{rd}$ floor of a building if a user enters the following search: [feature type: window overhang], [floor: third], [direction: west]. In some cases, these tags may be automatically added to the feature/surface during a building design by the software used to generate the building model. In some cases, such as when a feature is added to a building model from a library of features, the feature may be imported into the building model already having appropriate tags. When a building is changed by addition, replacement, etc., the building model may be updated to reflect the changes. For example, if a building is retrofitted, features may be added or removed from the building model. In some cases, the representation of surfaces in a building model remains unchanged, but the metadata information about affected surfaces is updated. For example, metadata for a structural component may be updated to indicate the date which the component was last inspected for safety.

In some cases, the building model is generated with a window network in mind. For example, components of a window network (e.g., IGUs, network controllers, and window controllers) are added to a building model when the model is first created, or at a later time. When such components are added to the model, each of them is defined as one or more features and/or one or surfaces. In some cases, components of the window network are added from a library of window network components in which the components are represented by their dimensions, appearance, etc. all in the form of corresponding metadata that can be included in the building model.

In some cases, the building model is provided in the form of a very complex file that includes information that is not essential to generating a graphical user interface for optically switchable windows. For example, the building model may include nonessential information such as an editing history of the building model, or metadata information relating to components that do not interface with a window network. Such information may be removed before the model is used to generate or render features of a graphical user interface. In some cases, files may have an ".RVT" file type or another proprietary file type that is generated using a computer-aided design software packages such as Autodesk Revit. In some cases, building model may undergo a post-production process that makes the model suitable for use by the facility management application. In some cases, the building model may be exported and saved in a simplified format in which the nonessential information is removed from the file. In some cases, the building model may be saved in an open source format that may be easily accessed via a plurality of electronic device types and/or across various operating systems. For instance, in some cases, a building model may be saved in a format that may be accessed by a viewer module that is compatible with or integrated within a web browser.

Figure 19:
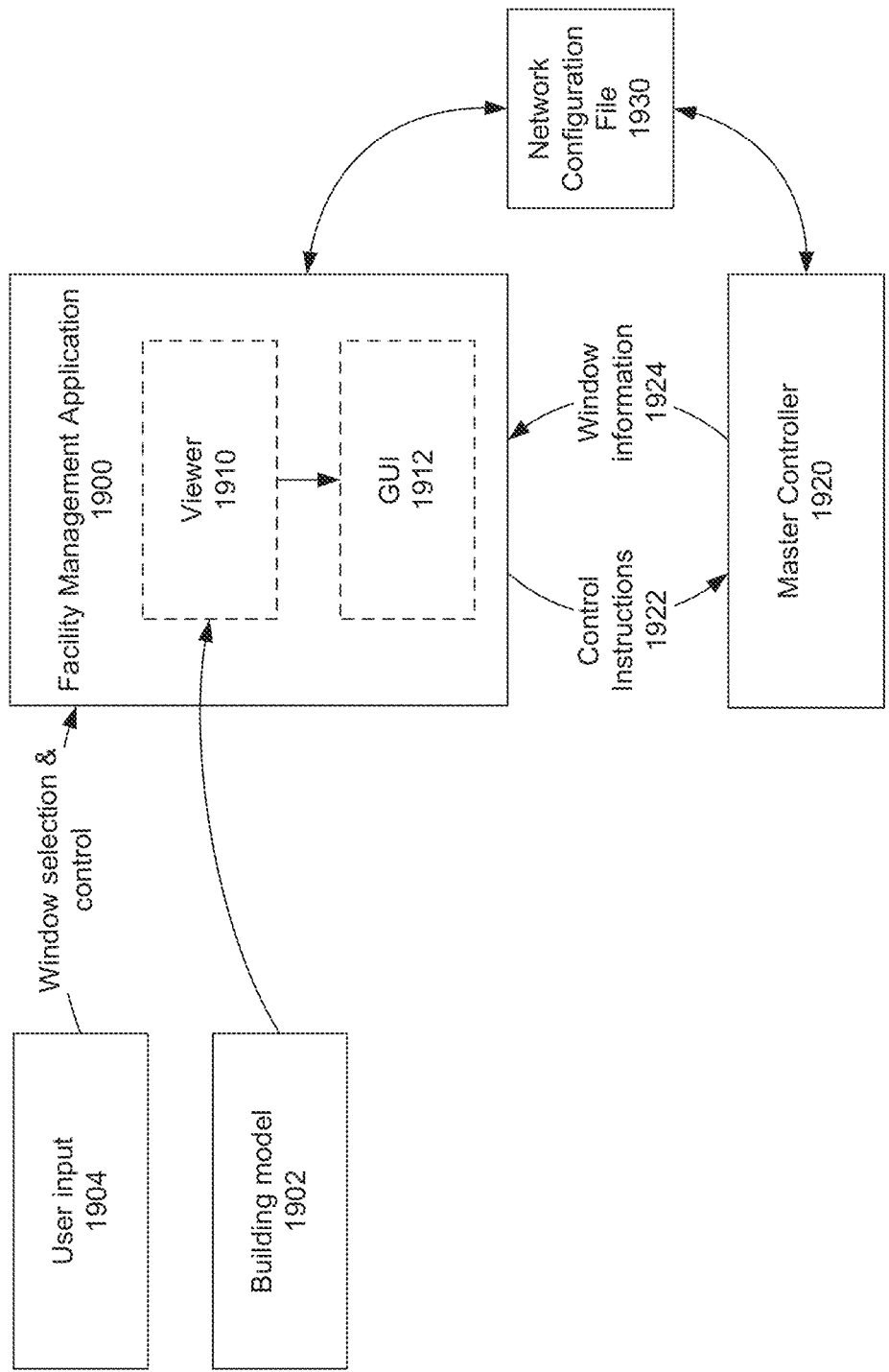
FIG. 19 is a schematic showing the structure of the facility management application.

FIG. 19 provides a block diagram showing the structure of the facility management application 1900 (an example of the tool mentioned above). The application is configured to receive a 3D building model 1902, or at least information from the model, and interpret the building model with a viewer module 1910. The application is also configured to receive window information 1924 from a source of information about the window network (e.g., a master controller 1920 or another component on the window network). Such information may include network IDs (e.g., CAN IDs) and/or other information uniquely identifying individual windows on the window network. Still further, the application is configured to receive a network configuration file 1930 that contains information linking window network entities (e.g., optically switchable windows) to node IDs on a building model. The application may also be configured to receive smart objects for optically switchable windows handled by the application (or at least receive sufficient information to produce smart objects for such windows). The application may be configured to receive these various pieces of information by one or more application programming interfaces or other appropriate software interfaces.

The viewer module interprets the building model (or information from such model) in a manner allowing building windows to be displayed as smart objects that are in agreement with received window information on a graphical user interface (e.g., on a computer, a phone, a tablet, a transparent display associated with an optically switchable window, or another electronic device).

The depicted facility management application is also configured to receive user input 1904 which may be used to update the network configuration file 1930 and/or provide control instructions 1922 for controlling optically switchable windows on the window network. In certain embodiments, the application is configured to receive user input for any purpose described herein via a touch screen, a voice command interface, and/or other features a device operating the application can have for receiving user commands. Examples of voice-command interfaces that may be used in conjunction with a network of optically switchable windows are described in PCT Patent Application PCT/US17/29476, filed on May 25, 2017, and titled "CONTROLLING OPTICALLY-SWITCHABLE DEVICES," which is herein incorporated in its entirety. The various features of the software tool will now be described in greater detail.

In addition to being accessed via one or more controllers on a window network, network configuration file 1930 may be accessed by a facility management application. As previously discussed, a network configuration file may contain various network information that is used by control logic to send information on the widow network and/or operate the optically switchable devices. When accessed by the facility management application, the network configuration file may also link or map features and/or surfaces of a building model to aspects of the window network. For example, node IDs from the building model may be linked to specific IGUs, zones, zone groups, window coordinates, Window IDs, and network IDs (e.g., CAN IDs or BACnet IDs). In some cases, the network configuration file has a database structure that is updated during a commissioning process or while utilizing a mapping function of the application. In some cases, a network configuration file 1930 used by the facility management application is the same file, or a copy of the same file, that is accessed by a master controller. In some cases, a network configuration file used by the facility management application may store different information than a network configuration file that provides information to a master controller. For example, in some cases, a network configuration file that is used by the application only pairs a node ID on from the building model with a window ID. In such cases, network configuration file that is accessed by a master controller contain additional information such as mappings between a window ID and a network ID, such as a CAN ID, or a BACnet ID, that is used to send communications to a network controller or a window controller.

In some cases, the building model and/or the network configuration file is stored on a device that is used to run the facility management application. In some cases, there are multiple instances of the building model and/or the network configuration file on many devices, each of which is configured to run the facility management application. In some cases, the building model and/or the network configuration file are stored at a location external to the device running the facility management software; e.g., in the cloud, on a remote server, or at a controller within the window network.

Included in or accessed by the facility management application is a viewer module 1910. The viewer module is a software module that reads the 3D building model (or portions thereof) and provides a visual rendering of the model on a device running or accessing the facility management application (e.g., a phone, tablet, or laptop). In some cases, a viewer module is licensed software used to a proprietary file type, and in some cases, a viewer may be open source software.

The facility management application also has a mapping function that allows users who have permissions to configure a graphical user interface. The mapping function associates the node IDs of surfaces and/or features in a building model to IGU's, zones, zone groups, and other window network components. In some cases, the mapping function may also pair a node ID with a corresponding smart object. The mapping function may access information related to the window network from the network configuration file. The mapping function may also save relationships made or identified via user input to the network configuration file.

In some cases, the viewer module or associated user interface is configured to display a smart object in place of a surface and/or feature within the graphical user interface. In some cases, a feature may be transformed into a smart object by automatically or manually associating the feature with an ID, data, or a script. Alternatively, the viewer module or user interface is configured to overlay a smart object on top of the corresponding surface or feature that is displayed in the graphical user interface—for example; a smart object may provide a highlighted border around a surface indicating that the surface corresponds to a selectable smart object. In some cases, smart objects may modify the appearance of a 3D model to indicate information provided by window network (e.g., a tint state of an IGU or indoor/outdoor temperatures).

The facility management application optionally includes a controlling function through which a user may control one or more optically switchable windows. For example, the application may send instructions to a master controller (or other window network entity having control functionality) to set a tint state for a particular IGU or zone of IGUs. In some cases, the controlling function may act as the control logic (see, e.g., 404 in FIG. 4A), and in other cases, the controlling function may relay control instructions to control logic located elsewhere on the window network, e.g., at a master controller. In some cases, the application is used to define or carry out scheduling routines or rules based on user permissions. In some cases, the application is used to control other functions provided by the window network. For example, if IGUs on the window network are configured with window antennas, the facility management application may be used to configure permissions of a wireless network implemented using the window antennas.

The facility management application may receive user input 1904 from a variety of electronic devices such as phones, tablets, and computers. In some cases, a graphical user interface is displayed on a transparent display located on the surface of an optically switchable window, and user input is received by user interaction with the transparent display. For example, a transparent display may be located on S1-S4 of an IGU and may partially or fully extend across the viable portion of the lite. In some cases, a window may also include an on-glass transparent window controller that controls a displayed GUI and/or operates the electrochromic window. In some cases, a transparent display for a GUI interface may also be used for other functions such as displaying the date, time, or weather. In some cases, the application is configured to receive user input audibly from voice-controlled speaker devices such as a device using Apple's Siri platform, Amazon's Alexa platform, or the Google Assistant platform. In some cases, the facility management application is a web-based application that is accessed via electronic devices having internet connectivity wherein the user has appropriate permissions. For example, in some cases, a user is granted access to the application only if the user has credentials to log into the web-based application and/or if the device is determined to be within a close distance of the window network. In some cases, the facility management application may include a copy of the building model file and/or the network configuration file. For example, the building model file, and network configuration file, and the facility management application may be packaged into a program that can be saved or installed on an electronic device to improve the operating performance of the application and, in some cases, allow for the use of the application even if internet connectivity is lost. In some situations, when the executable application is saved on the device, associated components or files may be accessed from a remote location. For example, the building model and/or the network configuration file may be stored remotely and retrieved in whole or part to execute functions of the application only when necessary. In some cases, e.g., where there are multiple instances of a program on various devices, changes to the program made by a while operating the application in a configuration mode may be pushed to copies of the program running located on other devices using, e.g., the cloud.

Figure 20:
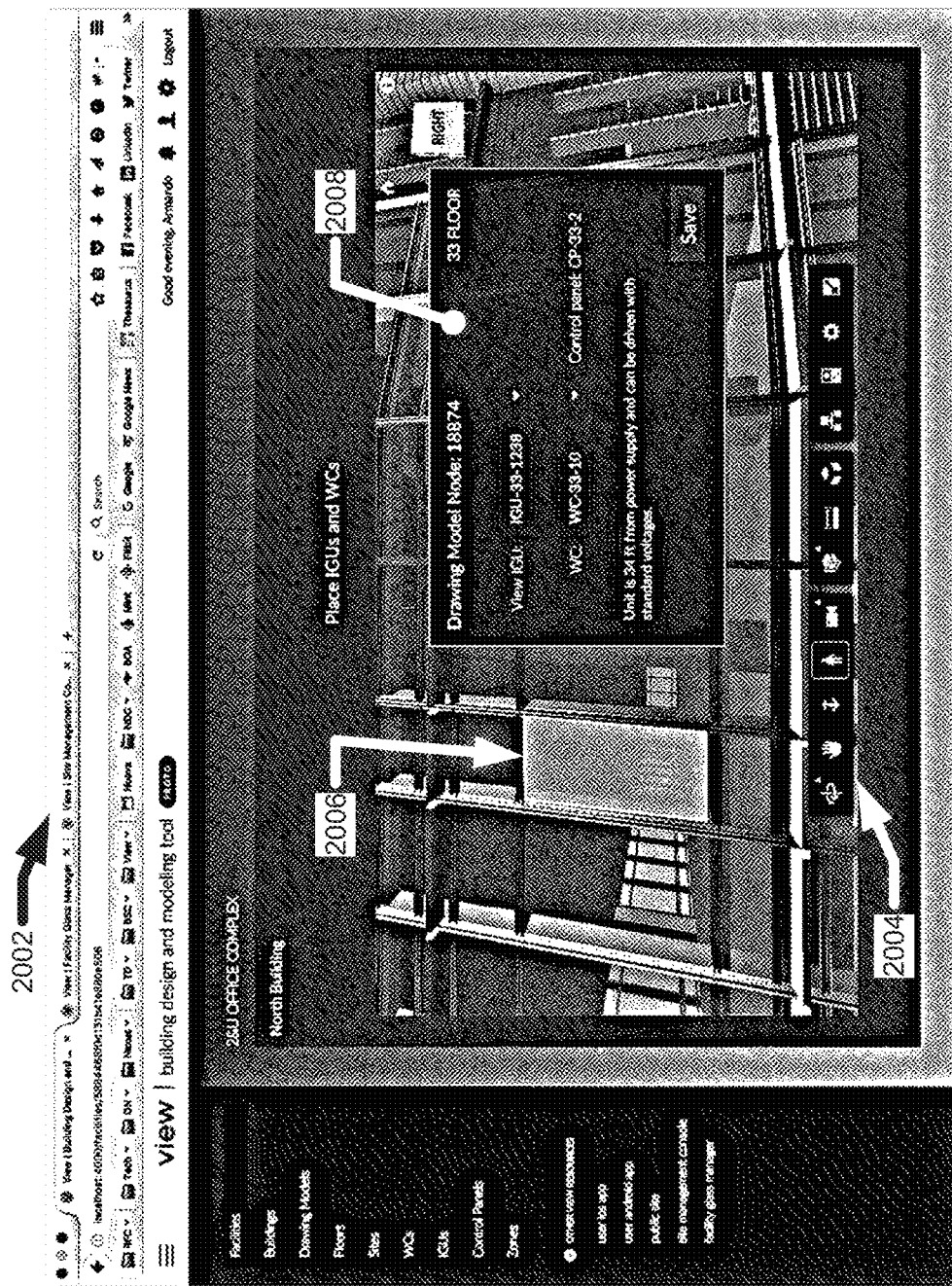
FIG. 20 is an example of a graphical user interface of the facility management application.

When operating the facility management application in a configuration mode, a user having permissions (e.g., a facilities manager) may set up and configure how the application functions for later use in a user mode. FIG. 20 provides an illustrative example of a graphical user interface that may be displayed when the facility management application is operated in the configuration mode. A facilities manager may open up the facility management application in a window 2002 such as a web browser where the building model is displayed. The manager may locate features or surfaces the building model that correspond to a component on the window network, such as surface 2006 which corresponds to an electrochromic IGU. When a surface or feature is selected, the manager may then be presented with a pop-up window 2008 or another interface from which the manager may identify or map the selected surfaces and/or features to components on the window network. For example, in some cases, a manager can select what device a surface and/or feature corresponds to from a list of network components that are provided by the application (e.g., the application may receive a list of network components from the network configuration file). In some cases, a manager may identify the surfaces and/or features corresponding to components of the window network, after which, logic provided in the application may be used to automatically link the network ID of components on the window network to the corresponding identified surfaces and/or features. For example, using methods previously discussed with relation to automatic commissioning using geo-location, logic may be used to map a node ID within a building model to a network IDs of a corresponding IGU or other component by comparing determined positions of window network components to the positions of the identified surfaces and/or features within the building model. In some cases, a process automatically identifies surfaces and/or features in the building model that correspond to windows or other components of the window network. In some cases, commissioning logic may be operated from the facility management application such that the window network may be commissioned using the configuration mode.

After surfaces and/or features in the building model have been manually or automatically paired via a node ID to a component on the window network (e.g., via a network ID), smart objects are selected or generated. Ultimately, these are made available for display and selection in the user mode of operation. The smart objects are linked to the node IDs of the building model and may be displayed in various formats as described elsewhere herein. For example, a smart object may be displayed instead of a surface in the building model, or a smart object may be configured to be activated (e.g., to present a list of controllable features) when one or more surfaces are selected in the building model. In some cases, a smart object is generated by the application such that the size, dimensions, and placement of the smart object within the building model correspond with surface(s) and/or features of the building model that have been paired with a component of the window network. In some cases, the application receives information from metadata in the building model or a network configuration file that is used to create a smart object. The features available on a smart object that is generated may depend on an ID (e.g., a window ID or a network ID) of the component the smart object is associated with. For example, if a smart object is paired to an optically switchable window, the smart object may have features that display the current tint state and or allow a user to adjust the tint state. If the electrochromic window has associated sensors (e.g., an interior light sensor, exterior light sensor, interior temperature sensor, exterior temperature, or occupancy sensor), then the smart object may also be configured to display the sensed information and/or options to control the tint state of the optically switchable window to help regulate the sensed information. In some cases, smart objects are selected from a library of smart objects (e.g., a library stored within the application or downloaded from a remote server) where the library of smart objects includes various components which may be installed on the window network. In some cases, smart objects are displayed on the building model within the configuration mode where they may be selected for further editing.

Referring again to FIG. 20, a facility manager may then organize how the window network is configured. For example, using a dialog box such as 2008, the facility manager may configure a particular IGU as belonging to a specific zone or zone group of IGUs. As an example, after selecting a surface and/or feature in the building model, the application may display a list of zones to which the window may be added to, or present the user with an option of creating a new zone. In some cases, the configuration mode of operation may be used to create customized views that may be displayed in the user mode. For example, using navigation controls 2004 that are available within the configuration mode, a user may select a vantage point or perspective that will be displayed in the user mode.

Using the configuration mode, a building manager may define tint schedules for the optically switchable windows and/or rules for regulating lighting and/or temperature within the building. A manager may additionally set permissions for other users. For example, a tenant of a large building may be given control only over the optically switchable windows in his or her rented space. In some cases, a facility manager may grant other users and/or devices access to the configuration mode of the application so that they may establish their own rules and/or create their own customized views. In some cases, rules or other changes that users may make are limited so that they do not violate rules established by a facility manager or a user of an administrative account.

When operated in the user mode, a graphical user interface that depicts the structure of the building is presented where the interface has smart objects which may be used to control optically switchable windows on the weather network. Certain non-limiting examples of interfaces that may be presented in the user mode of operation are presented in and described with relation to FIGS. 12, and 15-18. When in the user mode of the application, the viewer module may display the building model, or some features of it, or a derived rendition of it. Regardless, the displayed representation shows optically switchable windows that a user may select for purposes such as determining information about the window (e.g., current tint state, manufacturer, size, etc.) and control of the window's tint state. As explained, the windows may be displayed as smart objects. In some cases, the view initially presented in a user mode may depend on the user and/or the device. For example, because a facility manager may be located remotely or may be responsible for optically switchable windows in multiple buildings, a facility manager may initially be presented with a map of the various locations for which the manager has administrative permission. For example, using the Google Maps API, the building administrator may initially be presented with a map having various buildings identified thereon. The building administrator may then select a building of interest to display the corresponding building model. In some cases, the view presented on a user interface depends on the position of the device from which the application is accessed. For example, mobile devices may be located by geolocation methods as described elsewhere herein, and a user may be presented with a perspective of a room which they are located. In cases where the device running the facility management application has a camera, the application may be configured to allow the user to take a picture capturing one or more windows and/or building features, in which case the application recognizes where the device is located or oriented from the picture and presents a corresponding view or perspective within the GUI. In some cases, a window may have an ID (e.g., an irregular pattern near the edge of the window or located on the window frame) that not visually distracting but may be easily recognized by an imaging analysis module within the facility management application. In some cases, an imaging analysis module may compare features captured in an image to the geometry of a building model to determine the position of a device running the application.

When in the user mode of the application, all the optically switchable windows or a subset of the windows may be displayed as smart objects, with the list of such windows determined based on the user's permissions. In certain embodiments, the user interface is configured to allow a user to select particular devices on a window network that he or she wishes to control by touching or otherwise selecting one or more smart objects. After selecting a smart object corresponding to an IGU, for example, the application may present the user with options for controlling the tint state of the IGU, or of all the IGUs in a zone or zone group to which the IGU belongs. After selecting a smart object that is paired with one or more IGUs, the user may additionally be presented with options for control of the optically switchable windows. For example, the application may provide the user with an option where IGUs are tinted automatically to reduce energy consumption by an HVAC system, or the application may provide the user with an opportunity to set up rules that control the tint states of optically switchable windows. For instance, the application may present the user with an option to establish rules based on the time of day, or the user's location within the building.

In some cases, the user mode (or the configuration mode) is configured to present navigation features for navigating the building model that are akin to those used commonly used in video games or CAD tools. For example, keys on a keyboard or buttons on a screen may be used to navigate a building model and change the perspective of the view that is presented. In some cases, navigation features provide six degrees of freedom which may be used to navigate the building model. For instance, a user may translate the vantage point along three perpendicular axes that move with the vantage point corresponding to moving forward/backward (surge), moving up/down (heave), and moving left/right (sway). In some cases, a user may also rotate the vantage point about the three perpendicular axes, where the rotations a referred to in terms of yaw (normal axis), pitch (lateral axis), and roll (longitudinal axis). In some cases, the vantage point may be rotated around an axis that does not pass through the vantage point. For example, by pressing a button the key, an exterior view of a building (e.g., as depicted in FIG. 15) may be rotated around a vertical axis passing through the center of the building.

When in the user mode of the facility management application, selecting a smart object that represents a particular IGU may result in a selection of an entire zone of IGUs to which the IGU belongs, such adjustments made by the user are applied to all of the IGUs in the zone. In some cases, a user may narrow a selection from a zone of IGUs to a single IGU by selecting an IGU within an already selected zone of IGUs. In some cases, surfaces and/or features of the building model may only be selected in the user mode if they have been replaced or overlaid with a smart object. In some cases, a graphical user interface includes a toggle switch or another similar selection feature to alternate between the configuration mode and user mode. In some cases, the user mode appears to be visually similar to the configuration mode, except that certain features (e.g., the ability to add smart objects) have been removed.

Using the configuration mode and/or the user mode, the facility management application may be used for a variety of functions. For example, the application may be used for configuring and/or commissioning a window network. The application may also be used to control the optical tint state of optically switchable windows (either individually or as zones). The application may also be used to configure tint state schedules or tinting preferences for particular users.

In some cases, the facility management application may determine intelligence parameters from the building model that are used by "intelligence" algorithms run by control logic to prevent certain portions of a building from receiving direct sunlight. For example, a user may define a region within the building model that corresponds to the physical space (e.g., the space corresponding to an occupancy region such as a desk or workstation) where direct sunlight is not wanted within the building. Control logic (operating on, e.g., a master controller, the cloud, or a device running the facility management application) may then establish a rule that considers intelligence parameters such as the geometric layout of the building such as overhangs and other opaque structures near a window and the position of the sun to establish a rule in which windows are tinted when sunlight would otherwise pass through unhindered and onto a glare-free region where direct sunlight is not wanted. Generally, intelligence parameters are any information about a building, its surrounding, or the environment that affects direct sunlight or solar radiation entering one or more tintable windows of the building. Intelligence algorithms may determine window tint states based parameters including solar position, window orientation (and other window intelligence parameters discussed herein), background solar radiation, cloud cover, etc. Examples of intelligence algorithms are further discussed in US Published Patent Application No. 2017/0075183, filed May 7, 2015, and titled "CONTROL METHOD FOR TINTABLE WINDOWS," and PCT Patent Application No. PCT/US16/55005, filed Apr. 6, 2017, and titled "METHODS OF CONTROLLING MULTI-ZONE TINTABLE WINDOWS," which are both incorporated herein by reference in their entirety.

Some of the window parameters that are used by intelligence algorithms are now discussed with reference to the examples depicted in FIGS. 21A-C. Generally, the parameters/dimensions used by intelligence are only a small subset of the building dimensions present in a building model. These parameters may be stored in a file or database located at, e.g., a network controller, a master controller, or in the cloud to be used by control logic. In some cases, these parameters may be stored in a network configuration file.

Figure 21C:
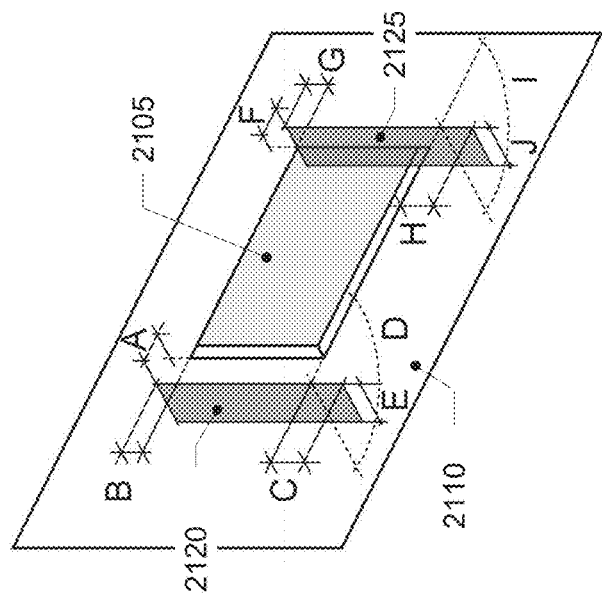
FIGS. 21A-C depict window parameters that may be used by intelligence algorithms.
Figure 21B:
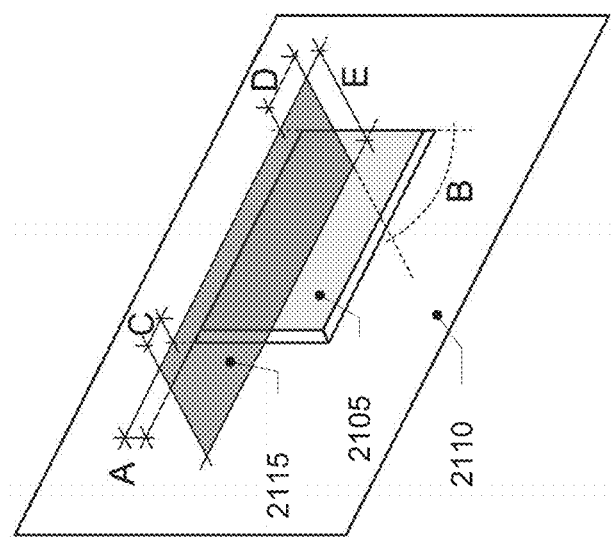
Figure 21A:
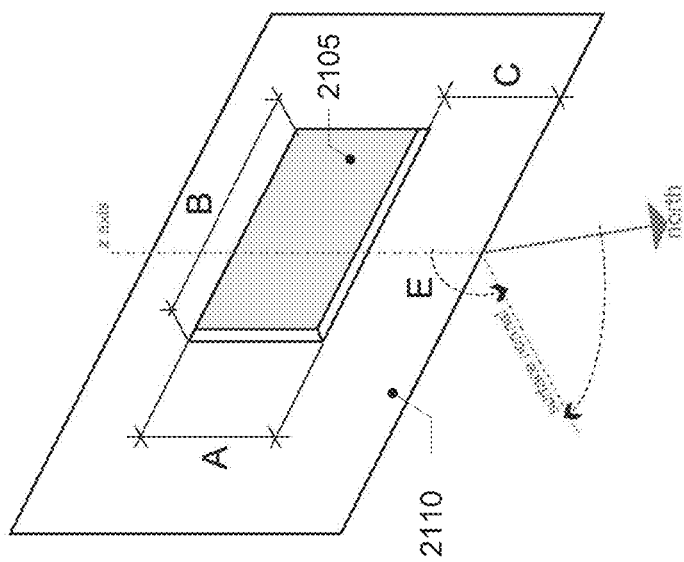

FIG. 21A depicts a window 2105 on the outer wall of building 2110. Some of the basic measurements include the height of the window (A), the width of the window (B), and the window sill height from the floor of the room (C). The window azimuth (D) is the angle measured clockwise from the northern axis to the surface normal, and the window tilt (E) is the angle measured from the vertical axis to the surface normal.

FIG. 21B depicts how intelligence parameters pertaining to an overhang 2115 above window 2105 on wall 2110. Using these parameters, the control logic may determine when the overhang obscures sunlight from passing through the window 2105. The height above the top of the window for the overhang is dimensioned as (A). The tilt angle from the window is dimensioned as (B). Dimension (B) is generally about 90 degrees for most overhangs. The left extension (C) and the right extension (D) from the window are the distances between the edge of the window to the start of the overhang. Lastly, the depth (E), is a measurement of how much the overhang projects from wall 2110.

FIG. 21C depicts how intelligence parameters may be measured for left and right fin structures (2120 and 2125) that are placed near window 2105. The left fin 2120 is characterized by dimensions (A), (B), (C), (D), and (E), while the right fin 2125 is characterized by dimensions (F), (G), (H), (I), and (J). The left and right fin extensions, (A) and (F), are the horizontal distances from the edge of the window to the plane of the respective fin. Measurements (B) and (G) are the vertical distances between the top of the window and the top of the respective fin; sometimes these measurements are referred to the fin distance above the top of the window. Measurements (C) and (H) are the vertical distances between the bottom of the window and the bottom of the respective fin; sometimes these measurements are referred to the fin distance below the bottom of the window. Measurements (D) and (I) define the fin tilt angles from the window. Generally, these measurement is about 90 degrees. Lastly, measurements (E) and (J) define the fin depth, which is the distance each fin projects from wall 2110.

Figure 22:
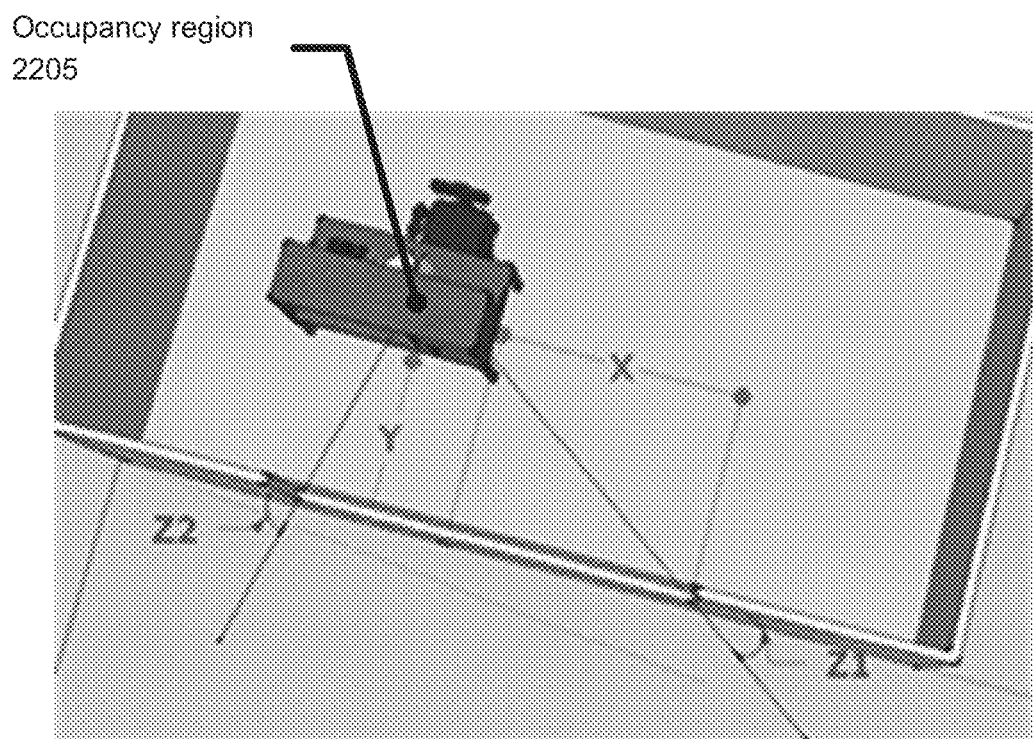
FIG. 22 illustrates how intelligence may account for an occupancy region within a room.

FIG. 22 depicts coordinates of a desk as an illustration of how intelligence may account for an occupancy region within a room. Intelligence may account for horizontal (X and Y) and vertical (Z, not depicted) distances of the occupancy region from a reference point (in this case the corner of the depicted optically switchable window), so that the tinting of the window is controlled to prevent direct sunlight on the occupancy region. In this example, if the sun's azimuth is outside the illustrated critical angles, Z1 and Z2, then the sun's glare is shining on an occupancy region defined by an occupant sitting at the desk. Intelligence logic may use the position of the sun in the sky and to determine when the sun's azimuth is outside the critical angels and tint the window accordingly.

Figure 23:
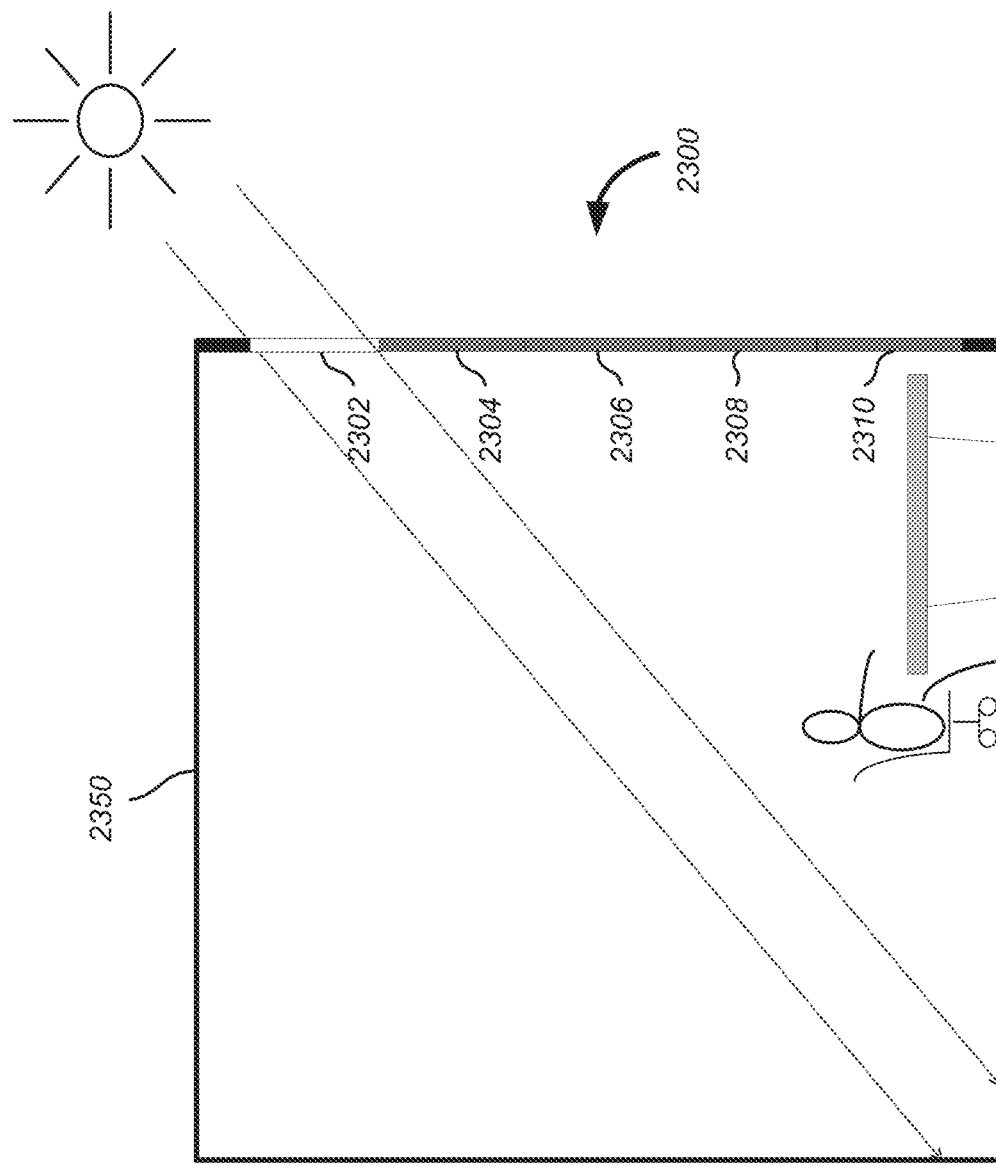
FIG. 23 illustrates how intelligence parameters may be used to control a multi-zone tintable window.

FIG. 23 provides an example of how intelligence parameters may be used to control a multi-zone tintable window 2300 with five tinting zones. The multi-zone tintable window 2300 is located in the external vertical wall of a room 2350, between the inside and outside of a building. The multi-zone tintable window 2300 comprises a first tinting zone 2302 at the top of the window 2300 and four other tinting zones 2304, 2306, 2308, and 2310 below the first tinting zone 2302. In the depicted example, the sun is at a high position in the sky. The tinting zones are controlled such that the first tinting zone 2302 is in a first tint state, the lightest tint state (e.g., bleached or clear state), and the other tinting zones 2304, 2306, 2308, and 2310 are in a second tint state that is darker than the first tint state. With the illustrated tinting control configuration, the first tinting zone 2302 allows natural light from the sun at a high altitude to enter the room while preventing glare from direct sunlight projecting onto the occupancy region with the desk and the occupant. Instead, the direct sunlight through the first tinting zone 2302 projects (depicted by arrows) glare onto an unoccupied region of the room. Although five zones are used in this illustrated example, one can appreciate how room configurations having a different number of windows and/or tinting zones may be controlled by intelligence to control lighting conditions within a building.

One of skill in the art can easily appreciate from the above discussion how the building structure, the positioning of windows, the location of occupancy regions, and other parameters such as the weather can be used to determine when a window should be tinted to reduce a glaring effect of direct sunlight at an occupancy region. Often, intelligence algorithms are based off some, or all, or the parameters identified in FIGS. 21A-21C and the position of an occupancy region within a room as depicted in FIG. 22. To acquire intelligence parameters, these measurements may be taken manually by an installer or copied from an architectural drawing, both of which can be time-consuming and costly. Using the facility management application, the process of identifying parameters may be automated or at least partially automated.

In some embodiments, an installer may use the facility management application to assist in a manual process of identifying window parameters—such as when measurements are manually taken or copied from an architectural drawing. In some cases, an installer determines what parameters are needed for intelligence algorithms by performing a visual inspection of the building or by consulting architectural drawings. Using the facility management application, an installer can more easily locate where intelligence parameters need to be recorded by quickly navigating the building model and viewing the model from one or a variety of perspectives. For example, an installer may view the building model from aerial vantage points, allowing the installer to more clearly and quickly identify relevant parameters. In some cases, features and surfaces within the building model may display one or more properties of that feature including dimensional information when the feature or surface is selected. In some cases, the facility management application may be configured such that virtual measurements may be taken between two user-selected points on the building model. Measurements taken using the building model may be used to verify intelligence parameters when manual measurements are taken or when parameters are taken from an architectural drawing. In cases where the building model, has accurate dimensions for building features (e.g., accurate within a few centimeters), the building model may be relied on to provide the intelligence parameters directly without the need for a physical measurement.

In some embodiments, the facility management may at least partially automate the process of identifying intelligence parameters. As discussed elsewhere herein, features within a building model may have tags or metadata that may be used categorize them within the building model. For example, if a building has fins on its exterior, such as fin 2120 in FIG. 21C, the feature in the model that represents the fin may have tags indicating that it is: a fin, adjacent to window openings #72 and #73, on a west facing surface, on the first floor, etc. In some cases, once a first feature is selected, an option may be presented, which if selected will display or provide data for corresponding features which have the same tag(s). For example, after selecting a first fin, a user may be provided with an option which would identify, or provide some or all of the other fins on the building's exterior. Similarly, if a window opening is selected, a user may be presented with an option to display or provide intelligence parameters such as a sill height, recess, or adjacent fin/overhang dimensions.

In some cases, the facility management application may be used to fully automate the process of identifying and recording intelligence parameters. Having dimensional data for the building's exterior surfaces, logic may be used to calculate a subset of parameters, such as those depicted in FIGS. 21A-21C automatically. The application may then request that an installer confirm the detected parameters. This automated method may ease the process of determining intelligence parameters when building geometry is complex. As an illustrative example, if an overhang has a depth (dimension (E) FIG. 21B) that is not constant across the window's width (dimension (B), FIG. 21A), logic may identify a function or possibly a matrix that may be used by intelligence algorithms to described the variable overhang depth.

In cases where a building model includes a furniture layout, other intelligence parameters such as the location of an occupancy region (e.g., a desk or breakroom table), as depicted in FIG. 21 may also be identified. In some cases, the application may request that the user confirm the identified parameters before they are saved for use by window intelligence. In some cases, the facility management application may include a widget that allows a user to quickly define an occupancy region within the building model. For example, a user may be able to draw or place a rectangular feature onto a plan view presented in the graphical user interface to define the X and Y coordinates. A user may then, in some cases, have the option to define the height of the region from a pull-down menu. When the facility management application is operating on a mobile device where the position of the device may be determined automatically (e.g., using a micro-location chip, GPS, magnetometers, and/or other sensors used for location services), a widget may be selected by a user to define an occupancy region based on the physical location of the mobile device. For example, to define a desktop as an occupancy region, a user may, after selecting an appropriate action using the widget, simply place the mobile device at the defining edges of the desktop, after which the application may save intelligence parameters to be used by intelligence algorithms.

In some cases, a user may use the facility management application to quickly find out the current state of a window and/or retrieve other window information, which may be provided as metadata for a window's smart object. In some cases, the facility management application may be used for locating devices or troubleshooting errors on a window network. For example, the application may be configured to display non-window components (e.g., window controllers, network controllers, master controllers, control panels, wiring, etc.) as features within the 3D building model.

In some cases, when used by a field systems engineer (FSE), the application may present a list of components where a malfunction has been detected or where maintenance is needed. In some cases, these features may be highlighted or in some way marked within the displayed building model making it easier for an FSE to know where attention is needed. Normally, an FSE might have to ask a facility manager where a malfunctioning device is located or possibly look at interconnect and architectural drawings. This can be a cumbersome process at large sites such as airports and hospitals where a malfunctioning window may not have even been noticed by site personnel or in cases where the malfunctioning device was self-detected through the window network. To facilitate an FSE, the application may provide directions to a particular component in question. For example, the application may display a route overlayed on a plan view of a building indicating the route that the facility systems engineer should take. In some cases, such as when the application is operated on a tablet or mobile device that is automatically located within the building, the application may provide turn-by-turn directions—similar to turn-by-turn directions used in GPS navigations systems. While discussed in terms of directing an FSE to a malfunctioning device, the application may also provide maps and routes that can be used normal users of the application. In some cases, windows may have antennas that are used to locate the device. Methods of location detection and routing users using a window network are further described in PCT patent application Ser. No. 17/31106, filed on May 4, 2017 titled "WINDOW ANTENNAS," which is hereby incorporated by reference in its entirety.

By having access to visualize components on a window network, an FSE may be made aware of information that is helpful for servicing. For example, after inspecting a component as displayed in the building model (e.g., by looking at a zooming to that portion of the model), an FSE may be made aware that a ladder is needed to access a window controller located on a ceiling, or that specific tooling will be needed to access a window controller that is concealed behind drywall. The application may also display technical details of the component such as the model number, the date of installation, the firmware installed, various connected devices, and other technical details such as usage patterns, and historical data (e.g., leakage current over time for a particular IGU) that may help an FSE diagnose a problem. By having the ability to take a detailed look at the building model, a field systems engineer may arrive at the site prepared to do the servicing—potentially eliminating extra trips that might otherwise be needed to collect needed materials or tools.

In some embodiments, a field system engineer may, using the facility management application to sort through installed components using various filters. For example, when a feature is added to a model it may have tags or metadata that include information such as the date of installation, the date of manufacture, the part model number, the size of an IGU, the firmware on a controller, etc. This information may be helpful in doing preventative maintenance, e.g., when an FSE is already at a site to take care of another service request. For example, if it is determined that some window controllers manufactured during a certain time frame are prone to premature failure because of a manufacturing defect, an FSE may be able to identify the controllers in question using sorting criteria provided within the application. An FSE may then replace the questionable components before they fail.

In some cases, the facility management application may provide alerts indicating that one or more devices are acting abnormally and should be inspected by an FSE the next time an FSE is onsite to perform a service request. When viewing the building model, elements may be color-coded to indicate their status. For example, a properly functioning device may be colored green, an abnormally functioning device may be colored yellow, and a malfunctioning device may be red. If, e.g., one or more controllers report that they are supplied with an abnormal current or voltage, then an alert may be provided asking the FSE to inspect the wiring. The FSE may be able to confirm that the installed wiring is appropriate and has not provided issues at other sites, by first looking at the building model to find this information. In some cases, information provided by the building model may be sufficient to diagnose an issue, but in other cases, manual inspection may still be needed. For example, an FSE might discover that the wrong wiring was installed, or that insulation has failed and led to wire damage.

A facility management application may also be configured so that an FSE can document notes and observed manufacturing defects when responding to a service request. For example, if an FSE notices that a component has a defect (e.g., if an IGU has unreported pinhole defects), the FSE may document the defect by taking a photo on a mobile device which may be reported back to the window manufacturer. Defect documentation collected from a plurality of sites may then be used to identify sources of issues in the manufacturing process. In some cases, if an FSE notices an incongruency with components as depicted in the building model (e.g., if the wrong component was installed or a broken component was replaced) the application may allow the FSE update the building model information so that it accurately reflects the physically installed system.

Figure 24:
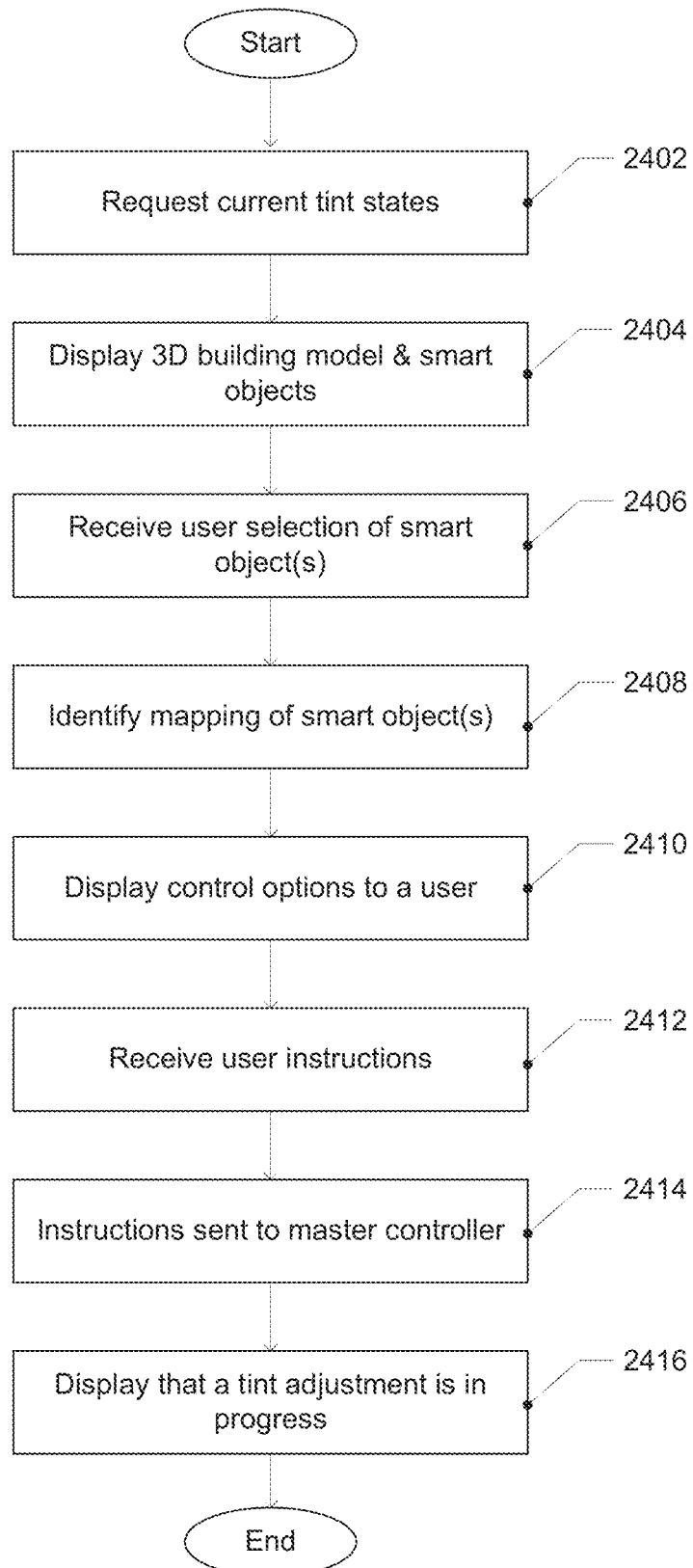
FIG. 24 depicts a process by which may be used by the facility management application to control optically switchable windows on a window network.

FIG. 24 provides an example process which may be used by the facility management application when it is operated in the user mode. When the application is opened or accessed by the user, the application may request the current tint states 2402 from the window network (e.g., via communication with a master controller). In some cases, the current tint state may be retrieved from a network configuration file that is updated each time a window is given a new control signal. In some cases, the current tint state may be saved within metadata of the building model file. The viewer module is then used to display the 3D building model and smart objects 2404 within the graphical user interface presented on an electronic device. Upon receiving a selection of one or more smart objects 2406, the application identifies which IGU, zone, or other window network component has been selected (e.g., by referencing the network configuration file). Having identified the corresponding window components, the application then displays various control options that are available to a user 2410. For example, if a window is selected, the application may present options for adjusting the current tint state or establishing a new rule. Upon receiving user instructions for controlling the selected IGU or zone of IGUs 2412, the facility management application sends corresponding control instructions to the master controller on the window network 2414. Having carried out the user's instructions, the facility management application may then display that a tint adjustment is in progress 2416. In some cases, the application may display the user who requested the adjusted tint state and provides a time estimate for how long the adjustment will take to complete. In some cases, the adjusted tint state is saved within the metadata in the building model file.

Figure 25:
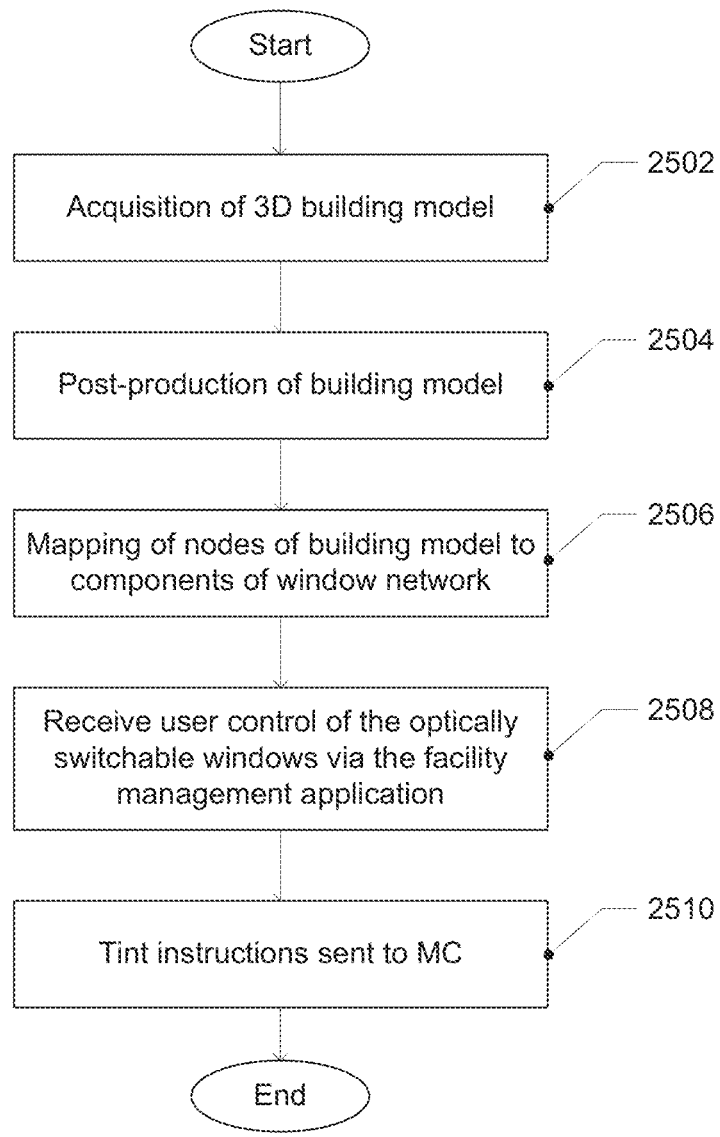
FIG. 25 depicts a process by which a facility management application may be set up and operated.

FIG. 25 provides a process by which the facility management application may be used in configuration mode. In step 2502 a 3D building model is acquired or generated. A building model may then undergo post-production 2504 to make the building model suitable for use by the facility management application. For example, the building model may be saved in a format that is readable by the viewer module of the building management application or simplified by removing information that is not relevant for control of the optically switchable network. The node IDs within the building model that correspond to features of the window network are then mapped to their corresponding network ID 2506. For example, this may be done automatically using commissioning logic or by a user that performs the mapping using the configuration mode of the application. Once this mapping has been made, the facility management application is used to receive user commands for controlling and optically switchable windows on the window network 2508. For example, a user may provide commands to the application for adjusting a tint state of an IGU or for establishing a tinting rule or tint schedule. Having received the tinting commands from user input, tinting instructions are then provided to a master controller or another controller on the window network 2510.

In some embodiments, the facility management application is also used for controlling other devices and systems within the building. In a similar way in which the facility management application is used to provide an interface through which a user may manually control optically switchable windows, the application may also provide a user with the ability to control and/or receive information related to mechanical blinds, lighting systems, and security systems. For example, if a building is configured with a network of electronically locking doors, the facility management application may be used to selectively lock and unlock doors and/or establish rules for other users to do the same. In some cases, other devices and systems that may be controlled by the application are located on the window network, and in some cases, they are located on another network (e.g., a local wireless network) that is accessible via the electronic device running the application.

Design Module:

In some cases, the facility management application may have a design module executable within the configuration mode which allows the application to be used for designing the layout of a window network in a building. In some cases, a designer may design a window network without needing to visit the physical building for inspection. For example, by inspecting a building model via the design module, a designer may take virtual measurements and use tools within the design module to understand light penetration into a building at various times of the year. In the conventional design process, a design engineer might start off by considering architectural drawings first to understand the layout of a building. With an understanding of the structure of the building, the designer can then create 2D installation schematics which may be used by an installer as instructions for physical installation. The design process is tedious, and errors can be introduced as a result of drawing inaccuracies, the architectural drawings being misread, and forgetfulness of a designer to consider design rules. By using the design module, the timeline for designing a window network and completing the installation may be expedited for reasons discussed herein.

In certain embodiments, within the design module, a designer has access to a library of objects or features that may be inserted into a building model. These objects or features are representative of various window network components—including windows, window controllers, network controllers, master controllers, sensors, wiring, and circuitry for power and communication, and any other device on a window network. The library of objects may also include structures and/or components that a window network may interface with, including structural components that may be needed during installation (e.g., mounting devices for controllers, wiring, etc.). In some embodiments, components of a window network that are added to a building model may be imported with smart objects which are later used as part of a graphical user interface for controlling the network of optically switchable windows as discussed elsewhere herein.

Within the design module, components from a library may be easily selected and imported into a building model. In some cases, the design module may assist in the design process by automatically selecting or suggesting an appropriate component for a particular use, allowing for virtual measurements, and enforcing design rules or providing warnings when a design rule is broken.

FIGS. 26A-D illustrate how the design module may be used to add features of a window network to a building model. These figures show a progression of steps which may be displayed by the graphical user interface when designing how a window 2610 will be placed within a room 2600 and connected to the rest of a window network via a trunkline 2605 for delivering power and providing communication on the window network. Similar processes to those shown in FIGS. 26A-D may be used to design various features of the window network using the design module.

Figure 26A:
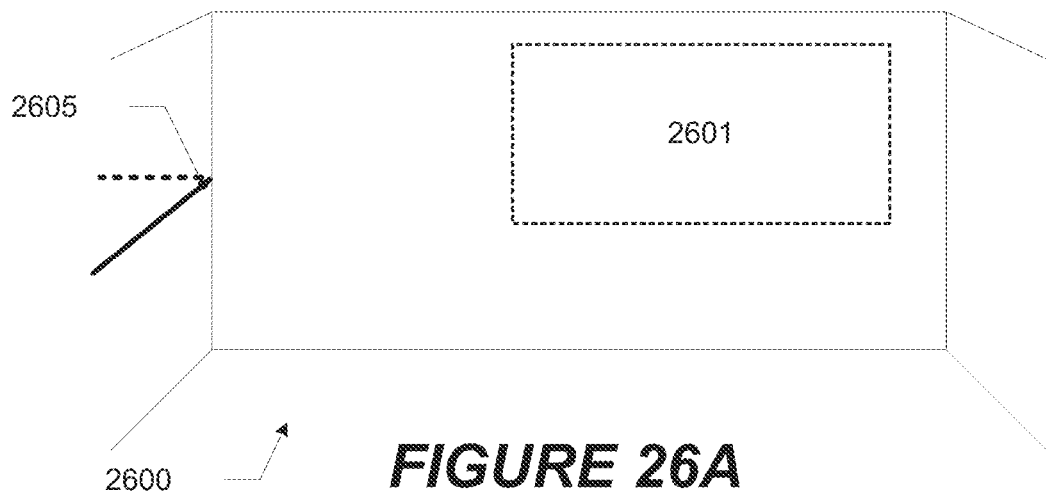
FIGS. 26A-D depict how the graphical user interface of the design module may be used to design a window network

FIG. 26A depicts the graphical user interface within the design module showing a room 2600 having window opening 2601. The situation depicted is one where some aspects of window network have already been designed, but it has not been yet determined how the room will be outfitted with an optically switchable window and connected to the rest of the window network. In the illustration shown, placement of a trunkline 2605 within the wall of the room has already been determined. In this example, the trunkline may have been placed, e.g., to follow another electrical pathway within the building. In some embodiments, a user may manually identify opening 2601 by navigating to it within the building model and selecting it, and in some cases, window openings may be automatically identified by the design module. From the dimensional information included in a building model, the design module may provide a selection of window types that may be appropriate for a selected window opening. For example, the design module can provide single pane or dual pane options, or an option for a window to have multiple tinting zones. In some cases, the design module may automatically select or suggest a particular window option which may later be modified by the designer. In retrofit applications, the design module may indicate where a window opening can be cut out from a wall without compromising the buildings structural integrity.

Figure 26B:
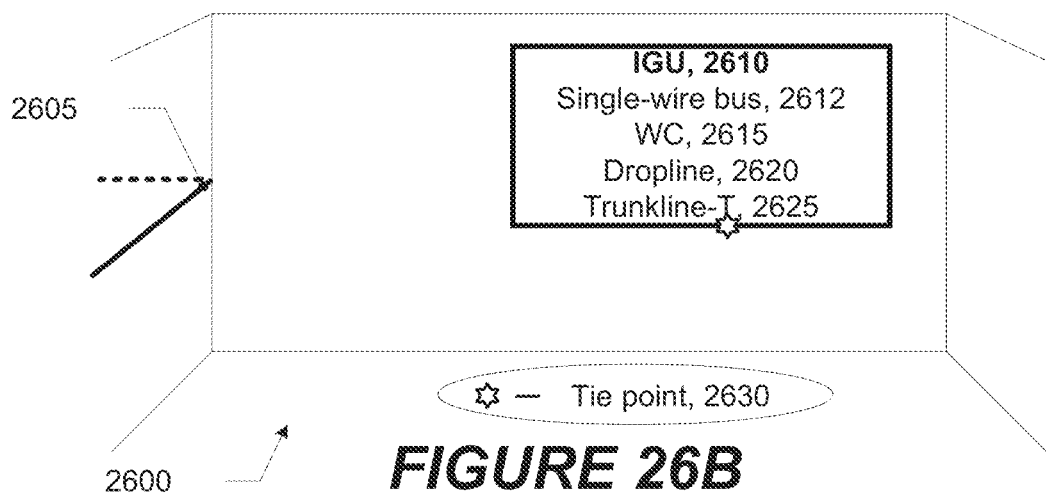

FIG. 26B depicts a stage after that shown in FIG. 26A when window object 2610 has been selected for window opening 2601. In some cases, after a component such as window 2610 is selected, the design module may import additional objects representing window network components that may be needed to join the selected component with the rest of the window network. For example, in FIG. 26B, objects for a window controller 2615, a single-wire bus 2612, a dropline 2620, and a trunkline-T 2625 are automatically imported into the building model as these components may be used to join window 2610 to trunkline 2605. As depicted, objects 2612, 2615, 2620, and 2625 are initially placed as sub-objects within window 2610. In other embodiments, a design module may simply suggest via the GUI interface that needed components are added to connect an already added component to the rest of the window network. For example, after placing a window object within a window opening, the design module may present an option for the designer to add a corresponding window controller.

When objects are placed in a building model, they may have tie points 2630 can be used to enforce design rules as described in further detail below. As shown, window 2610 has a tie point that fixes the position of the window to opening 2610. This tie point may additionally mark the location for a pigtail connector through which an electrochromic window receives electrical power.

Figure 26C:
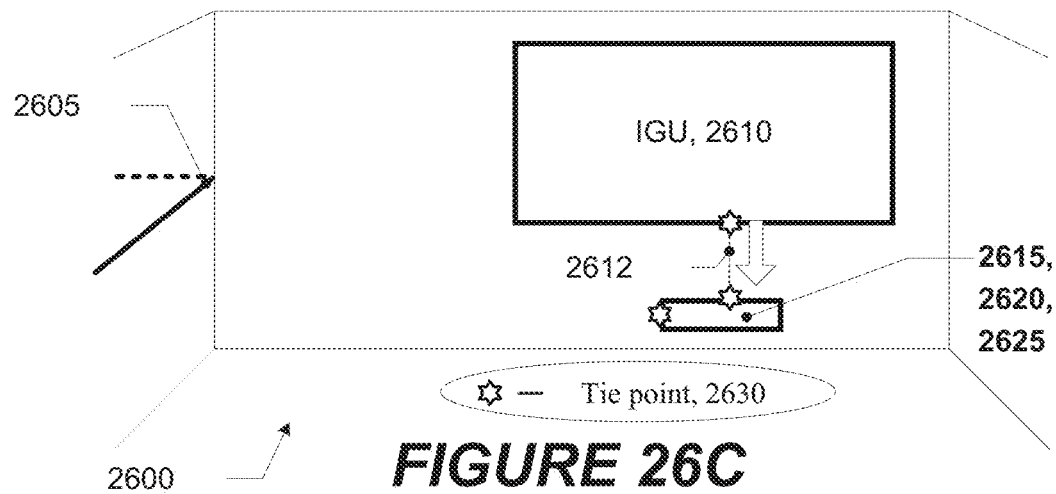

FIG. 26C depicts a stage after that shown in FIG. 26B, where the placement of window controller 2615 has been selected. A tie point 2630 on the object representing the window controller may have rules that restricting the placement of the window controller. For example, a rule can limit the distance from the tie point to a corresponding tie point, representing an electrical connector (e.g., a pigtail connector), on window 2610 to be less 5 feet away. This rule can be established within the design module to ensure sufficient length of a single-wire bus cable 2612 or other wiring that will be used to join the physically installed objects. In some embodiments, a user may choose the placement of an object by, e.g., dragging it to a selected location. In other cases, the design module may automatically suggest a placement location.

Figure 26D:
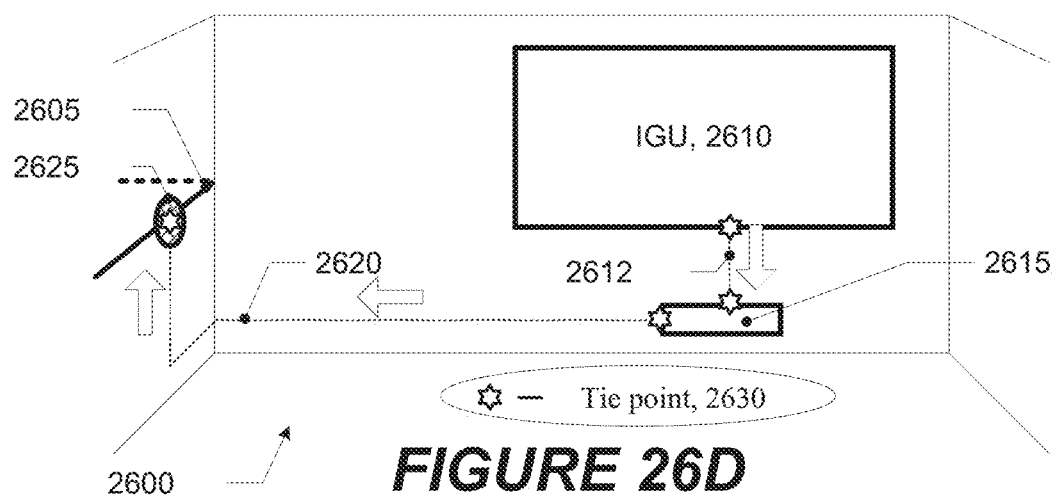

FIG. 26D depicts a stage after that shown in FIG. 26C where window 2610 is electrically joined to trunkline 2605 and the rest of the window network. The position along trunkline 2605 where the trunk-T 2625 is placed may be automatically selected by design module logic, or in some cases manually selected by the designer. Rules between the tie points of the trunk-T and the window controller may, e.g., require that the two components be joined by a dropline 2620 having a particular length. In some cases, the design module may suggest a location that, e.g., reduces the length of cable needed for dropline 2620 need to connect the trunk-T with the window controller. In some cases, the design module may be configured so that the designer may adjust route that a dropline or other wiring takes between the two tie points.

As discussed in FIGS. 26A-D, objects for window network components that have been imported into the building model from a library may have associated tie points (see 2630 of FIG. 26D) used to enforce design rules. Tie points may anchor objects to a building model or may join two or more objects within the building model. Design rules applied to tie points ensure that the network will be functional when installed and may help prevent delays during installation that result from mistakes and oversights made during a completely manual design process. Example design rules associated with tie points are now discussed:

Interfacing rules—Tie points may have rules that prevent a designer from specifying that parts which cannot be physically connected (e.g., two female connector plugs) are joined within the building model. This type of interface check prevents situations including where the wrong type of cabling between a window controller and a trunkline or the wrong type of controller for a particular location is specified on installation schematics.

Dimension-based rules—Some tie points may have dimension based rules limiting the distance between objects placed in the building model. The design module can enforce dimension-based rules by checking the distance between objects using dimensional information from the building model. In some cases, tie points between a window controller and a window (or equivalently tie points on either end of a single-wire bus cable) may recite a maximum separation distance if, e.g., the single-wire bus cables are all manufactured to be a fixed length. Similarly, tie points associated with spooled cable, such as a drop line, may set a maximum allowable distance between tie points if the electrical performance of the wiring suffers when it is too long.

Placement rules—When a tie point is used to anchor a component onto a building model, rules may limit where the tie point may be placed. For example, if a building code or fire code imposes limitations on the placement of window network components within a building, then a tie point rule may prevent placement of objects at locations which would be in violation of the codes. In some cases, a rule may require that a window controller is attached to a rigid building feature such as steel beam or concrete pillar rather than a moveable surface, such as a door, or fragile building feature such as drywall. As another example, a rule may specify that controllers be placed within a ceiling or a wall for aesthetic reasons.

Technical rules—Sometimes rules may be used to account for a component's technical limitations. For example, if a window controller only has the capability of controlling up to four windows, a tie point associated with the window controller may prevent a fifth window from being connected to the controller. Similarly, a tie point associated with a trunkline may prevent an additional window from being connected to the trunkline if the connection would result in the trunkline exceeding its electrical current rating.

User-defined rules—In some cases, a designer may establish user-defined rules to create a consistent window network implementation throughout a building. As an example, a user might create a rule where each window should have an associated window controller located on the ceiling directly above the window. In some cases, after a window has been selected for a window opening (either manually or automatically), the design module may automatically place a window controller on the ceiling above the window. If a designer is unsatisfied with the automated placement, a designer may then adjust the placement providing that the design rules are met.

Warnings—In some cases, a design rule may trigger an alert provided through the graphical user interface when a designer has violated or is close to violating a design rule. For example, if a single-wire bus connecting a window controller has a fixed length of 5 feet, a warning may be displayed when a designer places a window controller more than 4 feet away from an associated window. Warnings may be helpful in encouraging designers to generate conservative designs that may provide leeway during the installation process. For example, if an installer discovers that it would be easier or necessary to install wiring so that it wraps around a feature instead of being placed in front of the feature, then an installer may have the freedom to do so.

In some embodiments, the design module may be configured to automatically populate a building model with objects for window network components. For example, after importing a building model, a design module may first recognize window openings and choose an appropriate window object for each window opening. After selecting window objects, the design module may auto-populate the building model with other window components (e.g., window controller, network controllers, control panels, sensors, wiring for power and communication, etc.) such that design rules are enforced. In some embodiments, the design module may auto-populate a building model in a way that minimizes material or installation costs. For example, the design module may auto-populate a building model so that the fewest amount of controllers are needed, the least amount of cabling is used, or so that the installation process is made simplest (e.g., by mounting controllers and wiring on a wall's exterior surface). In some cases, a designer may auto-populate a building model, after which the designer may adjust the window network design to account special considerations of a customer or considerations that may not be considered but the design module logic.

In some cases, the design module may be able to modify a building information model (BIM). A building information model is a digital representation of physical and functional characteristics of a facility. A BIM provides a shared knowledge resource that may be used to guide decisions made during a building's lifecycle. In some cases, the 3D building model and its associated metadata used by the design module is a BIM that is also used for other building purposes. In some cases, after a window network has been designed, a building model with the window network components is saved as an updated BIM model that may be used by a building owner to make future decisions during the building's lifecycle.

In some cases, after a window network has been designed, the facility management application may prompt a designer to configure a graphical user interface for controlling the window network. In some cases, when adding window network objects to a building model, corresponding smart objects are also added to the building model which may later be used to control the window network in the user mode.

In some cases, the design module may output a report that summarizes one or more effects of installing a network of optically switchable windows. For example, logic within the design module may estimate energy savings that may be had by implementing a network of optically switchable windows. This may be done by, e.g., by estimating the solar flux into the building throughout the year using the building model and considering the current energy use patterns on HVAC and lighting systems within the building. A report may also provide information such as expected costs for installation, expected time for installation, an expected return on investment timeframe, as well as example views from a GUI, generated using the building model, for controlling the optically switchable window network using smart objects (as discussed elsewhere herein). In some cases, the design module may be used to provide ballpark estimates for a installing a window network by simply importing a building model and generating a BOM based on automatically populating the building model with window network components.

While the design module has been described for the design of window networks, in some embodiments the design module may be used for designing how other systems will be implemented within a building such as communications networks (e.g., Ethernet networks), lighting networks, networks for low voltage electronics, and any other building system.

After having populated a building model with window network objects, the design module may be configured to provide various outputs used during the installation process. For example, the design module may automatically generate a bill of materials (BOM) that lists all of the raw materials, sub-assemblies, intermediate assemblies, sub-components, parts and the quantities of each needed to install a window network. In some cases, a design module may automatically collect pricing and availability information for needed components. In some cases, the design module may automatically generate an estimated cost to install a window network or and installation timeframe based on the generated BOM.

A design module may, in some cases, be configured to generated 2D installation schematics and drawings from a design generated using the 3D building model. For example, the design module may be configured to automatically generate drawings similar to the interconnect drawings depicted in FIGS. 5A and 5B that are appropriately labeled with the necessary information for an installer to implement a design correctly. Automatic generation of installation schematics may reduce costs and errors that are frequently made during conventional drafting of installation schematics.

Figure 27:
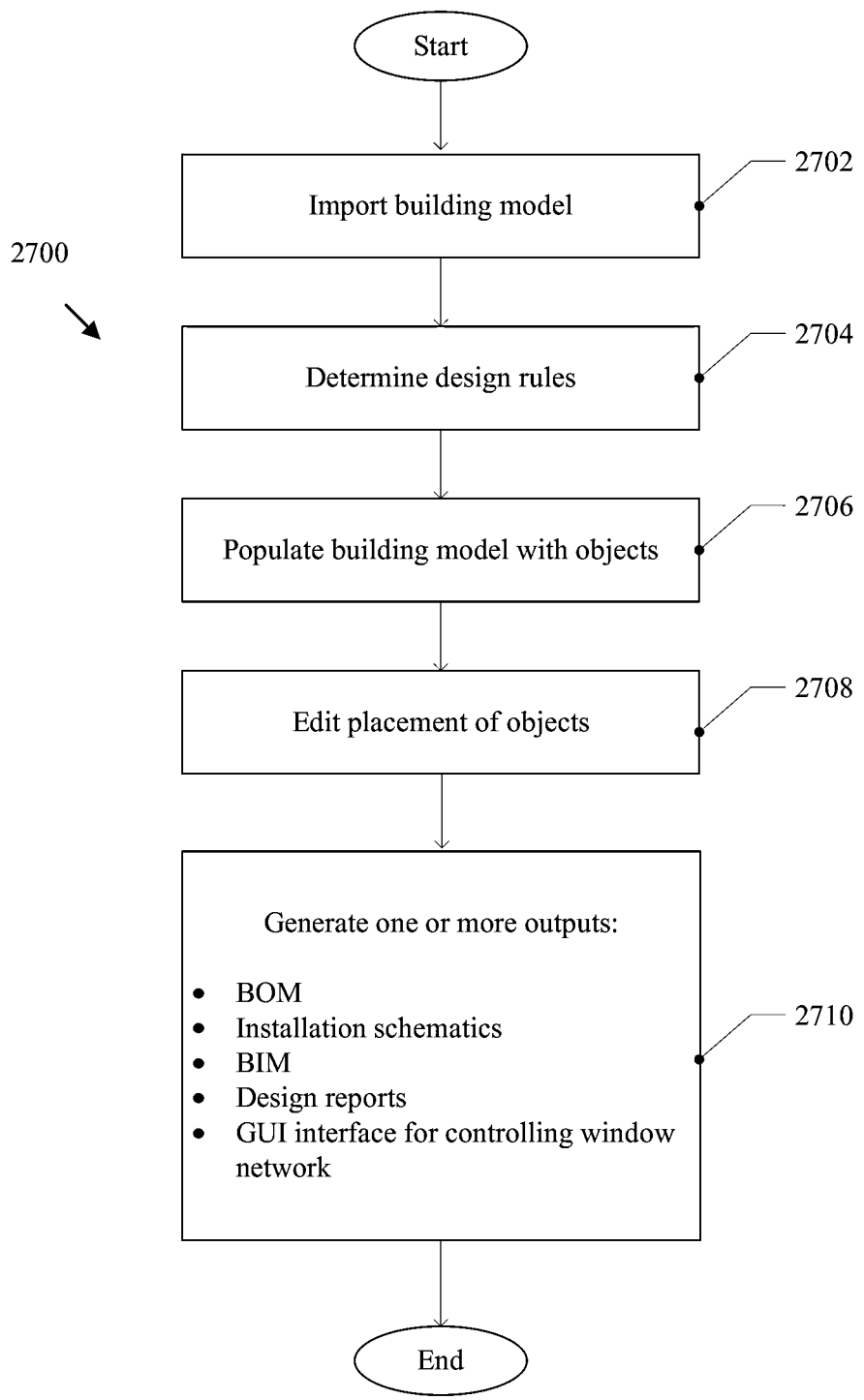
FIG. 27 depicts a process by which the design module may be used to design a network of optically switchable windows in a building.

FIG. 27 depicts a method 2700 that a designer may use to design a window network. In step 2702 a building model is loaded or imported into the design module of the facility management application. In some cases, the design module may be an extension or plug-in to the facility management application that is installed or in some cases may operate separately from the rest of the facility management application. In some cases, aspects of the design module, including the library of window network objects, may be used as a plug-in for a CAD software applications such as Autodesk Revit. In step 2704 the design rules that will be enforced by the design module are determined. In some cases, design rules are associated with objects from a library of components accessed by the design module and are not editable. Some design rules, such as rules for triggering warnings, may be edited or adjusted by the designer. In some cases, the designer may impose a set of rules for particular tie points or objects to improve uniformity of the finalized design or determine how the design module will auto-populate a building model with objects of window network components. In step 2706, the building model is populated with objects representing window network components. These objects interface with each other at tie points that limit the placement of objects within a building according to the design rules. In some cases, populating the building model with objects may be automated by logic within the design module that determines where appropriate window object should be placed, and then places additional objects as needed to create a network of objects joined by tie points corresponding to a functional window network. In some cases, populating the building model may be partially automated, where, e.g., the user may select where optically switchable windows will be placed, and the design module determines the placement of other components. In some cases, populating the building model may be a largely manual process. In step 2708 adjustments may be made to the placement of objects within the building model by the designer. For example, if a designer is unsatisfied with how a building model has been automatically populated with objects, a designer may adjust the location of objects and/or their associated tie points. Having determined the placement of objects within a building model, the design module may be used to automatically generate various outputs in step 2710. In some cases, the design module may automatically generate a bill of materials (BOM) or installation schematics. In some cases, the design module may create, or update a building information model (BIM) that may be later used by the building owner to make upkeep, retrofit, and other building related decisions. In some cases, the design module may be used to automatically generate a report that may determine various costs and benefits of installing an optically switchable window network. In some cases, a design module may also be used to generate a graphical user interface for controlling the window network that has been designed.

CONCLUSION

Although the foregoing embodiments have been described in some detail for purposes of clarity of understanding, it will be apparent that certain changes and modifications may be practiced within the scope of the appended claims. It should be noted that there are many alternative ways of implementing the processes, systems, and apparatus of the present embodiments. Accordingly, the present embodiments are to be considered as illustrative and not restrictive, and the embodiments are not to be limited to the details given herein.

What is claimed is:

1. A method of rendering a view displayed on a graphical user interface, wherein the view depicts a window network of one or more optically switchable windows disposed in a building, and wherein the one or more optically switchable windows are represented by smart objects, the method comprising:
   (a) receiving information, wherein the information comprises a window ID and location within the building for each of the one or more optically switchable windows on the window network;
   (b) selecting one or more smart objects based upon the received information;
   (c) selecting a perspective for the view to be depicted in accordance with; and
   (d) displaying a view in which each of the one or more selected smart objects are placed in accordance with the locations of each of the one or more optically switchable windows.

2. The method of claim 1, wherein selecting a perspective for the view in (c) comprises selecting a perspective from the group consisting of: a two-dimensional floorplan of a building, a three-dimensional perspective of a building from a vantage point outside the building, a two-dimensional perspective from a vantage point within a room, a three-dimensional perspective from a vantage point from within a room, a two-dimensional perspective that includes a plurality of floors, a perspective from a vantage point corresponding to the location and orientation of a device displaying the graphical user interface, and a custom view created by a user.

3. The method of claim 1, wherein the perspective in (c) is selected based upon user interaction with the graphical user interface.

4. The method of claim 1, wherein the perspective in (c) is selected based upon a position or orientation of a device displaying the graphical user interface.

5. The method of claim 1, wherein the perspective in (c) is selected based upon permissions granted to a user of the graphical user interface.

6. The method of claim 1, wherein the information received in (a) further comprises IDs and locations of one or more non-window components on a window network, and wherein one or more additional smart objects are selected based upon the IDs of the one or more non-window components, and where the one or more additional smart objects are displayed in (d) in accordance to their location.

7. The method of claim 6, wherein each of the one or more non-window components is selected from the group consisting of a temperature sensor, a photosensor, a humidity sensor, an air flow sensor, an occupancy sensor, a window controller, a network controller, and a master controller.

8. A method of generating a graphical user interface for a computer program product for displaying one or more optically switchable windows on a window network disposed in a building, the method comprising:
   (a) receiving a three-dimensional model of the building wherein the model is at least partially defined by a plurality of surfaces, and wherein each surface has a node ID;
   (b) receiving information, wherein the information comprises a network ID for each of the one or more optically switchable windows on the window network;
   (c) pairing the network ID of each of the one or more optically switchable windows with at least one node ID;
   (d) defining one or more smart objects that represent the one or more optically switchable windows, and wherein each smart object provides information regarding the one or more optically switchable windows; and (e) displaying the three-dimensional model and the smart objects on an electronic device.

9. The method of claim 8, further comprising:
receiving user instructions for changing an optical state of at least one of the one or more optically switchable windows; and
transmitting the user instructions to the window network.

10. The method of claim 8, further comprising, prior to displaying the three-dimensional model and the smart objects, receiving location information comprising the locations in the building of each of one or more optically switchable windows.

11. The method of claim 10, wherein the location information is determined by the window network using geo-positioning.

12. The method of claim 8, further comprising, prior to displaying the three-dimensional model and the smart objects, receiving information comprising sizes and orientations of the one or more optically switchable windows, wherein
displaying the three-dimensional model and the smart objects comprises depicting each of the one or more smart objects in accordance with window sizes and orientations of the one or more optically switchable windows.

13. The method of claim 8, further comprising:
receiving information comprising user observations of a window and/or other device on the network, wherein the information is provided on the electronic device; and
transmitting the information to a remote monitoring system.

14. The method of claim 8, further comprising, prior to displaying the three-dimensional model and the smart objects, receiving information comprising a current tint state of at least one of the optically switchable windows, and wherein displaying the three-dimensional model and the smart objects comprises depicting the current tint state of the at least one of the optically switchable windows.

15. The method of claim 8, wherein the one or more smart objects are designed or configured to be manipulated by a user interaction selected from the group consisting of tactile interaction, sound, motion, orientation, and a determined location of the electronic device.

16. The method of claim 8, further comprising receiving a location of the electronic device relative to at least one of the one or more optically switchable windows.

17. The method of claim 16, further comprising determining an orientation of the electronic device with respect to the at least one of the one or more optically switchable windows.

18. The method of claim 8, further comprising:
receiving instructions from the user to create a customized view; and
displaying the customized view.

* * * * *